(12) United States Patent
West et al.

(10) Patent No.: US 10,546,471 B1
(45) Date of Patent: *Jan. 28, 2020

(54) PNEUMATICALLY CONTROLLED HAPTIC MECHANISMS FOR HAPTIC FEEDBACK

(71) Applicant: Facebook Technologies, LLC, Menlo Park, CA (US)

(72) Inventors: Zachary Daniel West, Seattle, WA (US); Aaron Alan Ambuske, Seattle, WA (US); John Dietrich Martin, Seattle, WA (US); Brian Fletcher, Issaquah, WA (US); Nicholas Roy Corson, Woodinville, WA (US); Brian Cox, Seattle, WA (US); Charles Stewart, Bothell, WA (US); Tristan Thomas Trutna, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,947

(22) Filed: Aug. 8, 2018

(51) Int. Cl.
| | |
|---|---|
| *H04B 3/36* | (2006.01) |
| *G08B 6/00* | (2006.01) |
| *A41D 1/00* | (2018.01) |
| *A41D 19/00* | (2006.01) |
| *A63F 13/285* | (2014.01) |
| *A63F 13/211* | (2014.01) |

(52) U.S. Cl.
CPC ............... *G08B 6/00* (2013.01); *A41D 1/002* (2013.01); *A41D 19/0024* (2013.01); *A63F 13/211* (2014.09); *A63F 13/285* (2014.09)

(58) Field of Classification Search
None
See application file for complete search history.

(56) References Cited

U.S. PATENT DOCUMENTS

| | | | |
|---|---|---|---|
| 2015/0075303 A1* | 3/2015 | Connor ............... | A61B 5/1126 73/865.4 |
| 2016/0187977 A1* | 6/2016 | Cruz-Hernandez ..... | G06F 1/163 345/156 |
| 2017/0300115 A1* | 10/2017 | Kerr ........................ | G06F 3/016 |

(Continued)

OTHER PUBLICATIONS

West, Notice of Allowance, U.S. Appl. No. 16/058,950, dated Apr. 11, 2019, 8 pgs.

(Continued)

*Primary Examiner* — Julie B Lieu
(74) *Attorney, Agent, or Firm* — Morgan, Lewis & Bockius LLP

(57) ABSTRACT

An apparatus for creating haptic stimulations is provided. The apparatus includes one or more pods coupled to a garment, each pod including: (i) an internal structure, and (ii) an airtight bladder surrounding the internal structure, where the bladder is pneumatically coupled to a pneumatic device that is configured to control a pressurized state of the bladder. Each pod is configured to: (i) have a first degree of flexibility when the bladder of the pod is in a first pressurized state; and (ii) have a second degree of flexibility, less than the first degree of flexibility, when the bladder of the pod is in a second pressurized state different from the first pressurized state. Each pod provides a haptic stimulation to a wearer of the garment when the corresponding bladder is in the second pressurized state.

20 Claims, 29 Drawing Sheets

(56) References Cited

U.S. PATENT DOCUMENTS

2018/0204426 A1\*  7/2018  Nagisetty .................. G08B 6/00
2018/0365941 A1\* 12/2018  Levesque ................ A43B 11/00
2019/0079480 A1\*  3/2019  Sun ......................... G05B 15/02
2019/0133215 A1\*  5/2019  Whalen .............. A63B 24/0087

OTHER PUBLICATIONS

West, Office Action, U.S. Appl. No. 16/058,949, dated Jun. 17, 2019, 8 pgs.
West, Notice of Allowance U.S. Appl. No. 16/058,949, dated Sep. 11, 2019, 5 pgs.

\* cited by examiner

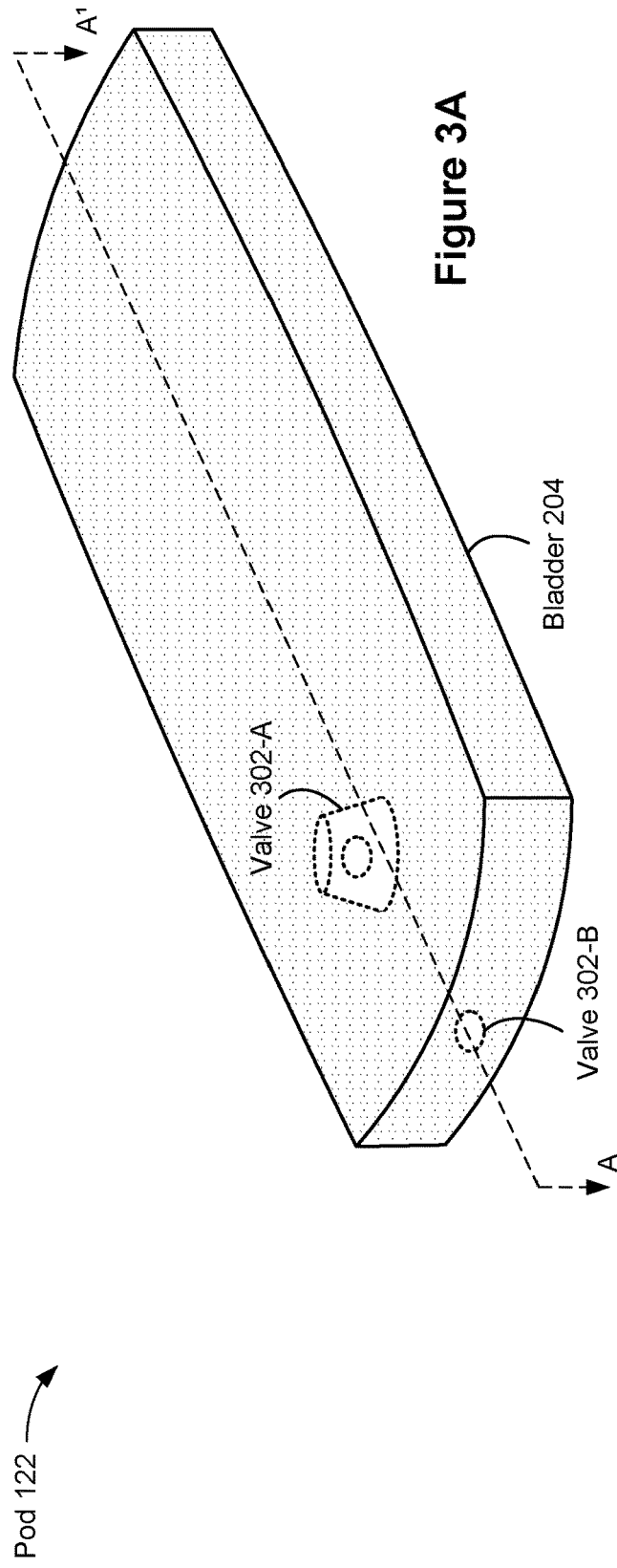
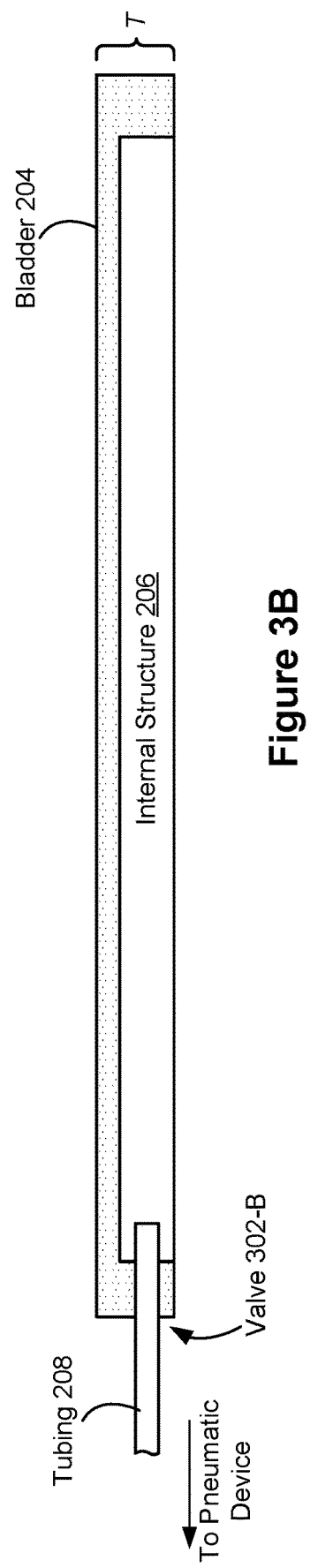
Figure 3A
Figure 3B

Planar  Curve Upwards  Curve Downwards

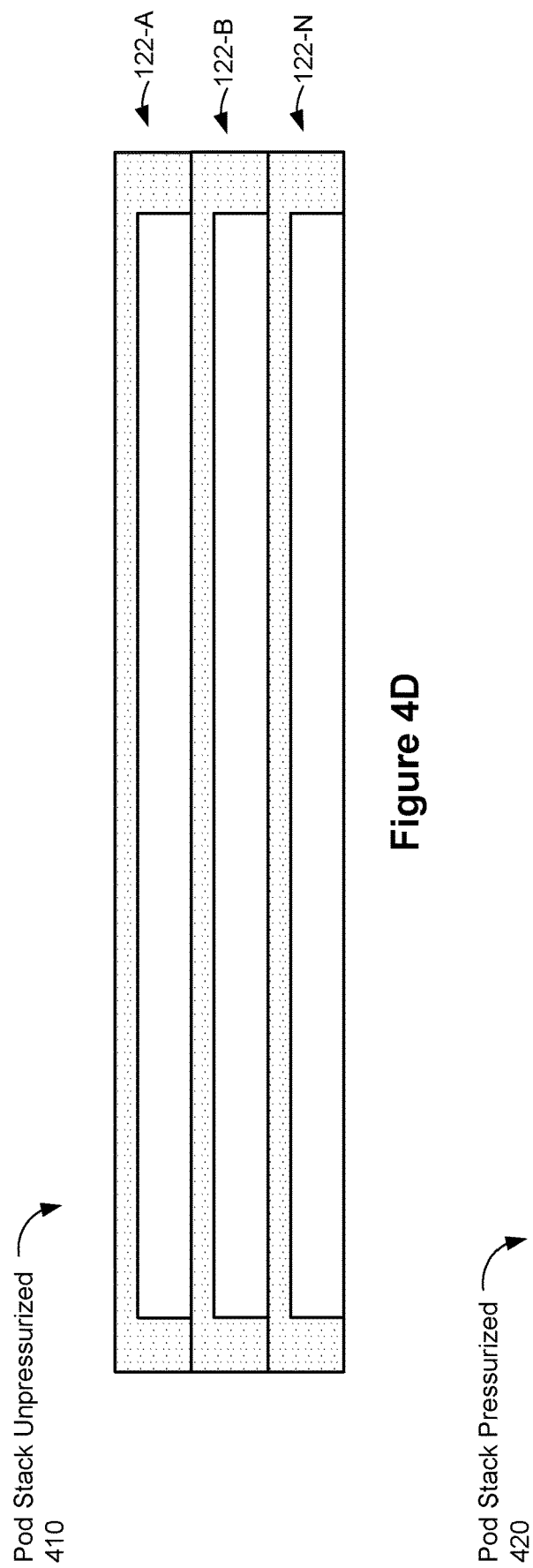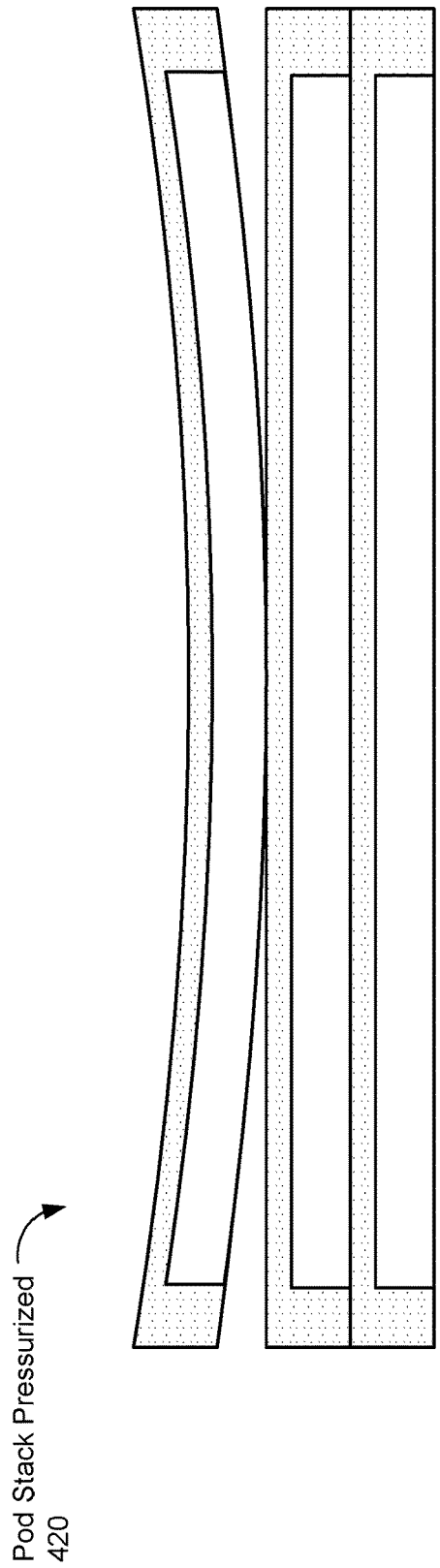
Figure 4D
Figure 4E

Pod 122

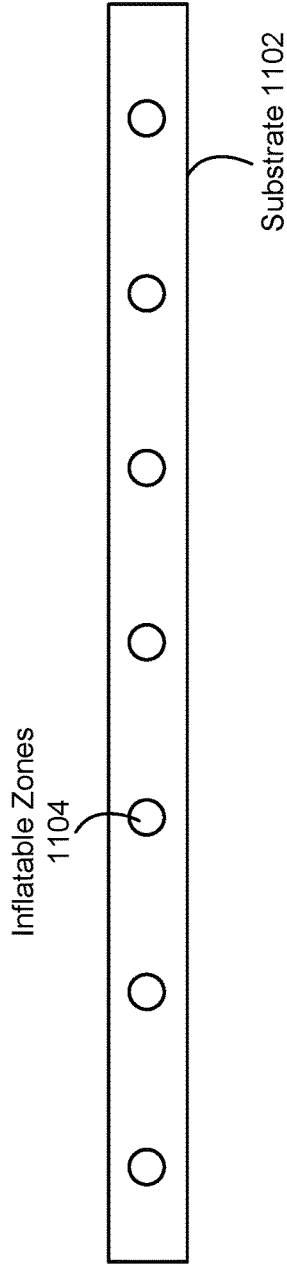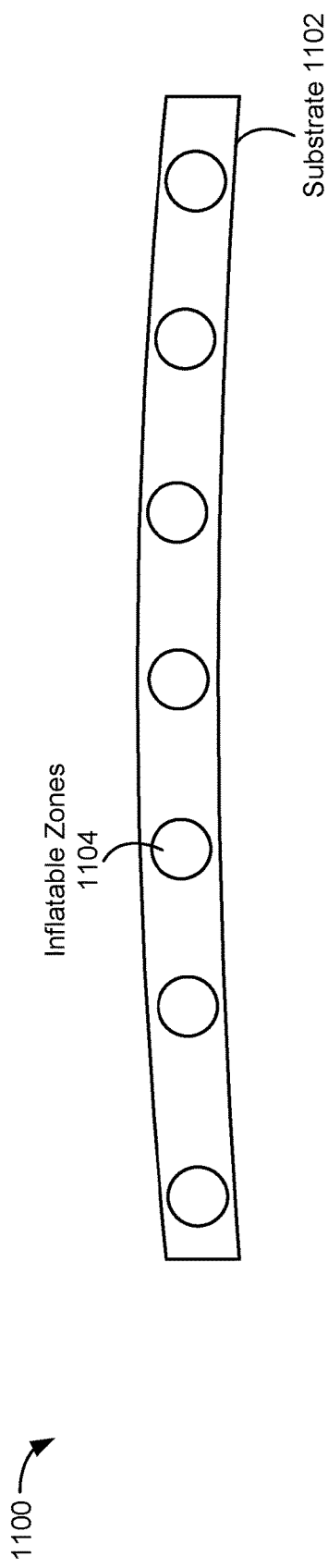

Wearable Device 120

PNEUMATICALLY CONTROLLED HAPTIC MECHANISMS FOR HAPTIC FEEDBACK

CROSS REFERENCE TO RELATED APPLICATIONS

This application is related to U.S. patent application Ser. No. 16/058,949, filed Aug. 8, 2018, entitled "Pneumatically Controlled Haptic Mechanisms with Curling Internal Structures for Haptic Feedback," and U.S. patent application Ser. No. 16/058,950, filed Aug. 8, 2018, entitled "Pneumatically Controlled Haptic Mechanisms with Nested Internal Structures for Haptic Feedback," each of which is incorporated by reference herein in its entirety.

TECHNICAL FIELD

This relates generally to haptic stimulation, including but not limited to creating haptic stimulations on users of virtual and/or augmented reality devices.

BACKGROUND

Virtual and augmented reality devices have wide applications in various fields, including engineering design, medical surgery practice, military simulated practice, and video gaming. Haptic or kinesthetic stimulations recreate the sense of touch by applying forces, vibrations, and/or motions to a user, and are frequently implemented with virtual and augmented reality devices. In certain applications, haptic stimulations are desired at locations where dexterity and motion of the user cannot be constrained. Conventional haptic creating devices, however, are cumbersome and therefore detract from the user experience.

SUMMARY

Accordingly, there is a need for devices and systems that can create haptic stimulations on a user without constraining dexterity and motion of the user. One solution is a wearable device that includes novel haptic mechanisms, referred to herein as "pods." The pods are made from the flexible, durable materials that do not encumber the user but are still able to create adequate haptic stimulations. Further, the pods are airtight such that a pressure inside the pods can be varied to create various haptic stimulations (e.g., a respective pod can transition between being flexible and semi-rigid, or vice versa). By changing the pressure, a respective pod can go from being flexible to having some degree of rigidity, and it is this transition that creates the haptic stimulations felt by the user.

(A1) In some embodiments, the solution explained above can be implemented on a wearable device that includes one or more pods. Each of the pods includes (i) an internal structure, and (ii) an airtight bladder surrounding the internal structure. The bladder may be connected to a pneumatic device that is configured to control a pressurized state of the bladder. Further, each of the pods has: (i) a first degree of flexibility when the bladder is in a first pressurized state, and (ii) a second degree of flexibility, less than the first degree of flexibility, when the bladder is in a second pressurized state different from the first pressurized state (i.e., the pod is less flexible, and perhaps rigid, when the bladder is in the second pressurized state). In addition, each pod provides a haptic stimulation to the wearer of the wearable device when the bladder is in the second pressurized state. In some embodiments, when the bladder is in the first pressurized state, the bladder is unpressurized or depressurized. Further, in some embodiments, when the bladder is in the second pressurized state, the bladder is pressurized positively or negatively (e.g., pressure is above (or below) some threshold value).

(A2) In some embodiments of A1, the internal structure in each pod of the one or more pods includes two substrates connected through and separated by a material formed between the two substrates.

(A3) In some embodiments of A2, the material has a predefined stitching pattern, and the predefined stitching pattern in a first pod of the one or more pods is to strain the internal structure of the first pod when the bladder of the first pod is in the second pressurized state, the strained internal structure causing, at least partially, the first pod to have the second degree of flexibility.

(A4) In some embodiments of A3, a first degree of strain is created in one or more regions of the internal structure by the predefined stitching pattern when the bladder of the first pod is in the second pressurized state, and a second degree of strain, greater than the first degree of strain, is created in one or more different regions of the internal structure by the predefined stitching pattern when the bladder of the first pod is in the second pressurized state.

(A5) In some embodiments of A3-A4, the predefined stitching pattern in the first pod is configured to make the internal structure of the first pod take a first shape when the bladder of the first pod is in the second pressurized state. Further, the predefined stitching pattern in a second pod, distinct from the first pod, of the one or more pods is configured to make the internal structure of the second pod take a second shape, different from the first shape, when the bladder of the second pod is in the second pressurized state. The predefined stitching pattern in the second pod is different from the predefined stitching pattern in the first pod.

(A6) In some embodiments of A5, the first shape taken by the first pod is a planar, flat shape, and the second shape taken by the second pod is a nonplanar shape.

(A7) In some embodiments of A5, the first shape taken by the first pod is a first nonplanar shape, and the second shape taken by the second pod is a second nonplanar shape different from the first nonplanar shape.

(A8) In some embodiments of A2, the material has a predefined lattice structure. Further, (i) the predefined lattice structure in a first pod of the one or more pods is configured to make the internal structure of the first pod take a first shape when the bladder of the first pod is in the second pressurized state and (ii) the predefined lattice structure in a second pod, distinct from the first pod, of the one or more pods is configured to make the internal structure of the second pod take a second shape, different from the first shape, when the bladder of the second pod is in the second pressurized state. The predefined lattice structure in the second pod is different from the predefined lattice structure in the first pod.

(A9) In some embodiments of A2-A8, a first substrate of the two substrates in a first pod of the one or more pods has a first elasticity, a second substrate of the two substrates in the first pod has a second elasticity less than the first elasticity of the first substrate, and the first substrate is configured to expand away from the second substrate in a first direction when the bladder in the first pod is in the second pressurized state.

(A10) In some embodiments of A1-A9, each of the pods is adjacent to a respective portion of the wearer's body, and the internal structure of each pod does not impede free movement of the respective portion of the wearer's body when the bladder is in the first pressurized state.

(A11) In some embodiments of A10, the internal structure of each pod conforms to a respective posture of the respective portion of the wearer's body when the bladder is in the first pressurized state, and the internal structure of each pod transitions to a respective predetermined shape when the respective pod is in the second pressurized state.

(A12) In some embodiments of A10-A11, a first pod of the one or more pods is configured to provide a first haptic stimulation to the wearer of the wearable device when the bladder of the first pod is in the second pressurized state, the first haptic stimulation impeding movement of the respective portion of the wearer's body. Further, a second pod, distinct from the first pod, of the one or more pods, is configured to provide a second haptic stimulation to the wearer of the wearable device when the bladder of the second pod is in the second pressurized state, the second haptic stimulation forcing movement of the respective portion of the wearer's body in a direction.

(A13) In some embodiments of A1-A12, a bladder is in the first pressurized state when the bladder is unpressurized, and the bladder is in the second pressurized state when the bladder is positively pressurized or negatively pressurized.

(A14) In some embodiments of A13, the bladder is in the second pressurized state when the pneumatic device adds air to or removes air from the bladder.

(A15) In some embodiments of A1-A14, the pneumatic device is in communication with a remote computing device, and the pneumatic device is configured to change the pressurized state of a bladder for a pod in response to receiving one or more signals from the remote computing device.

(A16) In some embodiments of A15, the remote computing device is in communication with a head-mounted display that presents content to the wearer, the head-mounted display including an electronic display. Furthermore, the one or more signals correspond to content displayed on the electronic display.

(A17) In some embodiments of A16, the wearable device further includes one or more sensors, coupled to the garment, configured to generate spatial and motion data corresponding to the wearer's movements. Additionally, the spatial and motion data are communicated to the remote computing device.

(A18) In some embodiments of A17, the one or more signals further correspond to the spatial and motion data corresponding to the wearer's movements, and the one or more signals are generated by the remote computing device to impede the wearer's movements.

(B1) In some embodiments, the solution explained above can be implemented on a wearable device that includes one or more pods. Each of the pods includes (i) an internal structure including an arrangement of a plurality of protrusions, and (ii) an airtight bladder surrounding the internal structure, wherein the bladder is pneumatically coupled to a pneumatic device that is configured to control a pressurized state of the bladder. Furthermore, the internal structure in each pod is configured to: (i) when the respective bladder of the respective pod is in a first pressurized state, have a first degree of flexibility, and (ii) when the respective bladder of the respective pod is in a second pressurized state different from the first pressurized state: (A) curve, at least partially, in a predetermined direction, and (B) have a second degree of flexibility less than the first degree of flexibility, thereby providing a haptic stimulation to a wearer of the garment when the respective bladder is in the second pressurized state.

(B2) In some embodiments of B1, each of the plurality of protrusions has the same cross-sectional shape.

(B3) In some embodiments of B2, the cross-sectional shape is selected from the group consisting of a triangle, a rectangle, a circle, and a hexagon.

(B4) In some embodiments of B1-B3, the internal structure includes a substrate, and each of the plurality of protrusions extends across a width of the substrate.

(B5) In some embodiments of B1-B4, each of the plurality of protrusions is perforated, at least partially, to allow a medium to pass through the protrusion.

(B6) In some embodiments of B1-B5, the plurality of protrusions in a first pod of the one or more pods is configured to make the internal structure of the first pod take a first shape when the bladder of the first pod is in the second pressurized state, and the plurality of protrusions in a second pod, distinct from the first pod, of the one or more pods is configured to make the internal structure of the second pod take a second shape, different from the first shape, when the bladder of the second pod is in the second pressurized state. Furthermore, characteristics of protrusions in the plurality of protrusions in the second pod are different from characteristics of the plurality of protrusions in the first pod.

(B7) In some embodiments of B6, the characteristics include a cross-sectional shape of the protrusions and a spacing of the protrusions in the plurality of protrusions.

(B8) In some embodiments of B1-B7, each of the pods is adjacent to a respective portion of the wearer body, and the internal structure of each pod does not impede free movement of the respective portion of the wearer's body when the bladder is in the first pressurized state.

(B9) In some embodiments of B8, a first pod of the one or more pods is configured to provide a first haptic stimulation to the wearer of the wearable device when the bladder of the first pod is in the second pressurized state, the first haptic stimulation impeding movement of the respective portion of the wearer's body. Additionally, a second pod, distinct from the first pod, of the one or more pods is configured to provide a second haptic stimulation to the wearer of the wearable device when the bladder of the second pod is in the second pressurized state, the second haptic stimulation forcing movement of the respective portion of the wearer's body in a direction.

(B10) In some embodiments of B1-B9, when the bladder of a respective pod is in the first pressurized state, the bladder is unpressurized, and when the bladder of the respective pod is in the second pressurized state, the bladder is positively pressurized or negatively pressurized.

(B11) In some embodiments of B10, a medium is removed from the bladder of the respective pod when the bladder is negatively pressurized, and a medium is added to the bladder of the respective pod when the bladder is negatively pressurized.

(B12) In some embodiments of B1-B11, the bladder of the respective pod is in the second pressurized state when the pneumatic device removes air from the bladder of the respective pod.

(B13) In some embodiments of B12, the air being removed from the bladder travels over top portions of the plurality of protrusions at a faster rate relative to a rate of the air being removed from the bladder that travels from bottom portions of the plurality of protrusions. Furthermore, the air that travels over the top portions of the plurality of protrusions at the faster rate causes the internal structure of each pod to curve, at least partially, in the predetermined direction.

(B14) In some embodiments of B1-B13, the internal structure is mounted on an inner-surface wall of the bladder.

(B15) In some embodiments of B1-B14, the pneumatic device is in communication with a remote computing device, and the pneumatic device is configured to change the pressurized state of a bladder for a pod in response to receiving one or more signals from the remote computing device.

(B16) In some embodiments of B15, the remote computing device is in communication with a head-mounted display that presents content to the wearer, the head-mounted display including an electronic display. Furthermore, the one or more signals correspond to content displayed on the electronic display.

(B17) In some embodiments of B16, the wearable device further includes one or more sensors, coupled to the garment, configured to generate spatial and motion data corresponding to the wearer's movements. Additionally, the spatial and motion data are communicated to the remote computing device.

(B18) In some embodiments of B17, the one or more signals further correspond to the spatial and motion data corresponding to the wearer's movements, and the one or more signals are generated by the remote computing device to impede the wearer's movements.

(C1) In some embodiments, the solution explained above can be implemented on a wearable device that includes one or more pods. Each of the pods includes (i) an outer internal structure that defines an opening, (ii) an inner internal structure disposed in the opening defined by the outer internal structure, and (iii) an airtight bladder, pneumatically coupled with a pneumatic device, surrounding the inner and outer internal structures, the pneumatic device being configured to control a pressure inside the bladder. Additionally, when a bladder of a respective pod is at a first pressure, respective top surfaces of the inner and outer internal structures contact a first portion of a user's body, said contact with the first portion of the user's body having a first surface area. Moreover, when the bladder of the respective pod is at a second pressure different from the first pressure, the top surface of the inner internal structure and/or the top surface of the outer internal structure contact a second portion of the user's body, said contact with the second portion of the user's body having a second surface area different from the first surface area. In some embodiments, the second pressure is greater than the first pressure.

(C2) In some embodiments of C1, the first surface area encompasses an entire surface area of the second surface area (i.e., the second surface area is a sub-portion of the first surface area). Thus, by changing from the first pressure to the second pressure, the contact area goes from large to small.

(C3) In some embodiments of C1, the second surface area encompasses an entire surface area of the first surface area (i.e., the first surface area is a sub-portion of the second surface area). Thus, by changing from the first pressure to the second pressure, the contact area goes from small to large.

(C4) In some embodiments of C1, the first portion of the user's body is at least partially distinct from the second portion of the user's body. In other words, the contact area shifts at least partially from one location to another in response to the change in pressure.

(C5) In some embodiments of C1, the first portion of the user's body is distinct from the second portion of the user's body. In other words, the contact area shifts from one location to another in response to the change in pressure (no overlap).

(C6) In some embodiments of C1-05, the opening is a first opening, and the inner internal structure defines a second opening with a largest dimension that is shorter than a largest dimension of the first opening.

(C7) In some embodiments of C6, the inner internal structure is a first inner internal structure, and each pod further comprises a second inner internal structure disposed in the second opening defined by the first inner internal structure.

(C8) In some embodiments of C7, when the bladder of the respective pod is at a third pressure different than the first and second pressures: the top surface of the first inner internal structure and/or a top surface of the second inner internal structure contact a third portion of the user's body, said contact with the third portion of the user's body having a third surface area different from the first and second surface areas. In some embodiments, the first surface area encompasses an entire surface area of the second surface area and the third surface area, while in other embodiments the opposite is true. Furthermore, the third portion of the user's body may overlap partially with the first portion and/or the second portion of the user's body. Alternatively, the third portion of the user's body may be distinct from the first portion and/or the second portion of the user's body.

(C9) In some embodiments of C8, the second pressure is greater than the first pressure and the third pressure is greater than the second pressure. Furthermore, the third surface area is less than the second surface area, and the second surface area is less than the first surface area.

(C10) In some embodiments of C1-C9, the outer internal structure and inner internal structure of each pod are configured to: (i) have a first degree of flexibility when the bladder of the respective pod is at the first pressure, and (ii) have a second degree of flexibility, less than the first degree of flexibility, when the bladder is at the second pressure.

(C11) In some embodiments of C1-C10, the top surface of the inner internal structure extends from the top surface of the outer internal structure to a first height when at the second pressure (relative to its height when at the first pressure). Alternatively or in addition, the top surface of the outer internal structure extends to a second height when at the second pressure (relative to its height when at the first pressure). The first and second heights may be the same or different heights. Furthermore, the first and second heights may be maximum heights of the two internal structure, or the first and second heights may be intermediate heights of the two internal structure (i.e., greater heights can be obtained by the inner and outer internal structures, depending on the pressure inside the bladder).

(C12) In some embodiments of C1-C11, when the bladder of the respective pod is at the first pressure, the respective top surfaces of the inner and outer structures are at respective first heights, and when the bladder of the respective pod is at the second pressure, the respective top surfaces of the inner and outer structures are at respective second heights different from the respective first heights.

(C13) In some embodiments of C1-C12, the top surface of the inner internal structure extends from the top surface of the outer internal structure to a first height when the bladder of the respective pod is at the first pressure. Further, the top surface of the inner internal structure extends from the top surface of the outer internal structure to a second height greater than the first height when the bladder of the respective pod is at the second pressure, which is greater than the first pressure.

(C14) In some embodiments of C1-C13, the outer internal structure and inner internal structure of each pod include two substrates connected through and separated by a material formed between the two substrates.

(C15) In some embodiments of C14, the material is a spun filament mesh. Furthermore, the filament mesh in a first pod of the one or more pods is configured to make the inner internal structure of the first pod take a first shape when the bladder of the first pod is at the first pressure, and the filament mesh in a second pod, distinct from the first pod, of the one or more pods is configured to make the inner internal structure of the second pod take a second shape, different from the first shape, when the bladder of the second pod is at the second pressure. Additionally, the filament mesh in the second pod is deposited in a different pattern from the filament mesh in the first pod. It is further noted that the deposition pattern of the filament mesh can also effect heights to which the internal structures can extend.

(C16) In some embodiments of C15, the first shape taken by the first pod includes a single ridge or dome, and the second shape taken by the second pod includes multiple ridges or domes that extend to multiple heights.

(C17) In some embodiments of C1-C16, a difference between the first area of contact and the second area of contact is substantially proportional to a difference between the first pressure and the second pressure.

(C18) In some embodiments of C1-C17, when the bladder of the respective pod is at the first pressure, the user experiences a haptic stimulation at the first portion of his or her body. Furthermore, when the bladder of the respective pod is at the second pressure, the user experiences a different haptic stimulation at the second portion of his or her body. In some embodiments, the second surface area is less than the first surface area, or vice versa.

(C19) In some embodiments of C18, the first portion of the user's body includes dorsal surfaces of a distal phalange of a finger and an intermediate phalange of the finger, and the second portion of the user's body includes: (i) the dorsal surface of the distal phalange of the finger, (ii) the dorsal surface of the intermediate phalange of the finger, or (iii) a joint region between the dorsal surfaces of the distal phalange and the intermediate phalange of the finger.

(C20) In some embodiments of C1-C19, the pneumatic device is in communication with a remote computing device, and the pneumatic device is configured to change the pressurized state of a bladder for a pod in response to receiving one or more signals from the remote computing device.

(C21) In some embodiments of C20, the remote computing device is in communication with a head-mounted display that presents content to the wearer, the head-mounted display including an electronic display. Furthermore, the one or more signals correspond to content displayed on the electronic display.

(C22) In some embodiments of C21, the wearable device further includes one or more sensors, coupled to the garment, configured to generate spatial and motion data corresponding to the wearer's movements. Additionally, the spatial and motion data are communicated to the remote computing device.

(C23) In some embodiments of C22, the one or more signals further correspond to the spatial and motion data corresponding to the wearer's movements, and the one or more signals are generated by the remote computing device to impede the wearer's movements.

The wearable devices discussed above in some instances are worn on the user's body (e.g., a hand, an arm, a wrist, or an ankle) and can be used to stimulate areas of the body. Moreover, the wearable device can be in communication with a remote device (e.g., a virtual reality device and/or an augmented reality device, among others), and the wearable device can stimulate the body based on an instruction from the remote device. As an example, the remote device may display media content to a user (e.g., via a head-mounted display), and the remote device may also instruct the wearable device to create haptic stimulations that correspond to the media content displayed to the user and/or other information collected by the wearable device.

Thus, the devices and systems described herein provide benefits including but not limited to: (i) stimulating areas of the body that correspond to media content and sensor data, (ii) the wearable device does not encumber free movement of a user's body, until desired, and (iii) multiple wearable devices can be used simultaneously.

In accordance with some embodiments, a computer system includes one or more processors/cores and memory storing one or more programs configured to be executed by the one or more processors/cores. The one or more programs include instructions for performing the operations of any of the methods described herein. In accordance with some embodiments, a non-transitory computer-readable storage medium has stored therein instructions that, when executed by one or more processors/cores of a computer system, cause the computer system to perform the operations of any of the methods described herein. In accordance with some embodiments, a system includes a wearable device, a head-mounted display (HMD), an external device (e.g., pneumatic device 210, FIG. 2) and a computer system to provide video/audio feed to the HMD and instructions to the wearable device, the HMD, and/or the external device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 3A-3B show various views of a simplified pod in accordance with some embodiments.

FIGS. 4A-4E show different shapes taken by the representative pod of FIGS. 3A-3B in accordance with some embodiments.

FIGS. 10D-1 and 10D-2 illustrate two internal structures placed back-to-back in accordance with some embodiments.

FIGS. 10E-1 to 10E-3 show cross-sectional side views of a representative pod in different pressurized states in accordance with some embodiments.

FIGS. 10M-1 to 10M-3 show cross-sectional side views of "push" and "pull" forces acting upon a representative pod in accordance with some embodiments.

FIGS. 11A-11B show views of an internal structure with expanding/inflatable zones in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
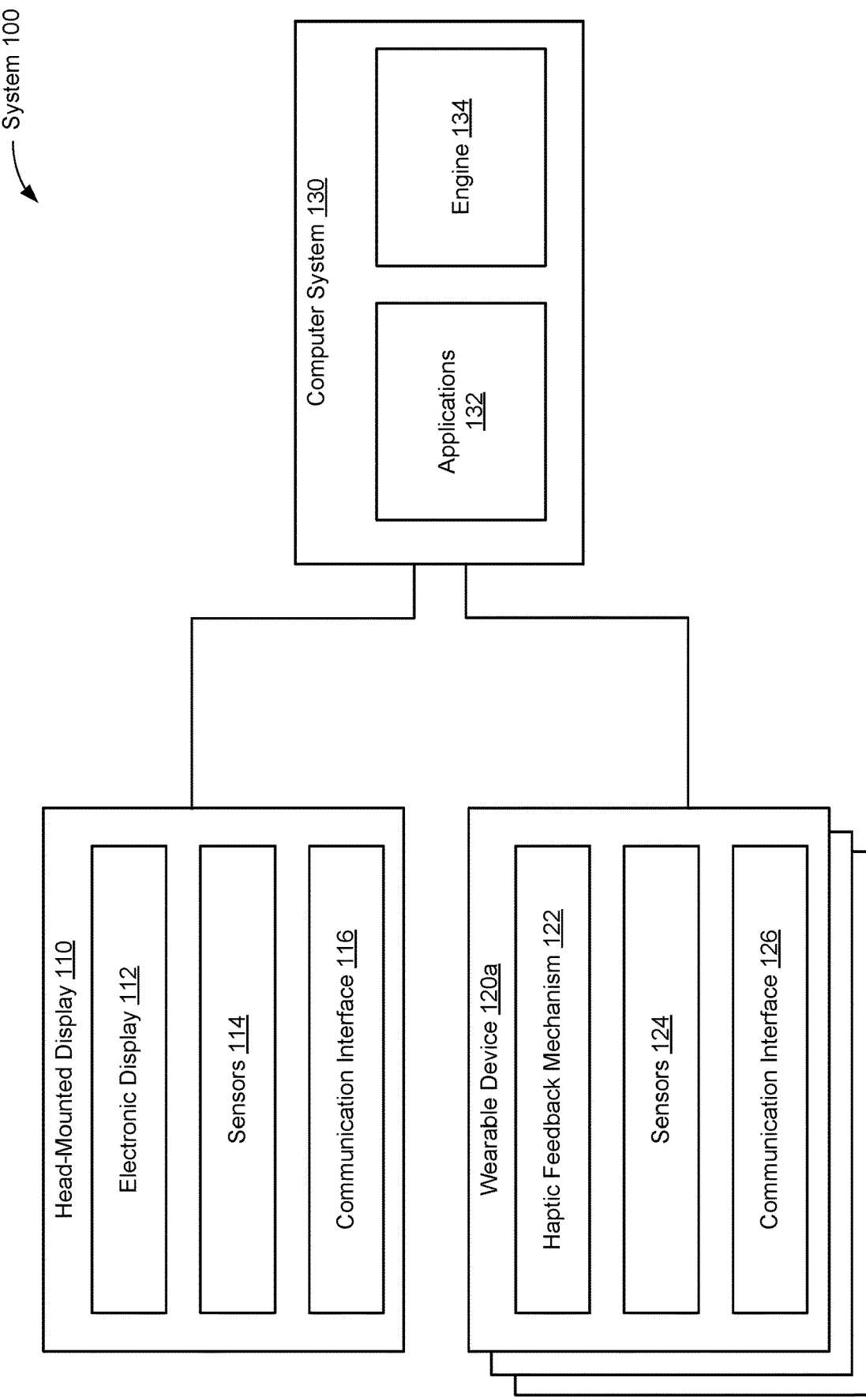
FIG. 1 is a block diagram illustrating an exemplary haptics system, in accordance with various embodiments.

FIG. 1 is a block diagram illustrating a virtual-reality (and/or augmented reality) system 100 in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more wearable devices 120 (sometimes referred to as "wearable apparatuses," or simply "apparatuses"), which are used in conjunction with a computer system 130 (sometimes referred to a "remote computer system") and a head-mounted display 110. In some embodiments, the system 100 provides the functionality of a virtual reality device with haptics feedback, an augmented reality device with haptics feedback, or a combination thereof.

The head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information.

The head-mounted display 110 includes an electronic display 112, sensors 114, and a communication interface 116. The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detects rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display to the computer system 130. In such embodiments, the communication interface 116 may also receive audio/visual data to be rendered on the electronic display 112.

The wearable device 120 includes a garment worn by the user (e.g., a glove, a shirt, or pants). In some embodiments, the wearable device 120 collects information about a portion of the user's body (e.g., the user's hand) that can be used as input for virtual reality applications 132 executing on the computer system 130. In the illustrated embodiment, the wearable device 120 includes a haptic feedback mechanism 122, sensors 124, and a communication interface 126. The wearable device 120 may include additional components that are not shown in FIG. 1, such as a power source (e.g., an integrated battery, a connection to an external power source, a container containing compressed air, or some combination thereof), one or more processors, and memory.

Figure 2:
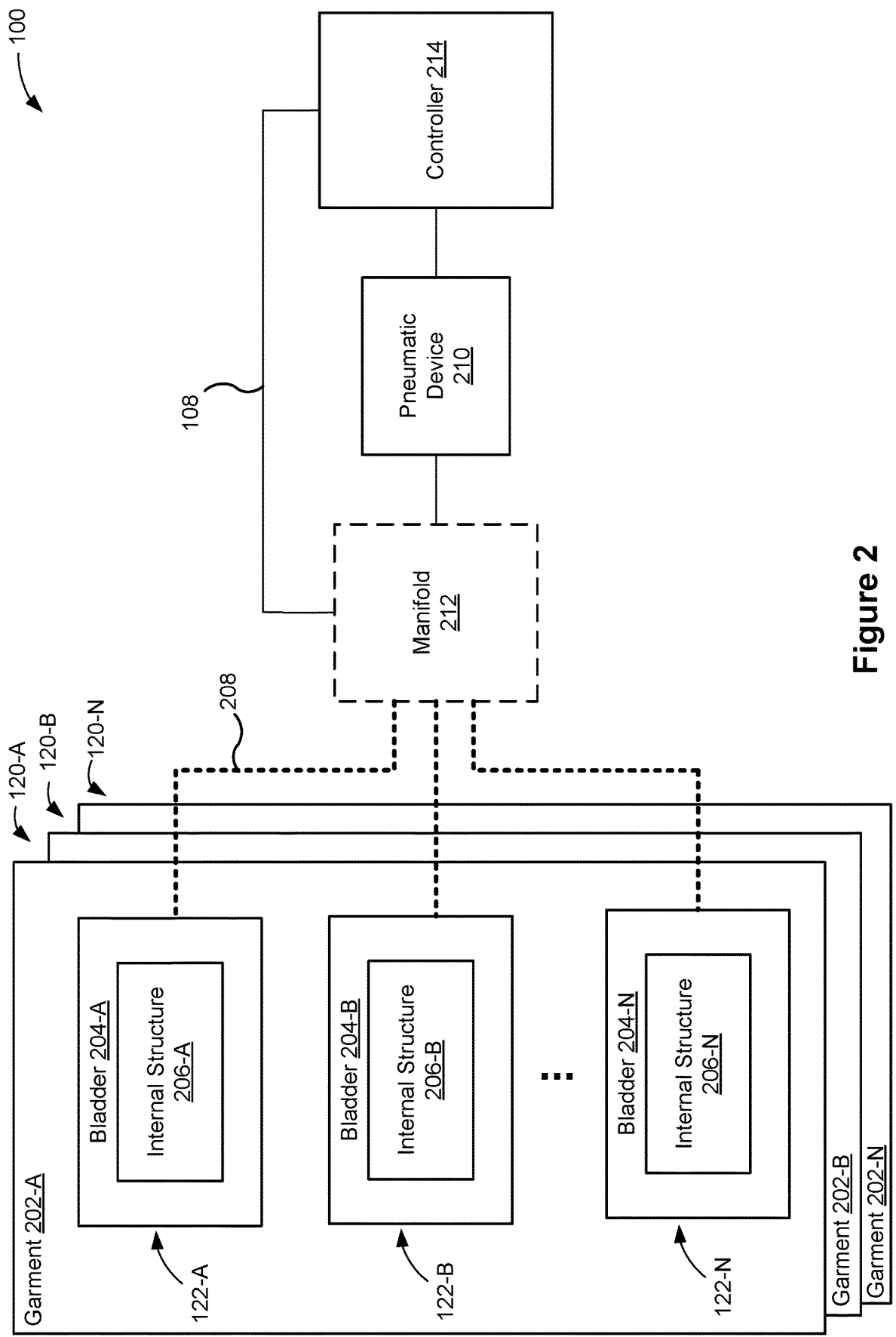
FIG. 2 is a schematic of an exemplary haptics system in accordance with some embodiments.

The haptic feedback mechanism 122 provides haptic feedback (i.e., haptic stimulations) to the user by forcing a portion of the user's body (e.g., hand) to move in certain ways and/or preventing the portion of the user's body from moving in certain ways. To accomplish this, the haptic feedback mechanism 122 is configured to apply a force that counteracts movements of the user's body detected by the sensors 114, increasing the rigidity of certain portions of the wearable device 120, or some combination thereof. Various embodiments of the haptic feedback mechanism 122 are described with reference to FIGS. 3A-14. The haptic feedback mechanism 122 is sometimes referred to herein as a "pod," and the wearable device 120 may include one or more pods, as shown in FIG. 2.

The sensors 124 include one or more hardware devices that detect spatial and motion information about the wearable device 120. Spatial and motion information can include information about the position, orientation, velocity, rotation, and acceleration of the wearable device 110 or any subdivisions of the wearable device 120, such as fingers, fingertips, knuckles, the palm, or the wrist when the wearable device 120 is a glove. The sensors 124 may be IMUs, as discussed above with reference to the sensors 114.

The communication interface 126 enables input and output to the computer system 130. In some embodiments, the communication interface 126 is a single communication channel, such as USB. In other embodiments, the communication interface 126 includes several distinct communication channels operating together or independently. For example, the communication interface 126 may include separate communication channels for receiving control signals for the haptic feedback mechanism 122 and sending data from the sensors 124 to the computer system 130. The one or more communication channels of the communication interface 126 can be implemented as wired or wireless connections. In some embodiments, the communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet, HomePlug, etc.), and/or any other suitable communication protocol, including communication protocols not yet developed as of the filing date of this document.

The computer system 130 is a computing device that executes virtual reality applications and/or augmented reality applications to process input data from the sensors 114 on the head-mounted display 110 and the sensors 124 on the wearable device 120. The computer system 130 provides output data for (i) the electronic display 112 on the head-mounted display 110 and (ii) the haptic feedback mechanism 122 on the wearable device 120.

In some embodiments, the computer system 130 sends instructions (e.g., the output data) to the wearable device 120. In response to receiving the instructions, the wearable device 120 creates one or more haptic stimulations (e.g., activates one or more of the pod(s) 122). Alternatively, in some embodiments, the computer system 130 sends instructions to an external device, such as a pneumatic device, and in response to receiving the instructions, the external device creates one or more haptic stimulations (e.g., the output data bypasses the wearable device 120). Alternatively, in some embodiments, the computer system 130 sends instructions to the wearable device 120, which in turn sends the instructions to the external device. The external device then creates of one or more haptic stimulations. Although not shown, in the embodiments that include a distinct external device, the external device may be connected to the head-mounted display 110, the wearable device 120, and/or the computer system 130 via a wired or wireless connection. The external device may be a pneumatic device, a hydraulic device, some combination thereof, or any other device capable of adjusting pressure.

The computer system 130 can be implemented as any kind of computing device, such as an integrated system-on-a-chip, a microcontroller, a desktop or laptop computer, a server computer, a tablet, a smart phone or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 further includes virtual-reality (and/or augmented-reality) applications 132 and a virtual reality (and/or augmented reality) engine 134. In some embodiments, the virtual-reality applications 132 and the virtual-reality engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

Each virtual-reality application 132 is a group of instructions that, when executed by a processor, generates virtual reality content for presentation to the user. A virtual-reality application 132 may generate virtual-reality content in response to inputs received from the user via movement of the head-mounted display 110 or the wearable device 120. Examples of virtual-reality applications 132 include gaming applications, conferencing applications, and video playback applications.

The virtual-reality engine 134 is a software module that allows virtual-reality applications 132 to operate in conjunction with the head-mounted display 110 and the wearable device 120. In some embodiments, the virtual-reality engine 134 receives information from the sensors 114 on the head-mounted display 110 and provides the information to a virtual-reality application 132. Based on the received information, the virtual-reality engine 134 determines media content to provide to the head-mounted display 110 for presentation to the user via the electronic display 112 and/or a type of haptic feedback to be created by the haptic feedback mechanism 122 of the wearable device 120. For example, if the virtual-reality engine 134 receives information from the sensors 114 on the head-mounted display 110 indicating that the user has looked to the left, the virtual-reality engine 134 generates content for the head-mounted display 110 that mirrors the user's movement in a virtual environment.

Similarly, in some embodiments, the virtual-reality engine 134 receives information from the sensors 124 on the wearable device 120 and provides the information to a virtual-reality application 132. The application 132 can use the information to perform an action within the virtual world of the application 132. For example, if the virtual-reality engine 134 receives information from the sensors 124 that the user has closed his fingers around a position corresponding to a coffee mug in the virtual environment and raised his hand, a simulated hand in the virtual-reality application 132 picks up the virtual coffee mug and lifts it to a corresponding height. As noted above, the information received by the virtual-reality engine 134 can also include information from the head-mounted display 110. For example, cameras on the head-mounted display 110 may capture movements of the wearable device 120, and the application 132 can use this additional information to perform the action within the virtual world of the application 132.

The virtual-reality engine 134 may also provide feedback to the user that the action was performed. The provided feedback may be visual via the electronic display 112 in the head-mounted display 110 (e.g., displaying the simulated hand as it picks up and lifts the virtual coffee mug) and/or haptic feedback via the haptic feedback mechanism 122 in the wearable device 120. For example, the haptic feedback may prevent one or more of the user's fingers from curling past a certain point to simulate the sensation of touching a solid coffee mug. To do this, the wearable device 120 changes (either directly or indirectly) a pressurized state of one or more of the pods 122. Each of the pods 122 includes a mechanism that, at a minimum, provides resistance when the respective pod 122 is transitioned from a first pressurized state (e.g., atmospheric pressure) to a second pressurized state (e.g., inflated or deflated to a threshold pressure). Structures of pods 122 are discussed in further detail below with reference to FIGS. 3A to 14.

As noted above, the pods 122 described herein are configured to transition between a first pressurized state and a second pressurized state to provide haptic feedback to the user. Due to the ever-changing nature of virtual and augmented reality, the pods 122 may be required to transition between the two states hundreds, or perhaps thousands of times, during a single use. Thus, the pods 122 described herein are durable and designed to quickly transition from state to state. To provide some context, in the first pressurized state, the pods 122 do not impede free movement of a portion of the wearer's body. For example, one or more pods 122 incorporated into a glove are made from flexible materials that do not impede free movement of the wearer's hand and fingers (e.g., the internal structure 206 (FIG. 3B) is made from a flexible polymer). Because the pods 122 are flexible, the pods 122 are configured to conform to a shape of the portion of the wearer's body when in the first pressurized state. However, once in the second pressurized state, the pods 122 are configured to impede free movement of the portion of the wearer's body, and in some cases, force movement of the portion of the wearer's body. For example, a respective pod 122 (or multiple respective pods) can cause a wearer's finger to curl (or extend) when the pod 122 is in the second pressurized state. In another example, multiple pods 122 may synchronously force the wearer to make a fist (or extend his or her fingers). Moreover, once in the second pressurized state, the pods 122 may take different shapes, with some pods 122 configured to take a planar, rigid shape (e.g., flat and rigid), while some other pods 122 are configured to curve or bend, at least partially.

As mentioned above, the haptic stimulations created by the wearable device 120 can correspond to data displayed by the head-mounted display 110 (e.g., the coffee mug example from above). To provide some additional context, the data (i.e., media content) displayed by the head-mounted display 110 (e.g., via the electronic display 112) may depict the wearer with a bow and arrow. The wearable device 120 may create one or more haptic stimulations to mimic a feeling of the arrow and string between the wearer's fingers. As one can imagine, just prior to releasing an arrow from a bow in real life, a tremendous force is applied to the pads of the fingers drawing the bow string. Therefore, in virtual reality, the haptic stimulation created by the wearable device 120 would need to be intense to provide some realism to the virtual reality experience (e.g., one or more pods 122 on each string-contacting finger push against the string-contacting fingers and attempt to straighten these fingers, as would the bow string in real life). In yet another example, the data displayed by the head-mounted display 110 may depict a cold environment (e.g., a snowy mountain range). In such an example, the wearable device 120 may create one or more haptic stimulations to mimic environmental factors, e.g., stiffening of fingers (i.e., loss of dexterity) caused by the virtual cold temperatures, as would happen in real life. In view of the examples above, including the coffee mug example, the wearable device 120 is used to further immerse the user in virtual and/or augmented reality experience such that the user not only sees (at least in some instances) the data on the head-mounted display 110, but the user may also "feel" certain aspects of the displayed data. Moreover, the wearable device 120 and the pods 122 therein are designed to not restrict movement of the user's hand, until desired.

For ease of discussion, the "haptic feedback mechanism 122" with be referred to henceforth as "one or more pods 122" or more simply "the pod 122."

FIG. 2 is a schematic of the system 100 in accordance with some embodiments. The components in FIG. 2 are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

As a non-limiting example, the system 100 includes a plurality of wearable devices 120-A, 120-B, . . . 120-N, each of which includes a garment 202 and one or more pods 122 (e.g., pods 122-A, 122-B, . . . , 122-N). As explained above, the pods 122 are configured to provide haptic stimulations to a wearer of the wearable device 120. The garment 202 of each wearable device 120 can be various articles of clothing (e.g., gloves, socks, shirts, or pants), and thus, the user may wear multiple wearable devices 120 that provide haptic stimulations to different parts of the body. Each pod 122 is coupled to (e.g., embedded in) the garment 202. Further, each pod 122 includes a bladder 204 and at least one internal structure 206. The bladder 204 (e.g., a membrane) is a sealed, inflatable bladder made from a durable, puncture resistance material, such as thermoplastic polyurethane (TPU) or the like. The bladder 204 contains a medium (e.g., air, an inert gas, or a fluid) that can be added to or removed from the bladder 204 to change a pressure inside the bladder 204. The internal structure 206 includes a least one substrate that is made from a flexible material (e.g., a flexible polymer, such as TPU or the like). As explained with reference to FIGS. 3A-14 below, the internal structure 206 includes additional components/features that contribute to creating the haptic stimulations.

The system 100 also includes a controller 214 and a pneumatic device 210. In some embodiments, the controller 214 is part of the computer system 130 (e.g., the processor of the computer system 130). The controller 214 is configured to control operation of the pneumatic device 210, and in turn operation of the wearable devices 120. For example, the controller 214 sends one or more signals to the pneumatic device 210 to activate the pneumatic device 210 (e.g., turn it on and off). The one or more signals may specify a desired pressure (e.g., pounds-per-square inch) to be output by the pneumatic device 210. Generation of the one or more signals, and in turn the pressure output by the pneumatic device 210, may be based on information collected by the sensors 114 and/or the sensors 124 (FIG. 1). For example, the one or more signals may cause the pneumatic device 210 to increase the pressure inside a first pod 122 at a first time, based on the information collected by the sensors 114 and/or the sensors 124 (e.g., the user makes contact with the virtual coffee mug). Then, the controller may send one or more additional signals to the pneumatic device 210 that cause the pneumatic device 210 to further increase the pressure inside the first pod 122 at a second time after the first time, based on additional information collected by the sensors 114 and/or sensors 124 (e.g., the user grasps and lifts the virtual coffee mug). Further, the one or more signals may cause the pneumatic device 210 to inflate one or more bladders 204 in a first wearable device 120-A, while one or more bladders 204 in a second wearable device 120-B remain unchanged. Additionally, the one or more signals may cause the pneumatic device 210 to inflate one or more bladders 204 in a first wearable device 120-A to a first pressure and inflate one or more other bladders 204 in the first wearable device 120-A to a second pressure different from the first pressure. Depending on the number of wearable devices 120 serviced by the pneumatic device 210, and the number of bladders therein, many different inflation configurations can be achieved through the one or more signals and the examples above are not meant to be limiting.

The system 100 may include an optional manifold 212 between the pneumatic device 210 and the wearable devices 120. The manifold 212 may include one or more valves (not shown) that pneumatically couple each of the pods 122 with the pneumatic device 210 via tubing 208. In some embodiments, the manifold 212 is in communication with the controller 214, and the controller 214 controls the one or more valves of the manifold 212 (e.g., the controller generates one or more control signals). The manifold 212 is configured to switchably couple the pneumatic device 210 with one or more pods 122 of the same or different wearable devices 120 based on one or more control signals from the controller 214. In some embodiments, instead of using the manifold 212 to pneumatically couple the pneumatic device 210 with the pods 122, the system 100 may include multiple pneumatic devices 210, where each is pneumatically coupled directly with a single (or multiple) pod 122. In some embodiments, the pneumatic device 210 and the optional manifold 212 can be configured as part of one or more of the wearable devices 120 (not illustrated) while, in other embodiments, the pneumatic device 210 and the optional manifold 212 can be configured as external to the wearable device 120. A single pneumatic device 210 may be shared by multiple wearable devices 120.

In some embodiments, the pneumatic device 210 is a hydraulic device, a pneudraulic device, or some other device capable of adding and removing a medium from the one or more pods 122. In other words, the discussion herein is not limited to pneumatic devices, but for ease of discussion, pneumatic devices are used as the primary example in the discussion below.

The devices shown in FIG. 2 may be coupled via a wired connection (e.g., via busing 108). Alternatively, one or more of the devices shown in FIG. 2 may be wirelessly connected (e.g., via short-range communication signals).

FIGS. 3A-3B show various views of a simplified pod 122 in accordance with some embodiments. In particular, FIG. 3A is an isometric view of the representative pod 122 and FIG. 3B shows a cross-sectional view of the representative pod 122 (taken along line A-A$^1$ in FIG. 3A). As shown, the respective pod 122 includes (i) an internal structure 206, and (ii) a bladder 204 that surrounds the internal structure 206. As described with reference to FIGS. 5-14 below, various internal structures 206 may be used, and each of the internal structures 206 is configured to create one or more haptic stimulations when the bladder 204 is pressurized. For example, the internal structure in the respective pod 122 may include two substrates connected through and separated by a material (e.g., a predefined stitching pattern 506, FIG. 5; a predefined lattice structure 606, FIG. 6) formed between the two substrates. In another example, the internal structure in the respective pod 122 may include a substrate and a plurality of protrusions disposed along a length of the substrate as shown in FIGS. 9A-9C. Additionally, the various internal structures 206 may be designed to create the haptic stimulations by way of positive pressure and/or negative pressure. Moreover, one internal structure design may be better suited to create a first haptic stimulation and a different internal structure design may be better suited to create a second haptic stimulation. As such, the wearable device 120 may incorporate a variety of internal structures 206, so that various haptic stimulations may be created. "Haptic stimulations" (e.g., tactile feedback and/or haptic feedback) include but are not limited to a touch stimulation, a swipe stimulation, a pull stimulation, a push stimulation, a rotation stimulation, a heat stimulation, a pulsating stimulation, a vibration stimulation, and/or a pain stimulation. A thickness (T) of the pod 122 can range from approximately 0.5 millimeters to 3 millimeters.

In some embodiments, the bladder 204 defines an opening that is sized to accommodate a valve 302-A. The valve 302-A is fitted into the opening so that the bladder 204 remains sealed (i.e., airtight). The valve 302-A also defines an opening that is sized to receive an end of the tubing 208. Alternatively, in some embodiments, the bladder 204 defines an opening, which is illustrated as the valve 302-B. The valve 302-B is also sized to receive an end of the tubing 208. In either case, an adhesive may be deposited around a perimeter of the opening defined by the bladder 204 to ensure that the bladder 204 remains sealed.

Figure 3C:
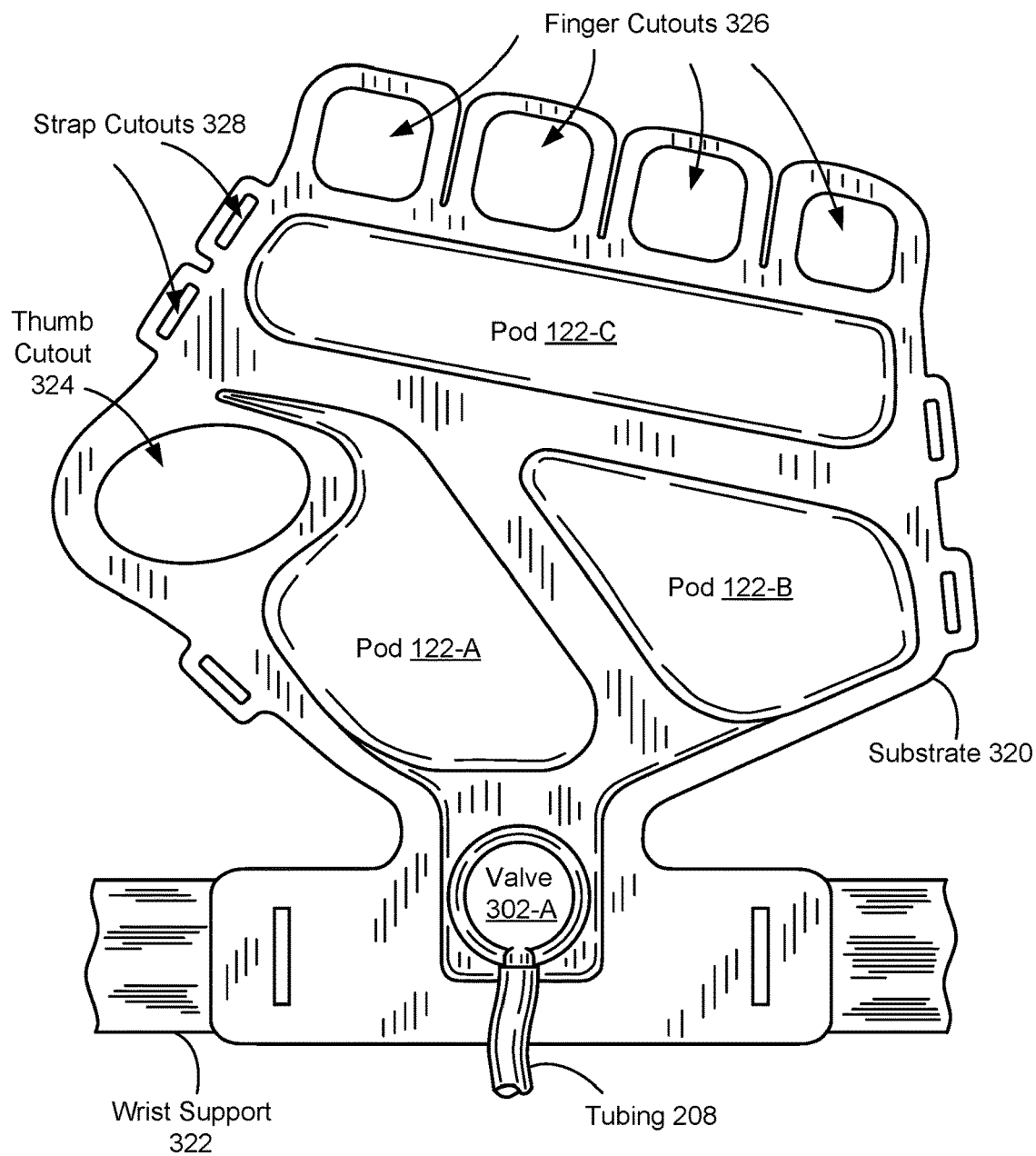
FIG. 3C shows a representative wearable device that includes multiple pods in accordance with some embodiments.

FIG. 3C shows a representative wearable device 120 that includes multiple pods 122 in accordance with some embodiments. The garment 202 is not shown for ease of illustration. The wearable device 122 includes three pods 122-A, 122-B, and 122-C coupled to a substrate 320. The substrate 320 is designed to be worn on a palm side of the user's hand, and the substrate 320 may be part of the garment 202, such as a glove. The substrate 320 is made from a flexible material, such as a natural fiber or various elastic polymers. In some embodiments, the pods 122-A, 122-B, and 122-C are configured to provide the same haptic stimulation while in other embodiments at least one of the pods 122 is configured to provide a different haptic stimulation. Further, the pods 122-A, 122-B, and 122-C may have the same or different internal structures 204. In some embodiments (not shown), each of the pods 122-A, 122-B, and 122-C is part of a stack of pods (e.g., a pod stack 410, FIG. 4D).

As shown, each of the pods 122-A, 122-B, and 122-C has a different shape. The specific shape of each pod is selected based on its location on the hand (e.g., the shape of the internal structure 206 is tailored for the muscles, bones, blood vessels, etc. of the hand). In doing so, a haptic stimulation created by each pod resembles movement of, say, the muscles of the hand under the pod 122. While not shown, a respective pod 122 may have a nonplanar geometry. For example, a respective pod 122 may partially wrap around a user's finger to form a channel. In such an arrangement, the bladder and the internal structure of the respective pod 122 may be fabricated in a channel shape (e.g., as shown in FIGS. 15B and 15C).

In the illustrated example, the substrate 320 defines: (i) a thumb cutout 324 that is sized to receive a user's thumb, and (ii) finger cutouts 326 that are sized to receive the user's fingers. The thumb cutout 324 and finger cutouts 326 are configured to secure the wearable device 120 to the user's hand. Further, the cutouts leverage the strength of the user's hand to help transfer forces (i.e., haptic stimulations) created by the pods 122-A, 122-B, and 122-C to the user. The substrate 320 also includes a plurality of strap cutouts 328 configured to receive a strap that wraps around a dorsal-side of the user's hand to a complementary slot on the other side of the substrate 320. The plurality of slots 328 further aids in transferring forces created by the pods 122-A, 122-B, and 122-C to the user. The wearable device 120 also includes a wrist support 322 configured to secure the wearable device 120 to the user's wrist.

The wearable device 120 includes an instance of the valve 302-A, which is pneumatically coupled to the pneumatic device 210 via the tubing 208. In the illustrated embodiments, the valve 302-A is pneumatically coupled with each of the pods 122-A, 122-B, and 122-C (e.g., to a bladder 204 of each pod 122), and the valve 302-A is configured to add and remove air (or other medium) from the pods 122-A, 122-B, and 122-C. In other embodiments (not shown), each of the pods 122-A, 122-B, and 122-C has a distinct valve 302-A, and in this way, each of the pods 122-A, 122-B, and 122-C can be individually serviced by the pneumatic device 210. For example, the pod 122-A can be inflated while the pods 122-B and 122-C remain at atmospheric pressure or the pods 122-B and 122-C can be deflated. In another example, the pod 122-A can be inflated to a first pressure while the pods 122-B and 122-C are inflated to different pressures. Various other configurations are possible.

Figure 4A:
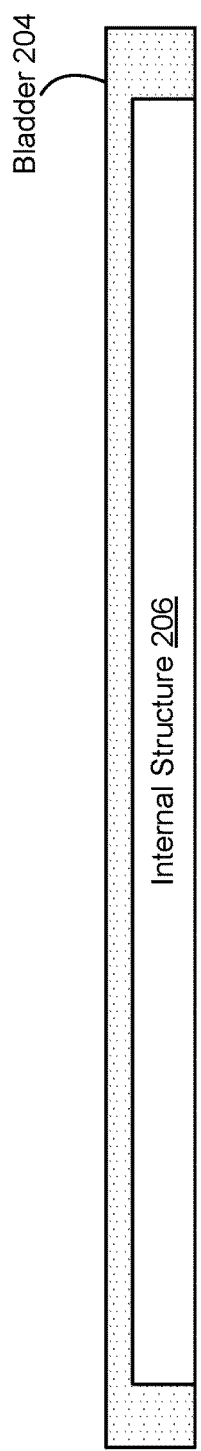
Figure 4B:
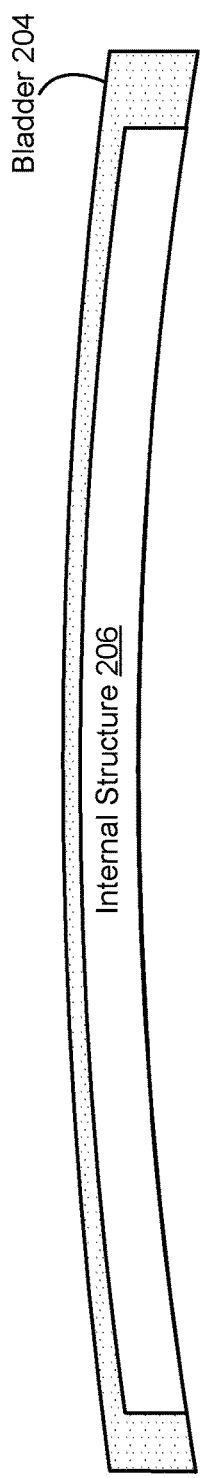
Figure 4C:
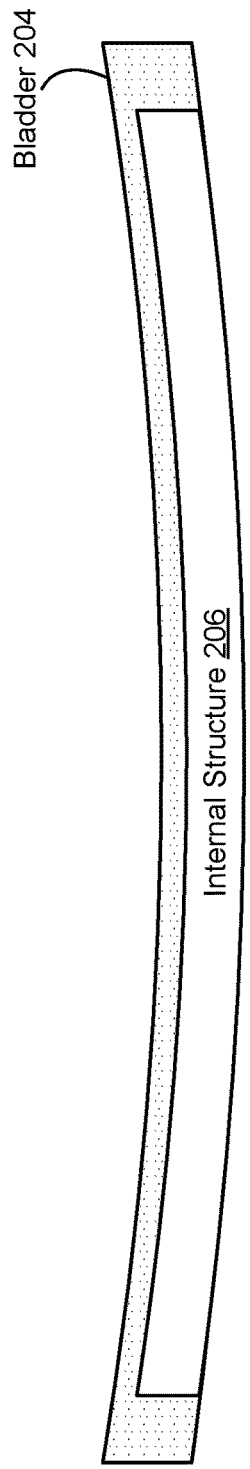

FIGS. 4A-4C show different shapes taken by the representative pod 122 of FIGS. 3A-3B in accordance with some embodiments. In particular, the different shapes are taken when the representative pod 122 is in a pressurized state. When the representative pod 122 is at atmospheric pressure, the representative pod 122 is flexible and does not encumber free movement of the user. For example, if the wearable device 120 is a glove worn on the user's right hand and the representative pod 122 is coupled to the user's right index finger, the representative pod 122 does not encumber free movement of the user's fight index finger at atmospheric pressure (i.e., dexterity is maintained). However, with reference to FIG. 4A, when the representative pod 122 is in the pressurized state (e.g., pressure in the bladder 204 of the representative pod 122 increases from the atmospheric pressure to some pressure value), the representative pod 122 becomes less flexible (and in some cases rigid) and holds the planar shape. In other example, with reference to FIG. 4B, when the representative pod 122 is in the pressurized state, the representative pod 122 curves in a first direction (e.g., curves upwards). In other example, with reference to FIG. 4C, when the representative pod 122 is in the pressurized state, the representative pod 122 curves in a second direction different from the first direction (e.g., curves downwards).

A shape of the representative pod 122 in the pressurized state may be dictated by fabrication of the representative pod 122, and in particular, fabrication of the representative pod's 122 internal structure 206. For example, with reference to FIG. 4A, the representative pod 122 may be fabricated in such a way that when pressurized above a threshold pressure, the internal structure 206 of the representative pod 122 takes the planar shape. Similarly, with reference to FIGS. 4B and 4C, the representative pod 122 may be fabricated in such a way that when pressurized above a threshold pressure, the internal structure 206 of the representative pod 122 curves in a predetermined direction (e.g., upwards or downwards). In this way, a pod stack 410 (FIG. 4D) can be formed that includes the representative pods 122 illustrated in FIGS. 4A-4C. The pod stack 410 can arrange the three pods 122 such that the pods on opposing ends of the pod stack 410 curve in opposite directions, when pressurized, and the pod 122 that remains planar when pressurized is the middle pod. In such an arrangement, the pod stack 410 is configured to provide at least three different haptic stimulations (e.g., (i) curve, say, the user's right index finger in a first direction, (ii) straighten the user's right index finger, and (iii) curve the user's right index finger in a second direction opposite the first direction). In some embodiments, each pod 122 in the pod stack 410 is pneumatically coupled with the pneumatic device 210 (FIG. 2). In this way, the controller 214 can control a pressurized state of each pod 122 in the pod stack 410 individually. For example, the controller 214 can pressurize a first pod 122 in the pod stack 410 while the other pods 122 in the pod stack 410 remain at atmospheric pressure, as shown in pod stack 420. Internal structures 206 are discussed in further detail below.

Although not shown, in some embodiments, the representative pod 122 may be fabricated in such a way that when pressurized above a threshold pressure, the internal structure 206 of the representative pod 122 increases in height (i.e., thickness), along with becoming planar or curved. Variable Z-height internal structures are discussed below with reference to FIGS. 7B-7C and 8A-8D.

FIGS. 5-8D illustrate various examples of the internal structure 206 in accordance with some embodiments. It is noted that the examples below may be used together such that a representative wearable device 120 may include pods 122 with different internal structures 206. This is particular useful as some examples discussed below are better suited for certain haptic stimulations.

Figure 5:
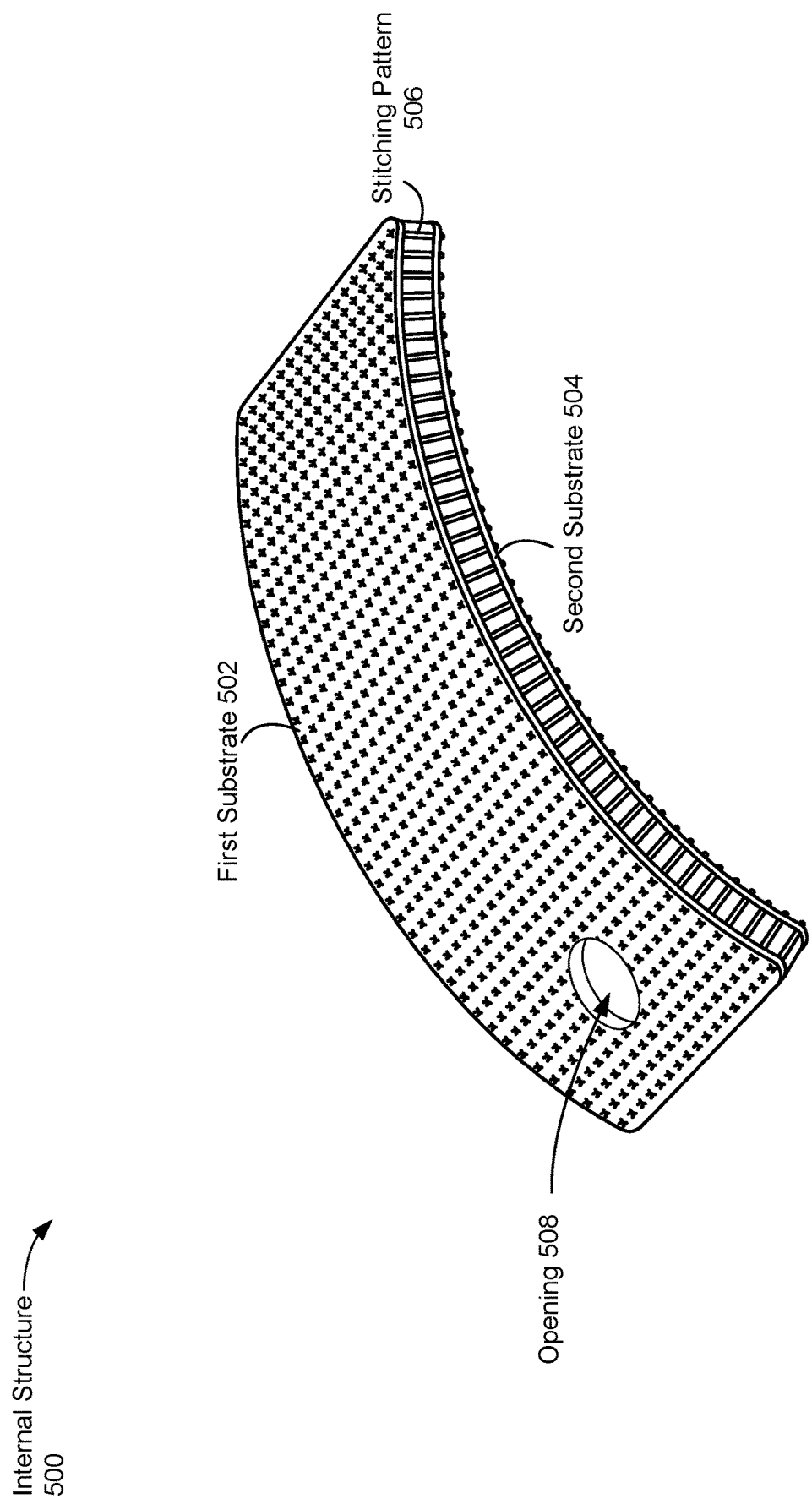
FIG. 5 shows a drop-stitch internal structure in accordance with some embodiments.

FIG. 5 shows a drop-stitch internal structure 500 in accordance with some embodiments. The internal structure 500 includes first and second substrates 502 and 504 connected through and separated by a predefined stitching pattern 506 (e.g., a drop stitch pattern). The first and second substrate 502 and 504 are made from flexible materials, which may be the same or different materials. Accordingly, the first and second substrate 502 and 504 do not encumber free movement of the user when a bladder 204 housing the internal structure 500 is unpressurized (e.g., the internal structure 500 may be included in a pod 122 that contacts one of the user's fingers). In those embodiments where the materials differ, the first substrate 502 may be a static (i.e., inelastic, inextensible flexible) material while the second substrate 504 may be a dynamic (i.e., elastic) material (or vice versa).

The predefined stitching pattern 506 is formed by stitching one or more threads between and through the first and second substrates 502 and 504. For example, the first and second substrates 502 and 504 each includes opposing top and bottom surfaces, and the predefined stitching pattern 506 goes through the top and bottom surfaces of the first substrate 502, extends through the space separating the first and second substrates 502 and 504, and then goes through the top and bottom surfaces of the second substrate 504. This process is repeated in reverse (e.g., stitching 506 goes through the second substrate 504 to the first substrate 502), and then repeated many times to create the entire predefined stitching pattern 506. Thread(s) used to create the predefined stitching pattern 506 may be made from an elastic or inelastic material (or some combination thereof). In some embodiments, a single thread is used to the create the predefined stitching pattern 506, while in some other embodiments multiples threads are used. Further, density of the stitching, tension of the stitching, and elongation of the stitching are factors effecting properties of the predefined stitching pattern 506. For example, a predefined stitching pattern 506 with taut, densely packed stitches may be more rigid relative to a predefined stitching pattern 506 with elastic, sparse stitches, whether pressurized or unpressurized.

In some embodiments, the internal structure 500 is fabricated in a planar geometry, such that the predefined stitching pattern 506 is formed while the first and second substrates 502 and 504 are flat. Alternatively, in some embodiments, the internal structure 500 is fabricated in a non-planar geometry (e.g., using a curved jig), such that the predefined stitching pattern 506 is formed while the first and second substrates 502 and 504 are curved, e.g., as shown in FIG. 5. Whichever the case, the internal structure 500 is able to bend while the bladder 204 housing the internal structure 500 is unpressurized (e.g., at atmospheric pressure) because the first and second substrates 502 and 504 and the thread(s) used to the create the predefined stitching pattern 506 are made from flexible materials. Furthermore, the predefined stitching pattern 506 is configured to allow the first and second substrates 502 and 504 to flex in at least one direction (e.g., the first and second substrates 502 and 504 can at least curl more upwards (or downwards) when the bladder 204 housing the internal structure 500 is unpressurized).

However, once the bladder housing the internal structure 500 is in a pressurized state (e.g., the pneumatic device 210 increases the pressure inside the bladder 204 of the internal structure 500), the internal structure 500 takes (or attempts to take) its fabricated geometry (e.g., planar or non-planar geometry). This result occurs because the pressure inside the bladder causes the internal structure 500 to take a shape of least resistance. Further, in the embodiments where the fabricated geometry is non-planar, the predefined stitching pattern 506 may prevent the internal structure 500 from becoming planar, and in some cases, causes the internal structure 500 to curl instead of becoming planar. To illustrate, if the internal structure 500 is positioned near a palmar part of the user's right index finger and if the user's right index finger is curled (i.e., more curled than the shape of the internal structure 500 in FIG. 5), then the user may feel his or her right index finger straighten by some degree (i.e., become less curved) when pressure inside the bladder increases. Depending on a posture of the user's right index finger when the pressure inside the bladder is increased, the user may experience his or her finger becoming stiff and rigid, bending downwards, or bending upwards (e.g., pushing and pulling sensations).

Thus, the predefined stitching pattern 506 in a first instance of the internal structure 500 (e.g., fabricated in a planar shape) may be configured to make the internal structure 500 take a shape when the bladder housing the internal structure 500 is pressurized. Further, the predefined stitching pattern 506 in a second instance of the internal structure 500 (e.g., fabricated in a curved shaped), which is different from the predefined stitching pattern 506 in the first instance of the internal structure 500, may be configured to make the internal structure 500 take a different shape when the bladder housing the second instance of the internal structure 500 is pressurized. As noted above, the density of the stitching 506, the tension of the stitching 506, and the elongation of the stitching 506 influence the shape taken by the internal structure 500 when the bladder housing the internal structure 500 is pressurized. For example, when the predefined stitching pattern 506 is fabricated in a curved geometry, the predefined stitching pattern 506 becomes strained when the internal structure 500 is not in the curved geometry. In some instances, the strain in the predefined stitching pattern 506 may help the internal structure 500 return to the curved geometry when the bladder housing the internal structure 500 is pressurized. Furthermore, if the thread used in the predefined stitching pattern 506 is elastic, then the elasticity of the thread (e.g., if strained) can also help the internal structure 500 return to the curved geometry when the bladder housing the internal structure 500 is pressurized.

Material properties (e.g., elastic versus inelastic) of the first and second substrates 502 and 504 can also contribute to the shape taken by the internal structure 500. For example, if the first substrate 502 forms a top of the internal structure 500, and the first substrate 502 is highly elastic relative to the elasticity of the second substrate 504, then the internal structure 500 may be configured to curve (i.e., curl) in a first direction when the bladder housing the internal structure 500 is pressurized, i.e., is in a pressurized state. This result occurs because the first substrate 502 bulges away from the second substrate 504, at least partially, when in the pressurized state. In some instances, the second substrate 504 is pulled upwards by the predefined stitching pattern 506 when the first substrate 502 bulges. Conversely, when the first substrate 502 is highly inelastic relative to an elasticity of the second substrate 504, then the second substrate 504 may be configured to curve in a second direction opposite the first direction when the bladder housing the internal structure 500 is pressurized. This result occurs because the second substrate 504 bulges away from the first substrate 502, at least partially, when in a pressurized state. In some instance, the first substrate 502 is pulled downwards by the predefined stitching pattern 506 when the second substrate 504 bulges.

The inelastic substrate may be configured to curve a predefined amount (e.g., when ends of the inelastic substrate are fixed). Thus, the inelastic substrate limits the flex of the elastic substrate. In some embodiments, the predefined amount of curve is dependent upon, at least partially, the lengths of the first and second substrates 502 and 504. For example, when the lengths are substantially the same, a first predefined amount of curve is obtained, whereas when the lengths differ (e.g., the first substrate 502 is longer than the second substrate 504), a second predefined amount of curve, greater than the first predefined amount of curve, is obtained. Accordingly, a difference in lengths between the first and second substrates 502 and 504 factors into an overall flex of the internal structure 500. The differences in length, if any, may be determined based on the pods 122 placement on the user's body (e.g., the predefined amount of curve matches, or is less than, a finger's range of motion in one or more directions). Other considerations include differences in modulus of elasticity of the substrates, if any, and properties (e.g., tension, density, and elongation) of the predefined stitching pattern 506, as discussed above. In some embodiments, the predefined amount of curve is dependent upon, at least partially, a hardness difference (e.g., a durometer difference) between the first and second substrates 502 and 504, which can be measured using a durometer. Varies measures of hardness can be used depending on the material of the first and second substrates 502 and 504 (e.g., polymers, fabrics, etc.).

The internal structure 500 may also define an opening 508, which is sized to accommodate a valve 302-A. The opening 508 may be aligned with an opening in the bladder 204 (e.g., concentric openings).

Figure 6:
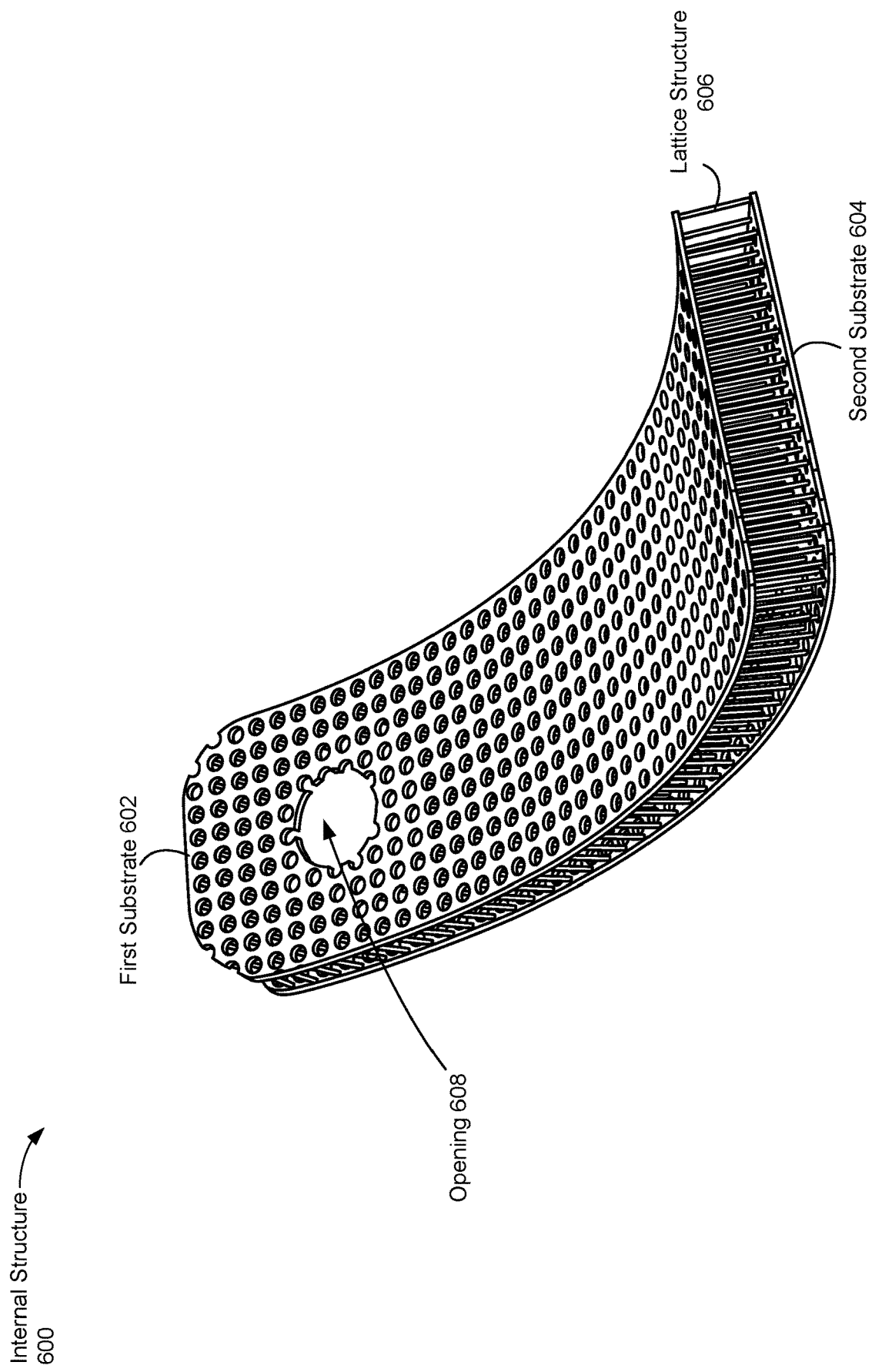
FIG. 6 shows a three-dimensional (3D) printed internal structure in accordance with some embodiments.

FIG. 6 shows a three-dimensional (3D) printed internal structure 600 in accordance with some embodiments. The internal structure 600 includes first and second substrates 602 and 604 connected through and separated by a predefined lattice structure 606. The first and second substrates 602 and 604 are made from flexible materials, which may be the same or different materials. Accordingly, the first and second substrates 602 and 604 do not encumber free movement of the user when a bladder 204 housing the internal structure 600 is unpressurized. In the embodiments where the materials differ, the first substrate 602 may be a static (i.e., inelastic and inextensible) material while the second substrate 604 may be a dynamic (i.e., elastic) material (or vice versa).

The first substrate 602, the second substrate 604, and the predefined lattice structure 606 are created using a 3D printer. In some embodiments, a fused deposition modeling (FDM) process is used to create the internal structure 600; however, various other 3D printing techniques/processes can also be used. The internal structure 600 may be made from various flexible thermoplastic materials, such as rubber, TPU, aliphatic polyamides (nylon), and the like. The internal structure 600 may also be made from, at least partially, a carbon-based material (e.g., PR 40 carbon or the like). In some embodiments, the first and second substrates 602 and 604 and the predefined lattice structure 606 are made from the same material(s). Alternatively, in some embodiments, the first and second substrates 602 and 604 are made from a first material and the predefined lattice structure 606 is made from a second material different from the first material. In this way, certain mechanical properties can be achieved by the substrates while different mechanical properties can be achieved by the predefined lattice structure 606. As noted above, the first and second substrates 602 and 604 can be made from different materials as well.

Like the internal structure 500, the internal structure 600 may be fabricated in planar or non-planar geometries, and the internal structure 600 is able to bend while the bladder housing the internal structure 600 is unpressurized (e.g., at atmospheric pressure: the unpressurized state). This is possible because the internal structure 600 is printed from, at least partially, flexible materials, and as a result, the internal structure 600 is configured to flex in at least one direction (e.g., the internal structure 600 can at least curl more upwards or downwards (or both) when the bladder housing the internal structure 600 is unpressurized). However, once the bladder housing the internal structure 600 is pressurized (e.g., the pneumatic device increases the pressure inside the bladder the internal structure 500 to some pressure value), the internal structure 600, and in particular the predefined lattice structure 606, takes its fabricated geometry (e.g., planar or non-planar geometry). This result occurs because the pressure inside the bladder causes the 3D printed internal structure 600 to take a shape of least resistance. Further, in the embodiments where the fabricated geometry is non-planar, the predefined lattice structure 606 prevents the internal structure 600 from becoming planar, and in some cases causes the internal structure 600 to curl instead of becoming planar, as explained above with reference to FIG. 5.

Thus, the predefined lattice structure 606 in a first instance of the internal structure 600 may be configured to make the internal structure 600 take a shape when the bladder housing the internal structure 600 is pressurized, i.e., in a pressurized state. Further, the predefined lattice structure 606 in a second instance of the internal structure 600, which is different from the predefined lattice structure 606 in the first instance of the internal structure 600, may be configured to make the internal structure 600 take a different shape when the bladder housing the second instance of the internal structure 600 is pressurized. A design of the predefined lattice structure 606 influences the shape taken by the internal structure 600 when the bladder housing the internal structure 600 is pressurized. For example, when the predefined lattice structure 606 is fabricated in a curved geometry, the predefined lattice structure 606 becomes strained when the internal structure 600 is not in the curved geometry. In some instances, the strain in the predefined lattice structure 606 helps the internal structure 600 return to the curved geometry when the bladder housing the internal structure 600 is pressurized. Furthermore, if the material used to create the predefined lattice structure 606 has elastic properties (e.g., a low modulus of elasticity), then the elasticity of the material (e.g., if strained) can also help the internal structure 600 return to the curved geometry when the bladder housing the internal structure 600 is pressurized.

Material properties (e.g., elastic versus inelastic) of the first and second substrates 602 and 604 can contribute to the shape taken by the internal structure 600. Elastic and inelastic properties of substrates are discussed in detail above with reference to FIG. 5. The internal structure 600 may also define an opening 608, which is sized to accommodate a valve 302-A. The opening 608 may be aligned with an opening in the bladder 204 (e.g., concentric openings).

In some embodiments, a cross-section of the predefined stitching pattern 506 and/or the predefined lattice structure 606 is uniform. Alternatively, in some embodiments, the cross-section of the predefined stitching pattern 506 and/or the predefined lattice structure 606 changes across a length and/or width of the patterns. In doing so, the predefined stitching and lattice patterns 506, 606 can provide stiffness to certain parts of the user's body (e.g., pads of the right index finger), while also providing flexibility to other parts of the user's body (e.g., joints separating the pads of the right index finger).

Figure 7A:
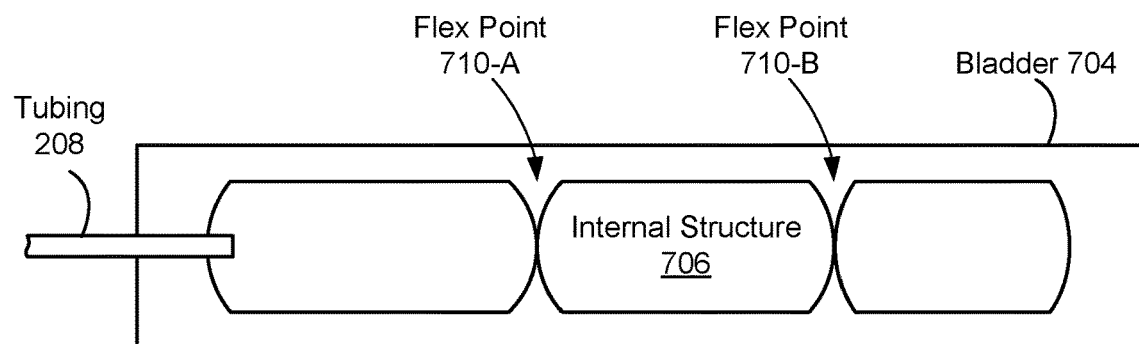
FIG. 7A shows an internal structure that is shaped in a predefined manner in accordance with some embodiments.

FIG. 7A shows an internal structure 706 that is shaped in a predefined manner in accordance with some embodiments. The internal structure 706 is an example of the internal structure 206 identified in FIG. 2. The representative pod 122 shown may be attached to a palmar portion of a user's finger, although the shaped internal structures discussed herein are not limited to this portion of the body. The internal structure 706 of the pod 122 includes a plurality of shape portions (e.g., three shaped portions), where each of the shaped portions in shaped to match a shape of a corresponding portion of the user's finger (i.e., match one of the finger pads). Further, the internal structure 706 narrows at flex points 710-A, 710-B (i.e., joints) of the user's finger. The purpose of the narrowing is to increase freedom of movement of the user's finger. In this way, the internal structure 706 is less noticeable to the user as it does not encumber free movement of the finger's joints when the bladder 704 is unpressurized. When the bladder 704 is pressurized, however, the flex points 710-A and 710-B become less flexible, and a haptic stimulation is experienced by the user (the plurality of shaped portions also become less flexible).

In some embodiments, another instance of the internal structure 206 includes first and second substrates connected through and separated by a spun filament mesh. The filament mesh (and in some cases, the first and second substrates) is a fabric (e.g., a PolySpun fabric), which allows the internal structure to vary its Z-height depending on a pressure inside the bladder 204 housing the internal structure 206. For example, with reference to FIG. 7B, when the bladder 204 housing the internal structure 716 is unpressurized, the internal structure 716 has a first thickness (T1). However, now with reference to FIG. 7C, when the bladder housing the internal structure 716 is pressurized, the internal structure 716 has a second thickness (T2) greater than the first thickness (T1). In the pressurized state, the pressurized medium is fed into the region separating the first and second substrates and pushes the substrates away from each other. The filament mesh is configured to stretch an amount during this process, thereby allowing the internal structure 716 to vary its Z-height. A magnitude of the change in Z-height in dependent on a magnitude of the pressure inside the bladder 206 (e.g., greater pressure results in a greater change in Z-height) and material properties of the filament mesh. If the pressure inside the bladder housing the internal structure 716 exceeds a maximum allowable pressure, then portions of the filament mesh may plastically deform (i.e., the filament mesh will not return to its pre-stretched length).

It is noted that the predefined stitching pattern 506 of the internal structure 500 may also be stitched in such a way that variable Z-height can be achieved in the internal structure 500. For example, lengths of the predefined stitching pattern 506 may vary at predefined positions so that portions of the predefined stitching pattern 506 extend to one or more heights when the internal structure 500 is in the pressurized state. Additionally, the predefined stitching pattern 506 may be made from elastic materials. Furthermore, the predefined lattice structure 606 may also be made from elastic materials that allow portions of the predefined lattice structure 606 to extend to one or more heights when the internal structure 600 is in the pressurized state.

Figure 7B:
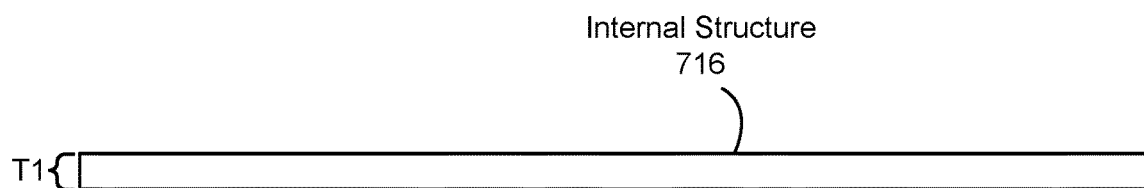
FIGS. 7B-7C show an internal structure with a variable Z-height in accordance with some embodiments.
Figure 7C:
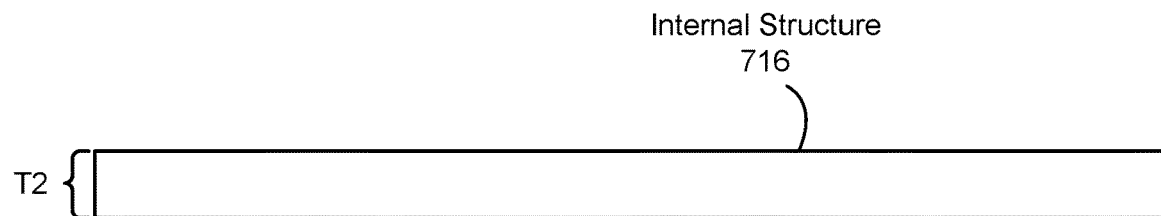

FIGS. 8A-8D illustrate various examples of nested internal structures in accordance with some embodiments. The internal structures described below are examples of the internal structure 206. Additionally, the internal structures described below may use a predefined stitching pattern (FIG. 5), a predefined lattice structure (FIG. 6), or a filament mesh (FIGS. 7B-7C).

Figure 8A:
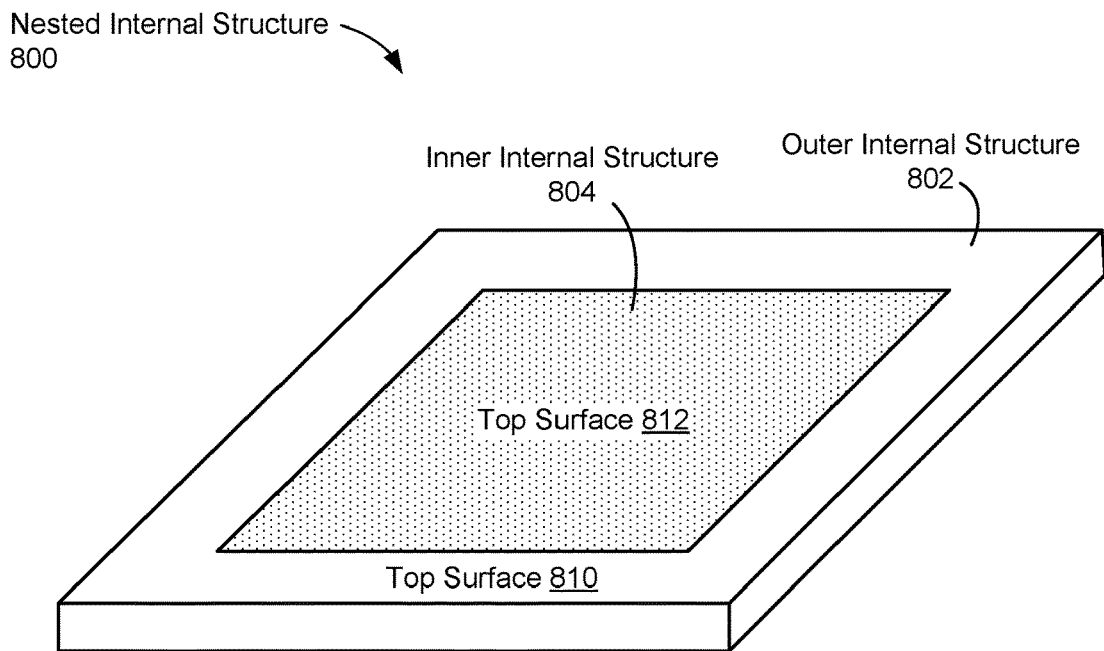
FIGS. 8A-8D show various examples of nested internal structures in accordance with some embodiments.
Figure 8B:
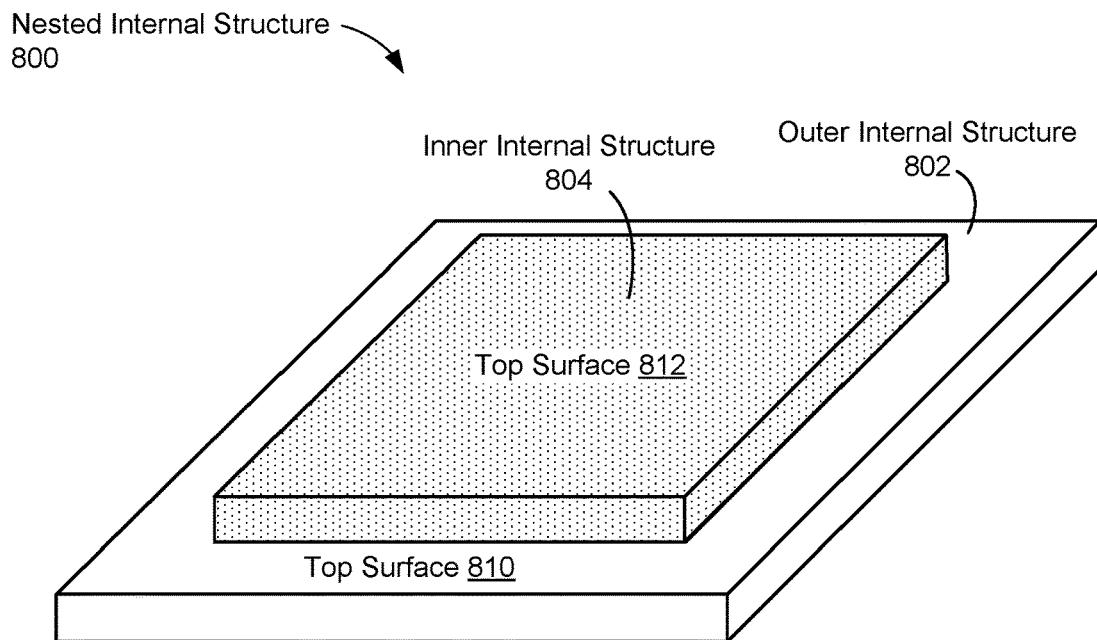

FIG. 8A shows a nested internal structure 800 in an unpressurized state (i.e., a bladder 204 housing the nested internal structure 800 is unpressurized) (or the nested internal structure 800 is pressurized to a first pressure). The nested internal structure 800 includes an outer internal structure 802 and an inner internal structure 804. The outer internal structure 802 defines an opening 806 (FIG. 8C) and the inner internal structure 804 is disposed inside the opening 806 (i.e., nested inside the opening 806). FIG. 8B shows the nested internal structure 800 in a pressurized state (i.e., the bladder 204 housing the nested internal structure 800 is pressurized to some pressure level above atmospheric pressure) (or the nested internal structure 800 is pressurized to a second pressure greater than the first pressure). In the pressurized state (or at the second pressure), the inner internal structure 804 extends above a top surface 810 of the outer internal structure 802. In doing so, a top surface 812 of the inner internal structure 804 may apply pressure/force to a portion of the user's body while the outer internal structure 802 may apply pressure/force to a different portion of the user's body (or may not apply pressure at all). This configuration is particularly useful with curved portions of the user's body, such as the palm (e.g., when a posture of the hand causes the palm to curve) and fingers. For example, when a finger of the user is curved, a nested internal structure 800 may vary its Z-height to press against an apex of the curved finger. Put another way, when pressurized at the first pressure, respective top surfaces of the inner and outer internal structures 804, 802 contact a first portion of a user's body, where the contact has a first surface area (e.g., contacting two finger pads). Further, pressurized at the second pressure, the top surface 812 of the inner internal structure 804 and/or the top surface 810 of the outer internal structure 802 contact a second portion of the user's body, where the contact has a second surface area different from the first surface area (e.g., contacting a single finger pad). Thus, by varying the pressure, the nested internal structure 800 is able to apply pressure/force of different sizes to different (or the same) parts of the body.

In some instances, even when in the pressurized state, the inner internal structure 804 does not extend above the top surface 810 of the outer internal structure 802. Put another way, the pressure inside the bladder 204 housing the nested internal structure 800 has to exceed a threshold pressure for the inner internal structure 804 to extend above the top surface 810 of the outer internal structure 802. For example, when the pressure inside the bladder 204 housing the nested internal structure 800 is a first pressure, the outer internal structure 802 and the inner internal structure 804 may become less flexible, and as a result, the user may experience a haptic stimulation. However, when at the first pressure, the outer internal structure 802 and the inner internal structure 804 remain substantially planar (e.g., the top surface 812 of the inner internal structure 804 and the top surface 810 of the outer internal structure 802 are coplanar). Continuing, when the pressure inside the bladder 204 housing the nested internal structure 800 is increased to a second pressure greater than the first pressure, the inner internal structure 804 may extend from the top surface 810 of the outer internal structure 802 by a first distance. Once in this arrangement, the user may experience a different haptic stimulation (e.g., a pushing stimulation). Although not shown, in some embodiments, when the pressure inside the bladder 204 housing the nested internal structure 800 is increased to the second pressure greater than the first pressure, the outer internal structure 802 may extend from the top surface 812 of the inner internal structure 804 by a first distance. The expansion of the nested internal structure 800 is based on a material used and a placement of said material, as discussed above with reference to FIGS. 5, 6, and 7B-7C.

Further (at least in some embodiments), when the pressure inside the bladder 204 housing the nested internal structure 800 is increased to a third pressure greater than the second pressure, the inner internal structure 804 may extend from the top surface 810 of the outer internal structure 802 by a second distance greater than the first distance. Once in this arrangement, the user may experience a more intense haptic stimulation (e.g., a more forceful pushing stimulation). Alternatively or in addition, when the pressure inside the bladder 204 housing the nested internal structure 800 is the third pressure, the inner internal structure 804 and the outer internal structure 802 may become more rigid, which is another haptic stimulation experienced by the user. A magnitude of the pressure inside the bladder is determined, at least in some embodiments, by the computer system 130 (FIG. 1), based on information collected by the sensors 114 and/or the sensors 124, as explained above. The computer system 130 may also determine the magnitude of the pressure inside the bladder based on media content of the applications 132 (e.g., cold environment example from FIG. 1).

Figure 8C:
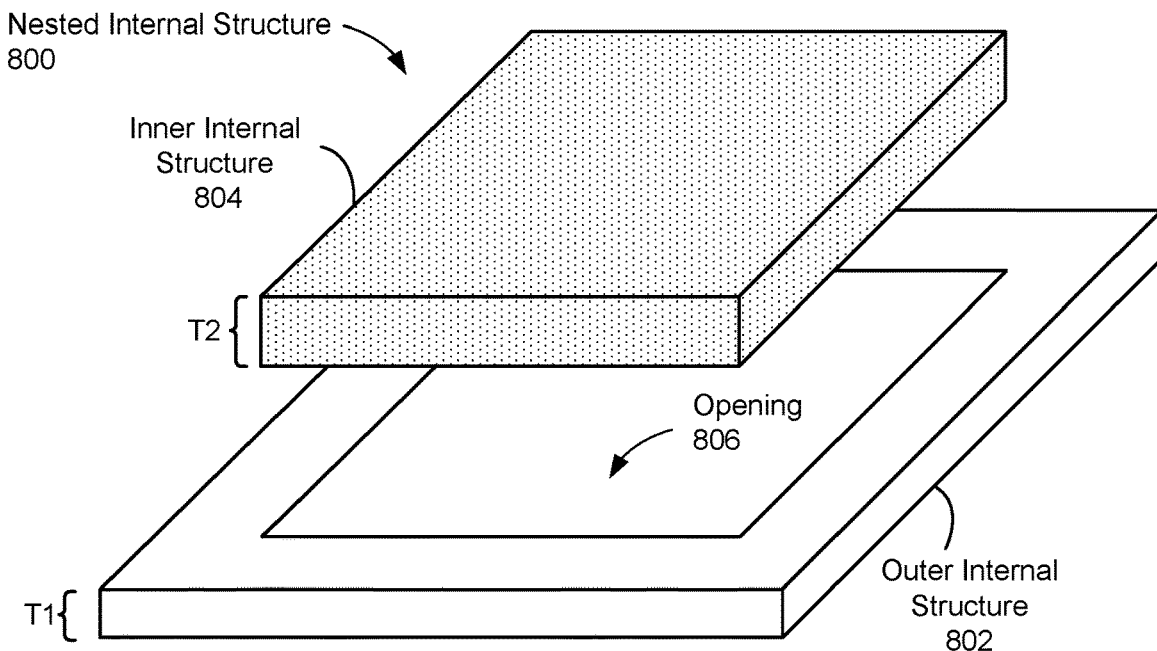
Figures 9A, 9B:
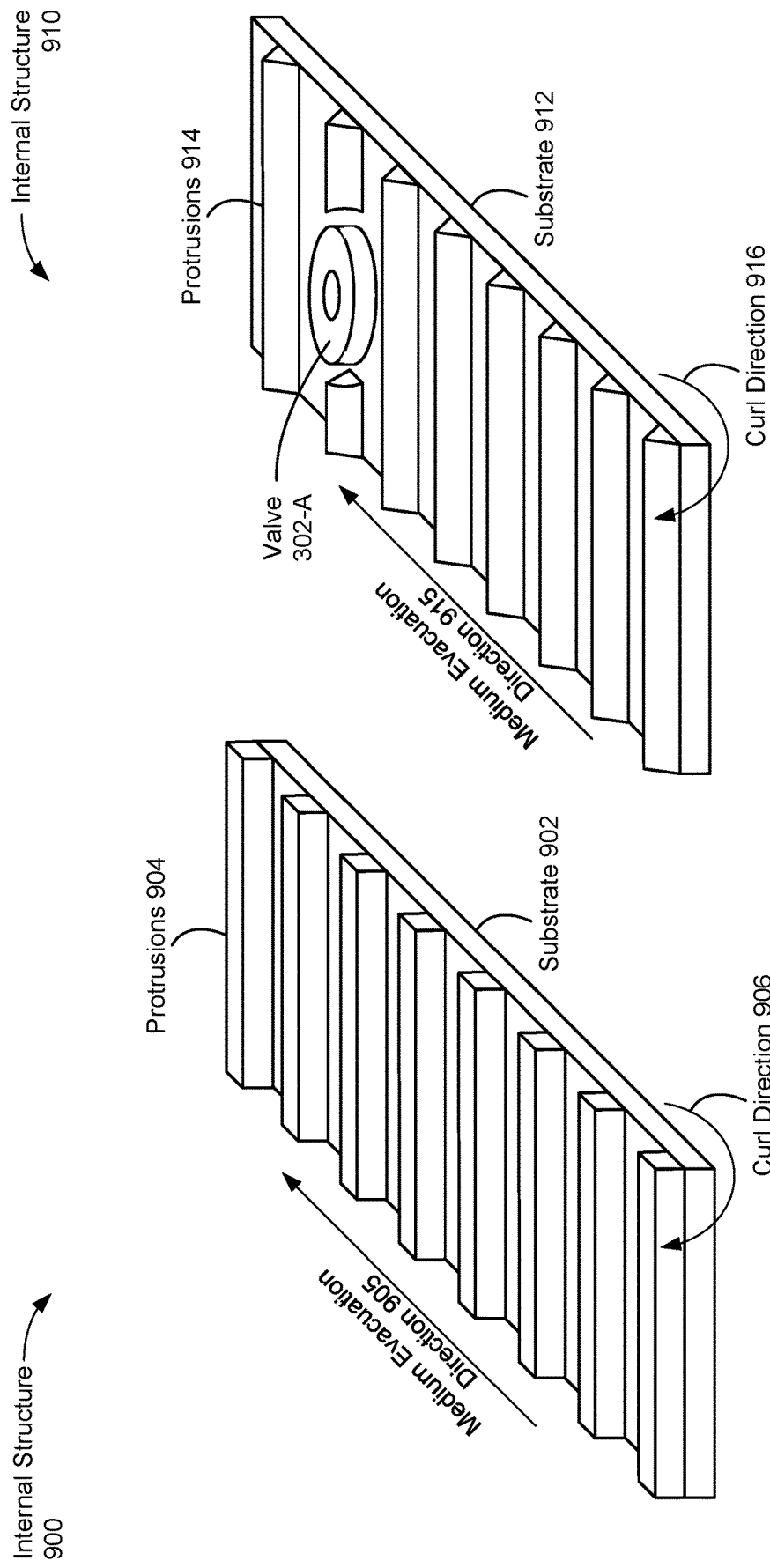
FIGS. 9A-9C show various examples of a curling internal structure in accordance with some embodiments.
Figure 9D:
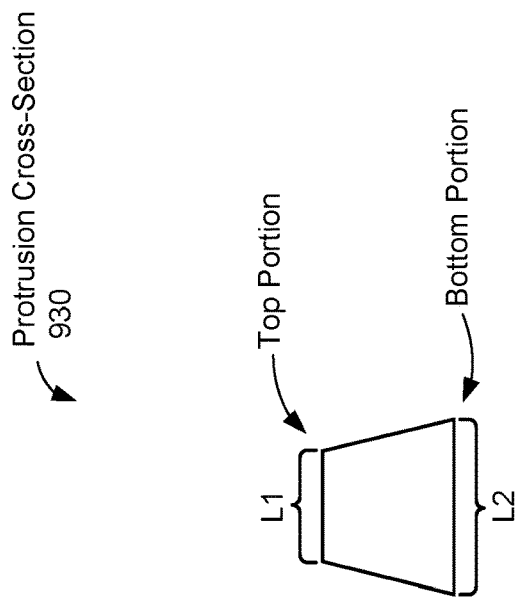
FIG. 9D shows a representative cross-section of a protrusion in accordance with some embodiments.
Figure 9C:
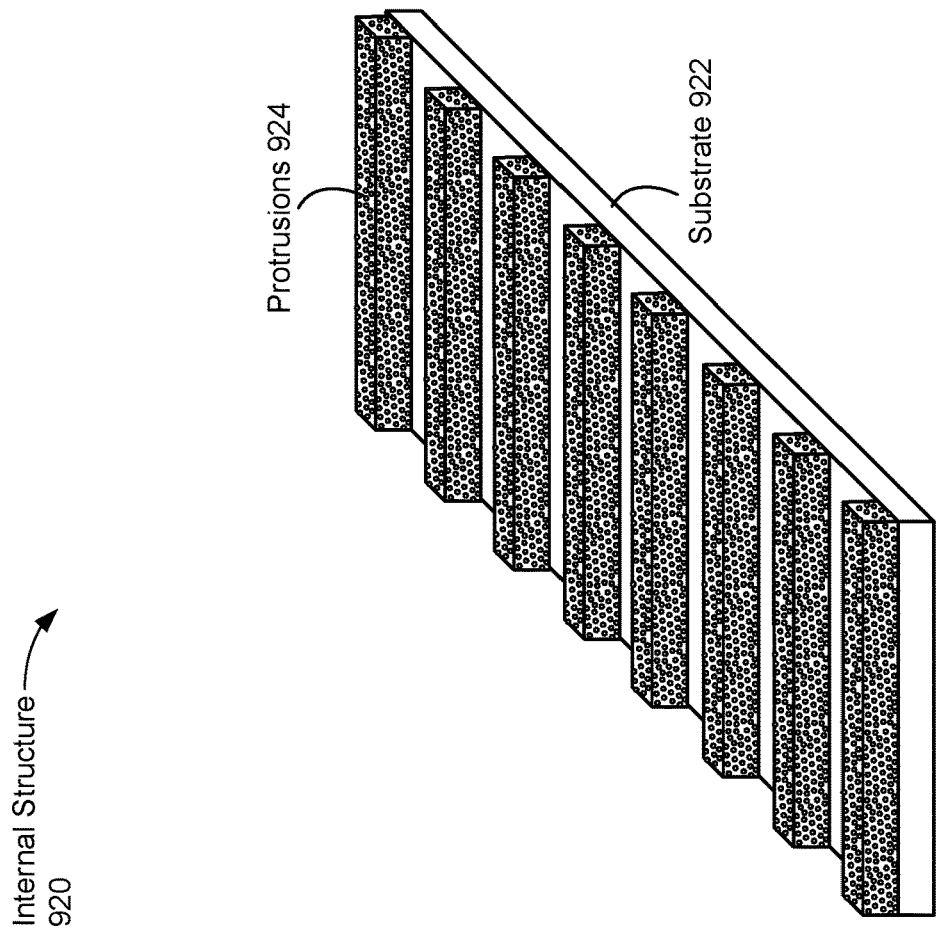

FIG. 8C shows an exploded view of the nested internal structure 800 in the pressurized state (or at the second pressure greater than the first pressure). As shown, in the pressurized state, the outer internal structure 802 has a first thickness (T1), and the inner internal structure 804 has a second thickness (T2) greater than the first thickness (T1). Although not discussed above, a thickness of the outer internal structure 802 may also increase once in the pressurized state, but the amount of increase is (generally) less than the amount of increase in thickness of the inner internal structure 804. As discussed above, a thickness of the outer internal structure 802 and the inner internal structure 804 is dependent on the pressure inside the bladder 204 housing the two internal structures. In this way, various pressure levels inside the bladder 204 can be used to tailor a resulting haptic stimulation. Put another way, thicknesses of the outer internal structure 802 and the inner internal structure 804 are substantially proportional to the pressure inside the bladder 204 housing the two internal structures. Thus, it follows that a surface area of the user contacted by the nested internal structure 800 can be inversely proportional to the pressure inside the bladder 204 housing the two internal structures (e.g., as pressure increases, the surface area of the user contacted by the nested internal structure 800 decreases, becoming more granular).

Figure 8D:
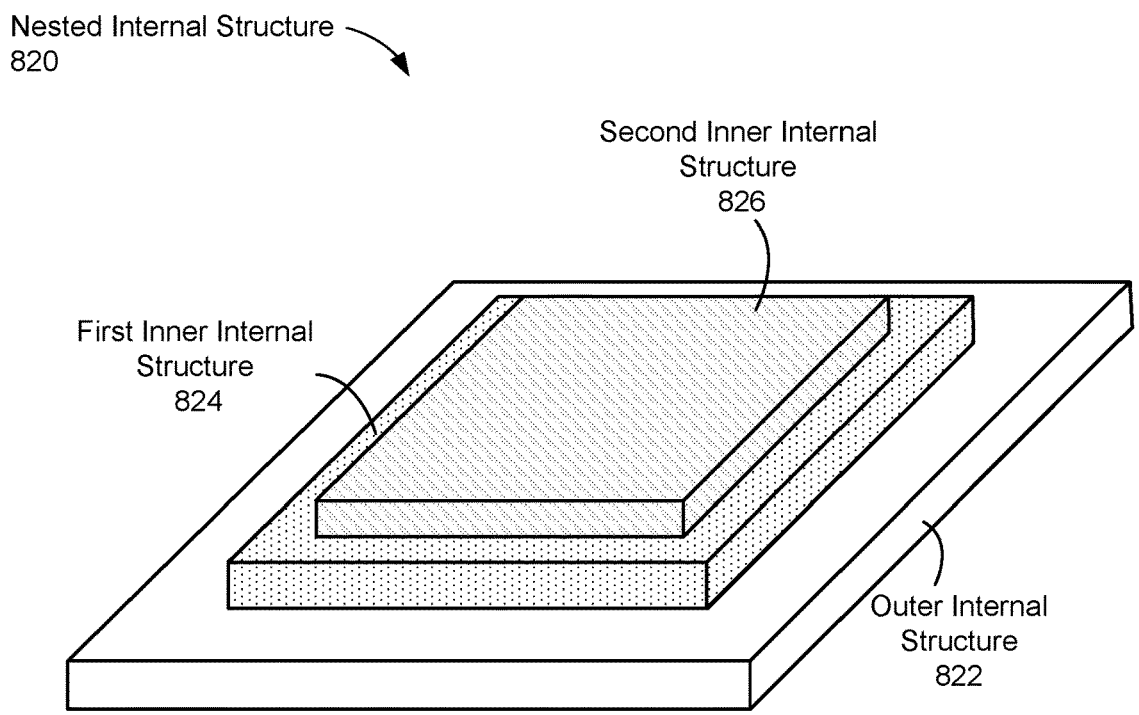

FIG. 8D shows another nested internal structure 820 in a pressurized state. The nested internal structure 820 includes an outer internal structure 822, a first inner internal structure 824, and a second inner internal structure 826. Although not shown, the outer internal structure 822 and the first inner internal structure 824 each defines an opening (e.g., similar to opening 806) that is sized to receive the subsequent internal structure. For example, the outer internal structure 822 defines a first opening and the first inner internal structure 824 is disposed in the first opening (i.e., nested in the first opening). Further, the first inner internal structure 824 defines a second opening and the second inner internal structure 826 is disposed in the second opening (i.e., nested in the second opening). A longest dimension of the second opening is less than a longest dimension of the first opening. In this configuration, the nested internal structure 820 is configured to create at least three different levels, depending on a pressure insider a bladder housing the nested internal structure 820, as described above with reference to FIGS. 8A and 8B. It is noted that, in some embodiments, a thickness of the second inner internal structure 826 is greater than a thickness of the first inner internal structure 824, and the thickness the first inner internal structure 824 is greater than a thickness of the outer internal structure 822.

In some embodiments, the nested internal structures 800 and 820 are configured to create distinct levels (i.e., plateaus) when the pressure insider a bladder housing the nested internal structures reaches one or more predefined pressure thresholds, as discussed above. For example, the top surface 810 of the outer internal structure 802 defines a first level (e.g., a first plane) and the top surface 812 of the inner internal structure 804 defines a second level (e.g., a second plane) when a pressure inside the bladder satisfies a pressure threshold (e.g., a predefined pressure value above atmospheric pressure). Alternatively, the nested internal structures 800 and 820 may be designed to feather the outer and inner internal structures together. In this way, the nested internal structures 800 and 820 are configured to create mounds at different heights depending on the pressure inside the bladder (e.g., the distinct levels of the nest internal structure 820 are feathered together to create a mound).

FIGS. 9A to 9C illustrate various examples of the internal structure 206 in accordance with some embodiments. It is noted that the example internal structures discussed below may be use together such that a representative wearable device 120 may include pods 122 with several different internal structures. Additionally, one or more of the example internal structures explained below may be incorporated into a wearable device 120 that also includes one or more of the examples internal structures discussed above in FIGS. 5 to 8A.

FIGS. 9A and 9B illustrate two internal structures 900 and 910 with differently shaped protrusions 904 and 914 (e.g., rectangular and triangular protrusions). The internal structures 900 and 910 are configured to flex/bend when the bladders 204 housing the internal structures 900 and 910 are unpressurized (e.g., at atmospheric pressure). This is possible because substrates 902 and 912 of the internal structures 900 and 910 are made from flexible materials (e.g., TPU and the like). Further, the internal structures 900 and 910 are configured to curve (e.g., curl) when a bladder housing of the internal structures 900 and 910 is pressurized (e.g., take a predetermined curved shape). This result occurs due to a medium (e.g., air) interacting with a geometry of the protrusions 904 and 914 when the medium is evacuated from the bladder 204 (e.g., medium evacuation directions 905 and 915). For example, when the medium is evacuated from the bladder (e.g., via the valve 302-A) housing the internal structure 910, some of the medium travels over the top portions of the protrusions 914 towards the evacuation point (i.e., the valve 302-A), while some of the medium remains caught between the protrusions 914. As a result, the top portions of the protrusions 914 are pulled towards the evacuation point, and because the protrusions 914 are attached to the substrate 912, the substrate 912 curls towards the evacuation point (e.g., curl direction 916). A similar result occurs when the medium is evacuated from a bladder housing the internal structure 900.

The magnitude of an internal structure's curvature can be controlled based on several factors, including but not limited to: the shape, the size, and the spacing of the protrusions. For example, with reference to FIG. 9D, which is a cross-sectional view 930 of a representative protrusion, the internal structure's curvature can be increased by increasing a difference between the length (L1) of the top portion of the protrusion and the length (L2) of the bottom portion of the protrusion. Put another way, an internal structure's potential curvature can be increased by reducing the top length L1 relative to the bottom length L2 (e.g., a triangular protrusion maximizes the internal structure's potential curvature in a direction). Conversely, the internal structure's curvature can be decreased, and perhaps eliminated, by reducing a difference between the top length L1 of the top portion of a protrusion and the bottom length L2 of the bottom portion of the protrusion.

In some embodiments, material properties of the bladder 204 also contribute to the curl of the internal structures 900 and 910. For example, one half of the bladder 204 may be highly elastic relative to an elasticity of the other half of the bladder 204. In such an arrangement, the elastic half of the bladder 204 may curl when the medium is evacuated from the bladder or bow when the medium is added to the bladder. Material properties of the bladder 204 are discussed in further detail below with reference to FIGS. 10E-1 to 10E-3.

FIG. 9C shows an example internal structure 920 with perforated protrusions 924 in accordance with some embodiments. As shown, the internal structure 920 includes a substrate 922 and a plurality of perforated protrusions 924 attached to (or integrally formed with) the substrate 922. The internal structure 920 behaves in a similar manner to the internal structures 900 and 910 in that the internal structure 920 can curve when a medium (e.g., air) is evacuated from a bladder 204 housing the internal structure 920. Additionally, a transition time between being unpressurized (e.g., at atmospheric pressure) and pressurized (e.g., some or all of the medium is evacuated) is reduced, relative to a transition time of the internal structures 900 and 910, by incorporating the perforated protrusions 924. For example, the medium between the perforated protrusions 924 can be evacuated from the internal structure 920 by traveling through the perforated protrusions 924, whereas in the internal structures 900 and 910, the medium either remains in the internal structures, or it is evacuated after the medium that travels over the top portions of the protrusions is evacuated. In some embodiments, an internal structure includes some perforated protrusions 924 and some unperforated protrusions. For example, protrusions furthest from the evacuation point (e.g., one or two protrusions) may be perforated to help air in those regions escape, as shown in FIG. 10E-1.

In some embodiments, the perforated protrusions 924 are made from a perforated polymer, such as a foam or the like. Alternately, in some embodiments, the perforated protrusions 924 are made from a braided hose material, which may be a polymer or organic fiber. The braided hose material is more collapsible relative to the perforated polymer. As such, a transition time of the braided hose material may be less than a transition time of the perforated polymer. It is further noted that various cross-sectional shapes of the perforated protrusions 924 can be used (e.g., circular, triangular, etc.), and the rectangular shape shown is used for ease of illustration and discussion. Further, due to a softness and collapsibility of the braided hose material, said braided material is crushable by a user while in the pressurized state, which provides a unique haptic stimulation to the user.

Figure 10A:
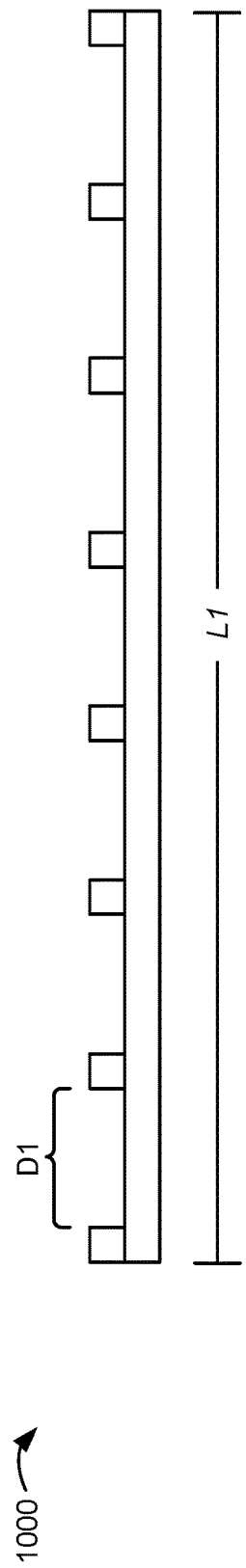
FIGS. 10A-10C show side views of an internal structure in accordance with some embodiments.
Figure 10B:
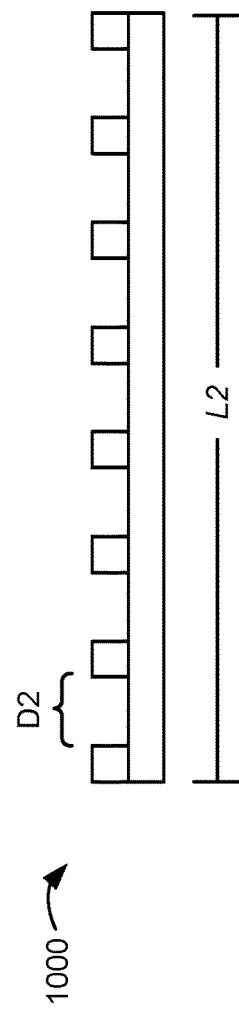
Figure 10C:
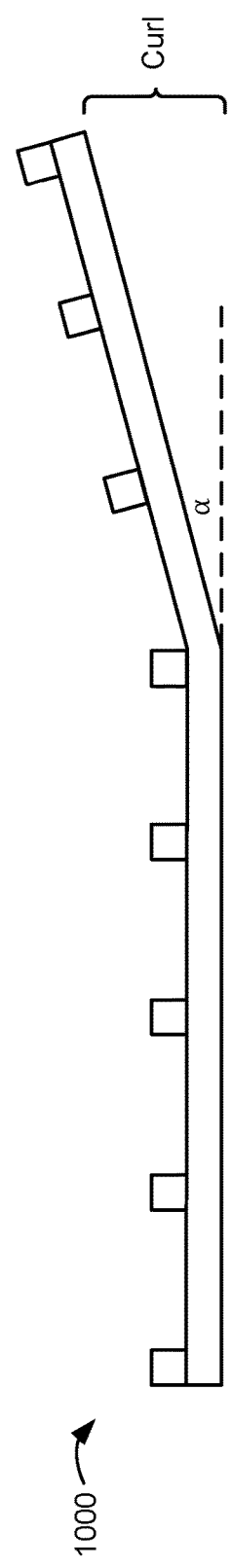

FIGS. 10A-10C illustrate side views of an internal structure 1000 in accordance with some embodiments. The internal structure 1000 may be an example of any of the internal structures discussed above with reference to FIGS. 9A-9C. FIG. 10A illustrates a side view of an internal structure 1000 in an unpressurized state. In the unpressurized state, the internal structure 1000 has a first length (L1), and protrusions of the internal structure 1000 are separated by a first distance (D1). FIG. 10B illustrates a side view of the internal structure 1000 in a pressurized state. In the pressurized state, the medium is evacuated from a bladder 204 housing the internal structure 1000. As a result, the internal structure 1000 has a second length (L2) less than the first length (L1), and the protrusions of the internal structure 1000 are separated by a second distance (D2) less than the first distance (D1). Thus, the internal structure 1000 has been condensed (i.e., shortened). It is noted that FIG. 10B illustrates a "pull force" in that the medium evacuated from the bladder 204 pulls and condenses the internal structure 1000. In some embodiments, a "push force" can also be created by pushing the medium into the bladder 204, as shown in FIG. 10M-3. This can be accomplished by feeding the medium into the bladder 204 via the same valve that the medium was removed. Alternatively, the bladder 204 may include two valves at opposing ends of the bladder 204 and the internal structure 1000 (e.g., as shown in FIG. 10F). In such embodiments, the internal structure 1000 can transition between the two states shown in FIGS. 10A and 10B, and various states there-between depending on a strength of the "pull" and "push" forces. The "push" and "pull" forces are further discussed with reference to FIGS. 10M-1 to 10M-3

FIG. 10C illustrates another side view of the internal structure 1000 in a pressurized state. In the pressurized state, a medium is evacuated from a bladder 204 housing the internal structure 1000. As a result, the internal structure 1000 has curled by an angle alpha ($\alpha$). A magnitude of alpha ($\alpha$) is dependent on several factors, including a pressure inside the bladder housing the internal structure 1000. For example, at a first pressure below atmospheric pressure, alpha ($\alpha$) is a first angle, at a second pressure, less than the first pressure, below atmospheric pressure, alpha ($\alpha$) is a second angle greater than the first angle, and so on. Some other factors include the shape, the size, and the spacing of the protrusions, whether the protrusions are perforated, and the material of the substrate (e.g., modulus of elasticity of the substrate). Each of these factors can contribute to the magnitude of alpha (α).

The different results illustrated in FIGS. 10B and 10C may result from the shape of the protrusions therein. For example, as discussed below with reference to FIGS. 10F to 10I, differently shaped protrusions can be used to obtain various results in a pressurized state, where some protrusions facilitate linear shortening/expanding (as shown in FIG. 10B) while other protrusions facilitate curling (as shown in FIG. 10C).

Figures 1, 10D:
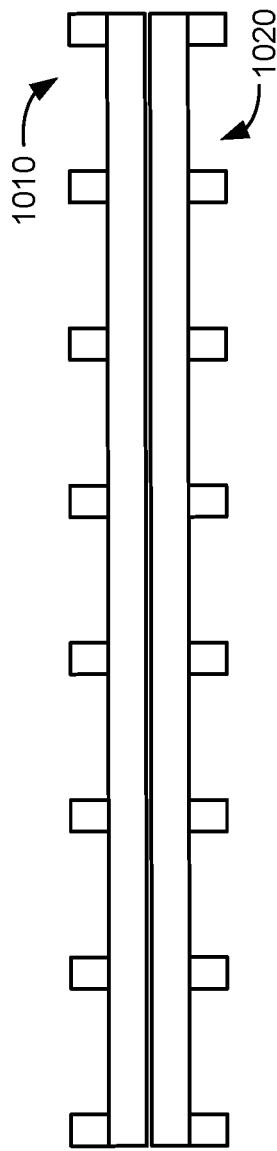
Figures 2, 10D:
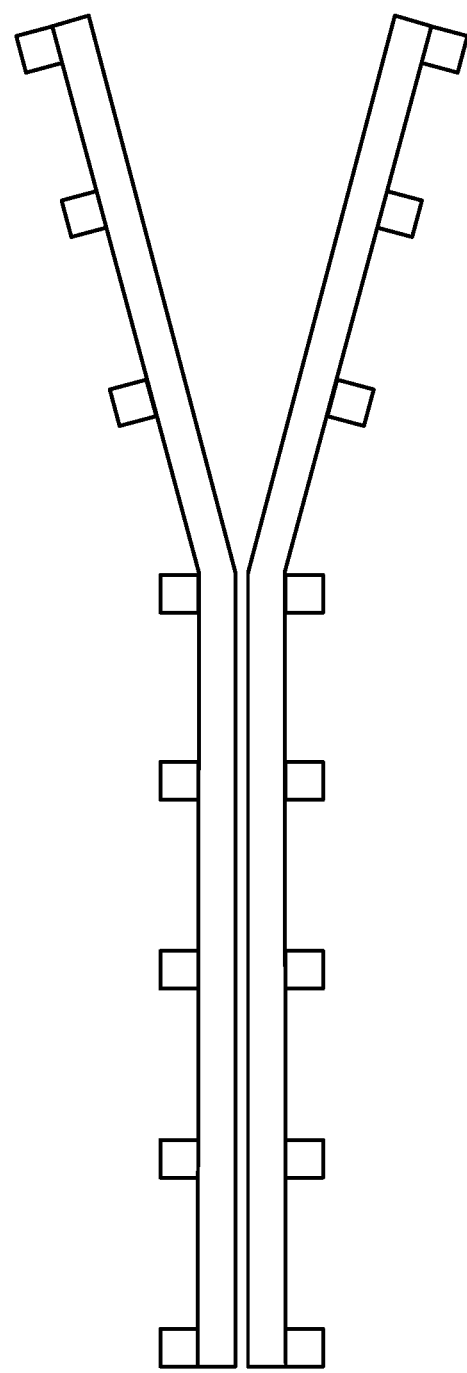
Figures 1, 10E:
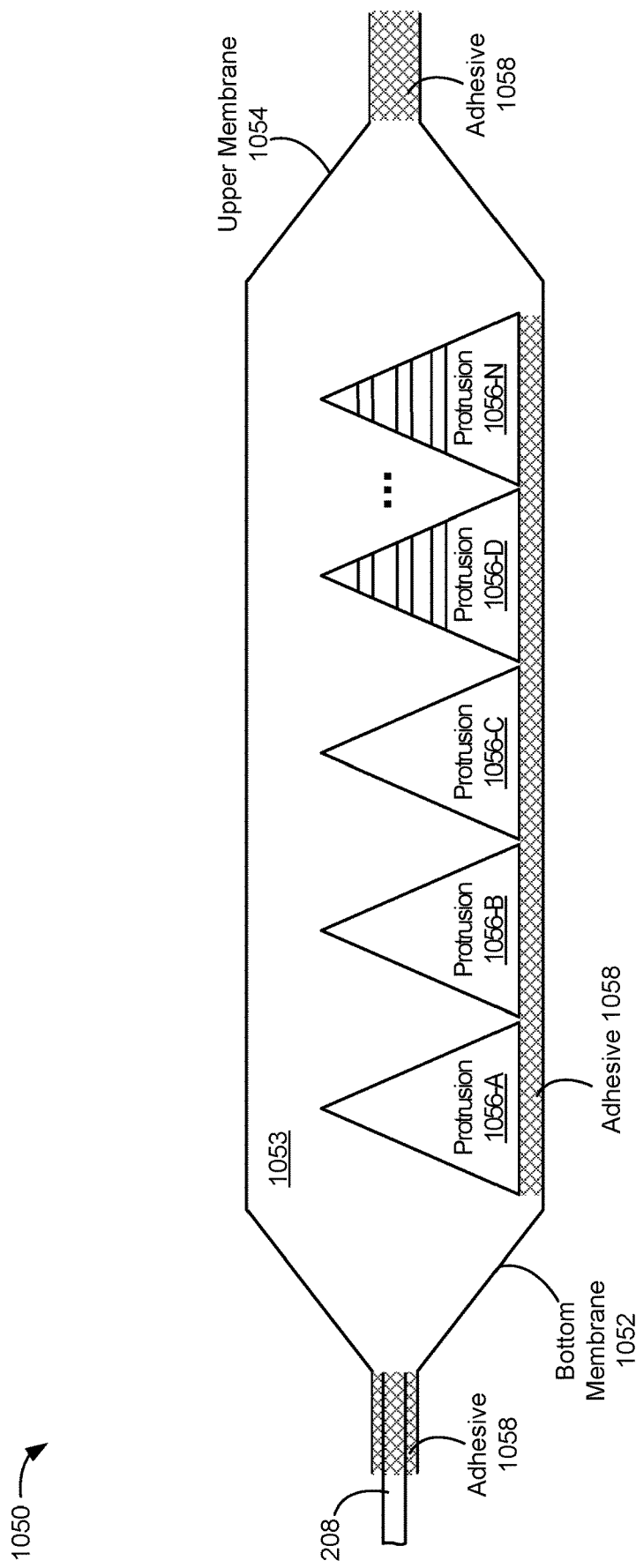
Figures 2, 10E:
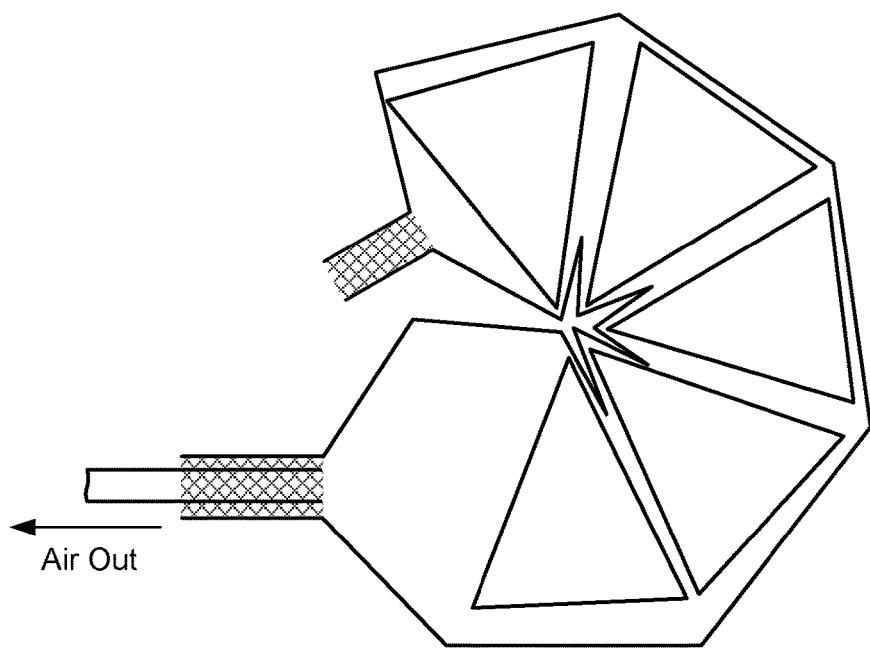
Figures 3, 10E:
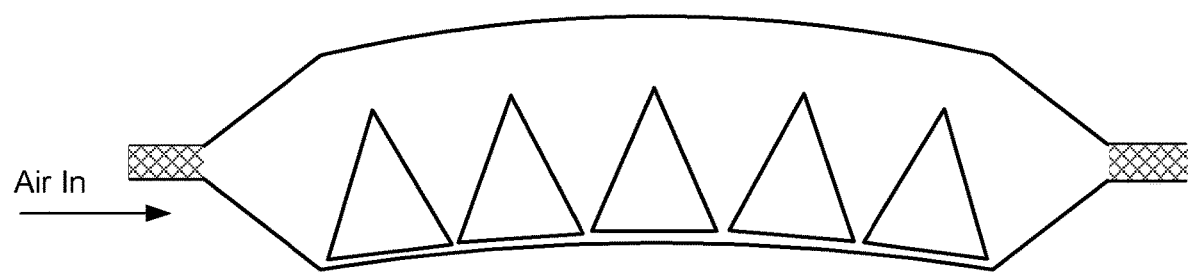
Figure 10F:
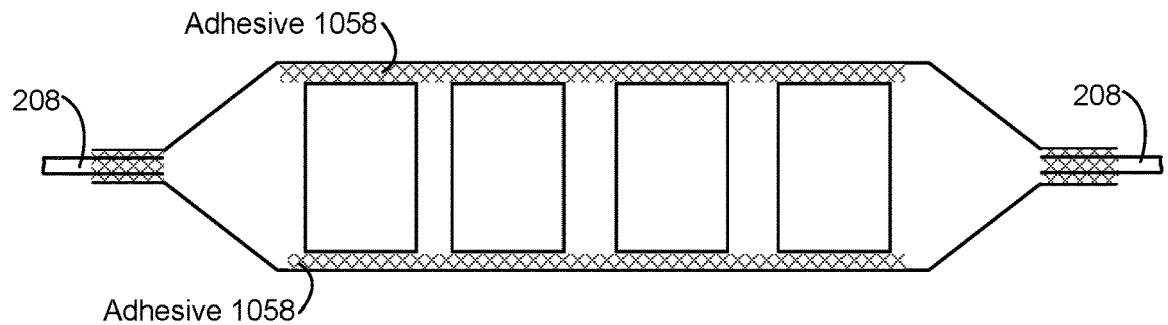
FIG. 10F shows a cross-sectional side view of a representative pod with adhesive on both surfaces of the bladder in accordance with some embodiments.

FIGS. 10D-1 and 10D-2 illustrate two internal structures 1010 and 1020 placed back-to-back in accordance with some embodiments. The two internal structure 1010 and 1020 may be an example of any of the internal structures discussed above with reference to FIGS. 9A-9C or below with reference to FIGS. 10E-1 to 10M-3, as well as FIGS. 11A-11B. In some embodiments, the two internal structures 1010 and 1020 are housed in the same bladder, while in other embodiments the two internal structures 1010 and 1020 are housed in separate bladders serviced by distinct valves (i.e., a dual bladder arrangement as shown in FIG. 10L). In some embodiments, the two internal structures 1010 and 1020 are configured to curve in the same manner, while in other embodiments the two internal structures 1010 and 1020 curve in different manners. For example, if an evacuation point (i.e., valve) associated with the two internal structures 1010 and 1020 is the same (e.g., both internal structures 1010 and 1020 are serviced by valves towards the same respective end portions), then the two internal structures 1010 and 1020 may be configured to curve away from each other (e.g., a top portion of the internal structure 1010 curves upwards and a top portion of the internal structure 1020 curves downwards, e.g., as shown in FIG. 10D-2). Accordingly, the two internal structures 1010 and 1020 are configured to create equal, yet opposite, haptic stimulations. Although not shown, characteristics (e.g., the protrusion shape, the design, and the spacing) of the two internal structures 1010 and 1020 may differ in some embodiments. In such embodiments, the two internal structures 1010 and 1020 may be configured to create different haptic stimulations.

FIG. 10E-1 shows a cross-sectional side view of a representative pod 1050 in accordance with some embodiments. The pod 1050 is an example of a pod 122. As shown, the pod 1050 includes a bottom membrane 1052 and an upper membrane 1054 that together define a cavity 1053 and collectively form a bladder (e.g., an instance of the bladder 204). At a first end of the pod 1050 (i.e., the left end), tubing 208 is inserted into the cavity 1053 defined by the bottom and upper membranes 1052 and 1054. The tubing 208 pneumatically couples the cavity 1053 with a pneumatic device 210. Further, an adhesive 1058 is deposited around the tubing 208 so that the first end of the pod 1050 is sealed. In addition, an adhesive 1058 is also deposited at a second end (i.e., the right end) of the pod 1050 to form a seal between the bottom and upper membranes 1052 and 1054. Although not shown, other interfaces between the bottom and upper membranes 1052 and 1054 may also include the adhesive so that the entire pod 1050 is sealed.

The bottom and upper membranes 1052 and 1054 may be made from elastic or inelastic materials. For example, if the upper member 1054 is highly elastic relative to an elasticity of the bottom membrane 1052, then the pod 1050 may be configured to curve (i.e., curl) counterclockwise (e.g., as shown in FIG. 10E-2) when the pod 1050 is pressurized, i.e., the medium is removed. Furthermore, the pod 1050 may be configured to bulge upwards (e.g., as shown in FIG. 10E-3) when the pod 1050 is pressurized, i.e., the medium is added. It is noted that the opposite results can be obtained when the upper member 1054 is highly inelastic relative to an elasticity of the bottom membrane 1052 (e.g., clockwise curl can be achieved). Elasticity of substrates, which is similar to the elasticity of the upper and lower membranes, is discussed in further detail above with reference to FIGS. 5 and 6.

The pod 1050 further includes a plurality of protrusions (e.g., shaped portions) 1056-A to 1056-N. As discussed above with reference to FIGS. 9A and 9B, a pod may include any number of protrusions, and the shape of the protrusions therein varies from application to application (e.g., protrusions of various shapes and sizes are illustrated in FIGS. 10F-10L). In the illustrated embodiment, the protrusions are attached directly to the bottom membrane 1052. Alternatively, in some embodiments, the protrusions may be attached to a substrate (e.g., substrate 902, FIG. 9A), which is then attached to the bottom membrane 1052 or the substrate is not attached to any membrane (as shown in FIG. 10K). The plurality of protrusions can also be attached solely to the upper membrane 1054 (not shown), both the upper and lower membranes (e.g., as shown in FIG. 10F), or some combination thereof (e.g., as shown in FIG. 10J).

Additionally, in the illustrated embodiment, the protrusions 1056-D, 1056-E are perforated, whereas the other depicted protrusions are solid (i.e., not perforated). This arrangement is optional, and various other arrangements of perforated and non-perforated protrusions are possible, depending on the particular application of the pod. To provide some context, with respect to the illustrated embodiment, the arrangement of perforated and non-perforated protrusions helps facilitate curling of the pod 1050. To explain, each of the non-perforated protrusions 1056-A, 1056-B, 1056-C has less medium (e.g., air) associated with it relative to an amount of medium associated with the perforated protrusions (e.g., air is within perforations of the perforated protrusions). Accordingly, the cavity 1053 around the non-perforated protrusions collapses first when the medium is evacuated from the bladder (e.g., left half of the pod 1050 collapses). As a result of said collapsing, the cavity 1053 around the perforated protrusions is raised up, and in some cases, the pod 1050 curls onto itself, as shown in FIG. 10E-2.

FIG. 10E-2 shows a cross-sectional side view of the representative pod 1050 when a medium (e.g., air) is evacuated from the cavity 1053 defined by the two membranes. As shown, a counterclockwise curl is achieved. FIG. 10E-3 shows a cross-sectional side view of the representative pod 1050 when a medium (e.g., air) is added to the cavity 1053 defined by the two membranes. As shown, an upward bowing is achieved.

FIG. 10F shows a cross-sectional side view of the representative pod 1050 where the representative pod 1050 further includes an adhesive 1058 on the upper membrane 1054 (i.e., the protrusions are attached to both the upper and lower membranes). The arrangement shown in FIG. 10F can be used to increase a structural stability of the pod 1050. Also shown in FIG. 10F, the pod 1050 includes tubing 208 at both ends (i.e., at opposing ends). Thus, the medium can be evacuation from left to right, or from right to left. Similarly, the medium can be added from left to right, or from right to left. A direction of removal or addition of the medium dictates the haptic stimulation felt by the user. For example, removing the medium from right to left will cause one haptic stimulation to be felt and removing the medium from left to right will cause a different haptic stimulation to be felt (e.g., one may cause a contraction stimulation while the other causes an extension stimulation). Additionally, the arrangement shown in FIG. 10F can be used to create left and right vibrations by quickly adding and removing the medium to and from opposite ends of the pod 1050.

Figure 10G:
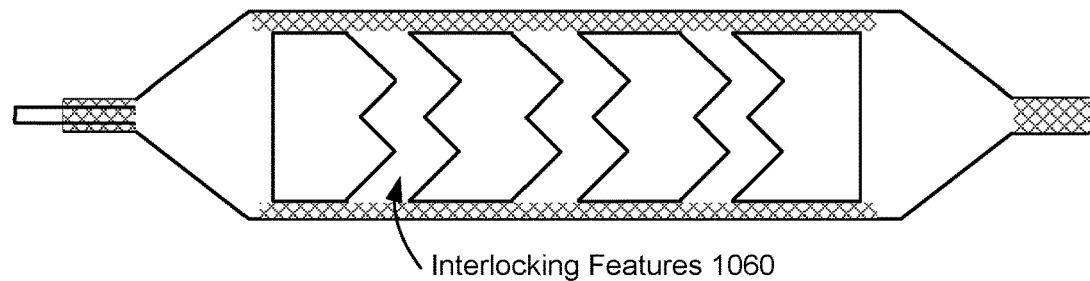
FIG. 10G shows a cross-sectional side view of a representative pod where the protrusions include interlocking features in accordance with some embodiments.

FIG. 10G shows a cross-sectional side view of the representative pod 1050 where the protrusions include interlocking features 1060. In some embodiments, the interlocking features 1060 include male and female portions (as shown in FIG. 10G). Alternatively, in some embodiments, the interlocking features 1060 are created through surface texturing (e.g., sand blasting) of the relevant surfaces of the protrusions. The interlocking features 1060 can be used to further increase the structural stability of the pod 1050 when the medium is evacuated (e.g., the interlocking features 1060 interlock, creating a stiffness experienced by a wearer of the pod 1050). A substantial force (relative to the other pod designs discussed herein) is required to break apart the features 1060 once interlocked.

Figure 10H:
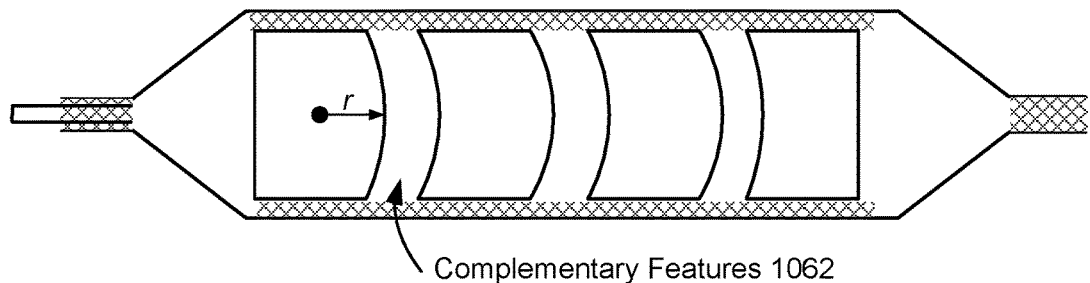
FIG. 10H shows a cross-sectional side view of a representative pod where the protrusions include complementary features in accordance with some embodiments.

FIG. 10H shows a cross-sectional side view of the representative pod 1050 where the protrusions include complementary features 1062. The complementary features 1062 serve a similar purpose to the interlocking features 1060, except that the geometry of the complementary features 1062 allows for curling of the pod 1050. Additionally, a larger radius (r) of the complementary features 1062 facilitates larger curling. Thus, the complementary features 1062 allow the pod 1050 to curl, and also provide some stiffness to be experienced by a wearer of the pod 1050 when the medium is evacuated.

Figure 10I:
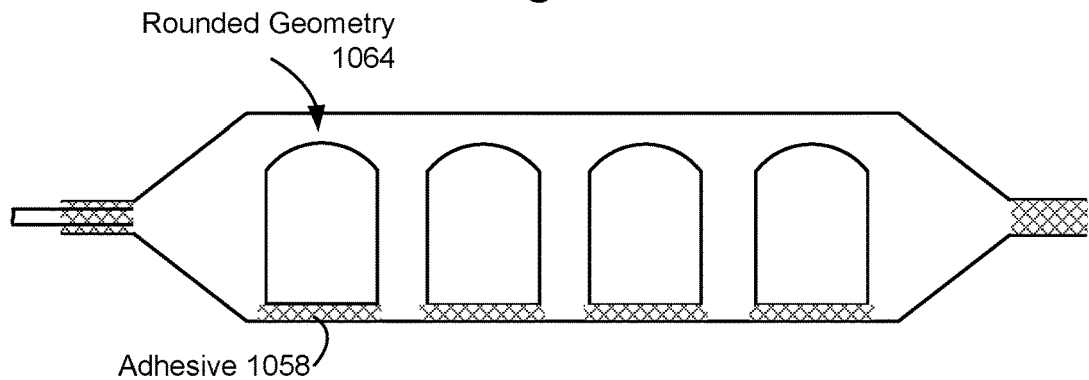
FIG. 10I shows a cross-sectional side view of a representative pod where each of the protrusions has a rounded geometry in accordance with some embodiments.
Figure 10J:
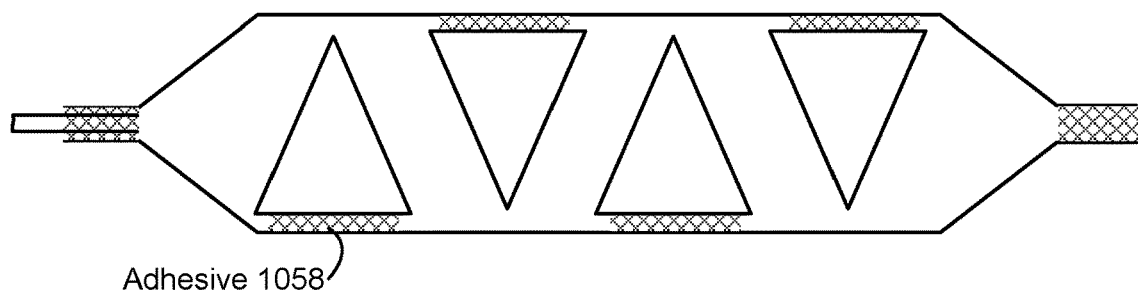
FIG. 10J shows a cross-sectional side view of a representative pod where the protrusions are arranged in an alternating fashion on opposing membranes in accordance with some embodiments.
Figure 10K:
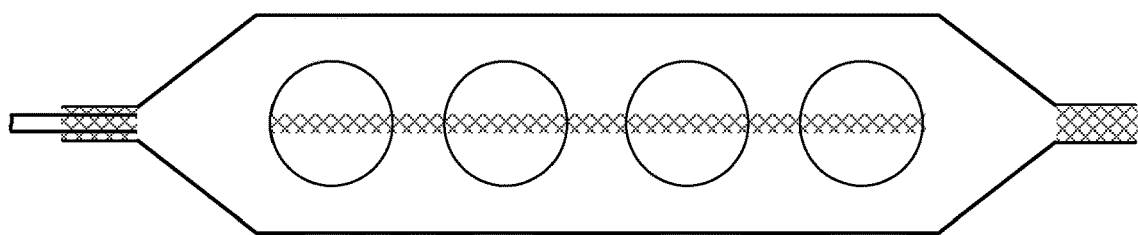
FIG. 10K shows a cross-sectional side view of a representative pod where each of protrusions is rounded in accordance with some embodiments.
Figure 10L:
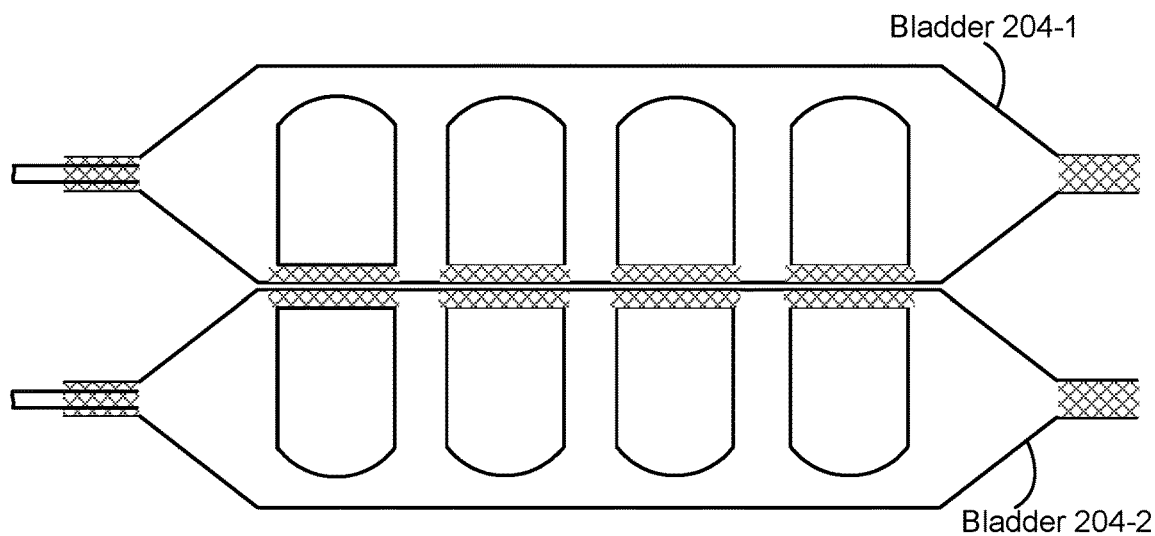
FIG. 10L shows a cross-sectional side view of two pods arranged back-to-back in accordance with some embodiments.
Figures 1, 10M:
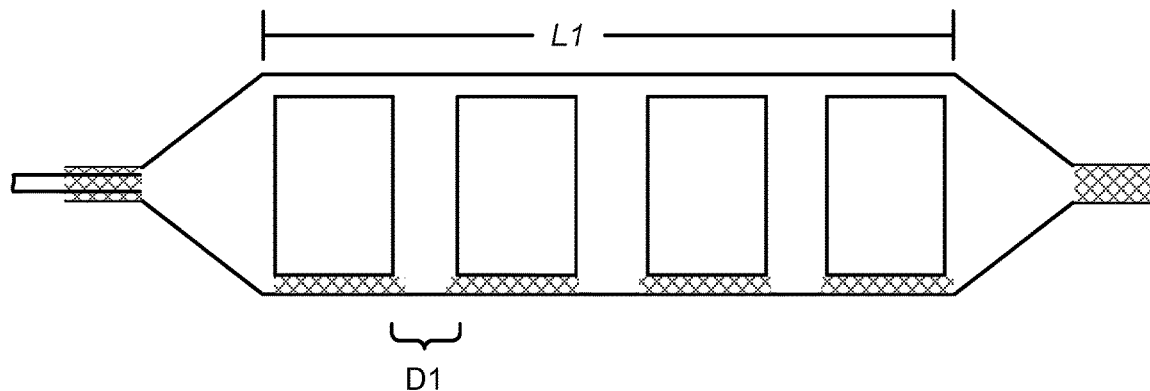
Figures 2, 10M:
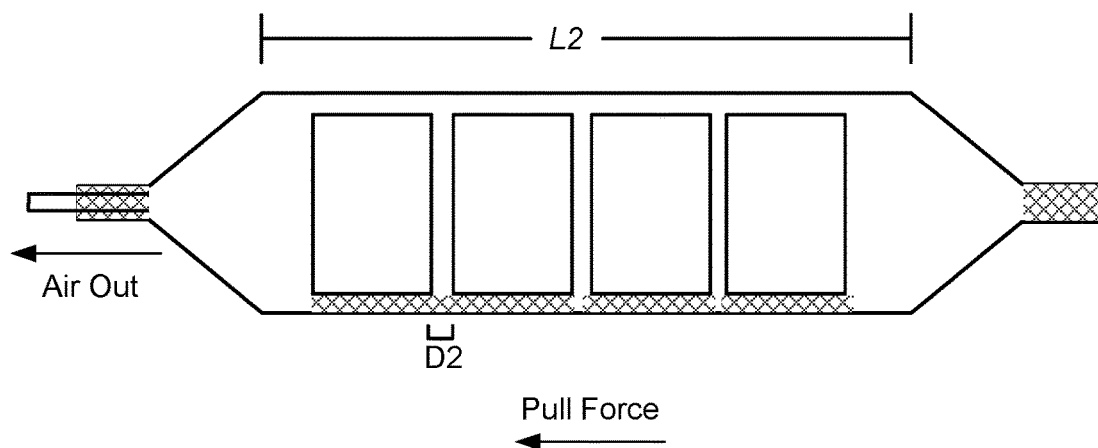
Figures 3, 10M:
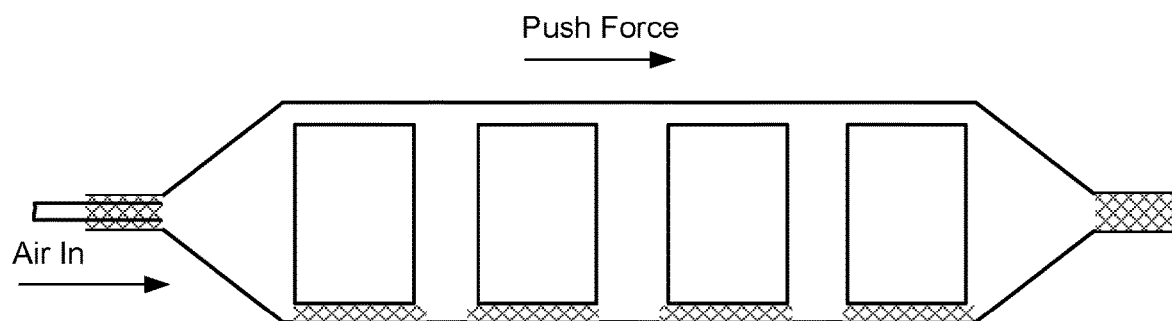

FIG. 10I shows a cross-sectional side view of the representative pod 1050 where each of the protrusions has a rounded geometry 1064. The rounded geometry can be used to provide unique haptic stimulations to a wearer of the pod 1050. For example, when the medium is evacuated from the pod 1050 and, say, the user's finger is opposite the rounded geometry 1064 of the protrusions, the user's finger will feel bumps opposite his or her finger. Additionally, after the medium is evacuated, the rounded geometry 1064 may change an amount of force required to break apart (i.e., overcome a frictional force between) abutting protrusions, e.g., relative to the amount of force required when a flat surface is opposite the user's finger.

FIG. 10J shows a cross-sectional side view of the representative pod 1050 where the protrusions are arranged in an alternating fashion on opposing membranes. In such an arrangement, when the medium is evacuated from the cavity 1053, the protrusions come together (i.e., abut one another) and neighboring slanted surfaces of the protrusions come into contact. As such, static friction is created between the neighboring slanted surfaces, and a substantial force is required to overcome this static friction. Thus, a haptic stimulation experience by the user relates to the contact between the neighboring slanted surfaces, as well as the force of trying to overcome the newly formed static friction. Additional haptic stimulations may also be experience once the static friction is overcome, at least partially (e.g., one pair of protrusions may start to slide, while the other pairs remain static).

FIG. 10K shows a cross-sectional side view of the representative pod 1050 where each of protrusions is rounded. In such an arrangement, when the medium is evacuated from the cavity 1053, the protrusions come together and neighboring surfaces of the protrusions come into contact. As such, static friction is formed between the neighboring surfaces. However, an amount of surface contact between neighboring protrusions in FIG. 10K is far less than the amount of surface contact between neighboring protrusions in FIG. 10J. Thus, the static friction created in FIG. 10K is far less than the static friction formed in FIG. 10J. Thus, rounded protrusions allow for some static friction to be created, if desired (various other shapes can be used to tailor the amount of surface contact between neighboring protrusions). Also, the protrusions in FIG. 10K are not attached to either of the membranes, and are instead attached to a "floating" substrate, such as the substrates shown in FIGS. 9A and 9B.

FIGS. 10M-1 to 10M-3 show examples of "push" and "pull" forces in the pod 1050. To provide some context, if the pod 1050 is positioned on a palmar surface of a user's finger, then the "pull" force (FIG. 10M-2) can cause the user's finger to curl downwards, and the "push" force (FIG. 10M-3) can cause the user's finger to extend from the curled positioned created by the "pull" force. The dimensions (L1), (D1), (L2), and (D2) are discussed in more detail above with reference to FIGS. 10A and 10B.

FIGS. 11A-11B illustrate views of an internal structure 1100 with expanding/inflatable zones in accordance with some embodiments. The internal structure 1100 includes a substrate 1102 and a plurality of inflatable zones 1104. The internal structure 1100 is similar to the internal structures discussed above with reference to FIGS. 9A-9C, except that the internal structure 1100 is designed for positive pressure (e.g., air is added), whereas the internal structures discussed above with reference to FIGS. 9A-9C are designed primarily for negative pressure (e.g., air is evacuated). Nevertheless, the internal structure 1100 is still configured to curve, at least partially, when a bladder 204 housing the internal structure 1100 is pressurized. For example, FIG. 11A shows the internal structure 1100 in an unpressurized state (i.e., the bladder 204 housing the internal structure 1100 is unpressurized). In such a state, the internal structure 1100 does not encumber free movement of a portion of the user's body, as discussed above with the other internal structures.

Further, the plurality of inflatable zones 1104 have a first cross-sectional length (i.e., a first diameter) when the bladder 204 housing the internal structure 1100 is unpressurized. To transition to a pressurized state, a medium (e.g., air) is added to the bladder 204 housing the internal structure 1100. In doing so, the medium expands the plurality of inflatable zones 1104, causing the plurality of inflatable zones 1104 to have a second cross-sectional length (e.g., a second diameter) that is greater that the first cross-sectional length. Increasing the cross-sectional length of the plurality of inflatable zones 1104 causes the substrate 1102 to become strained, and the strain imparted on the substrate 1102 results in the internal structure 1100 curving. It is noted that the plurality of inflatable zones 1104 may also push against each other when the bladder 204 housing the internal structure 1100 is pressurized (not shown). For example, the plurality of inflatable zones 1104 may not contact each other in the unpressurized state and one or more of the plurality of inflatable zones 1104 may come into contact in the pressurized state. In such cases, the contact between zones imparts additional strain on the substrate 1102. The example curvature shown in FIG. 11B is one possible result, and various other curvatures can be obtained, depending on the location and the number of inflatable zones 1104.

In some embodiments, the internal structure 1100 is combined with the internal structures discussed above with reference to FIGS. 9A-9C. In such embodiments, positive and negative pressure states can be used to create haptic stimulations.

Figure 12A:
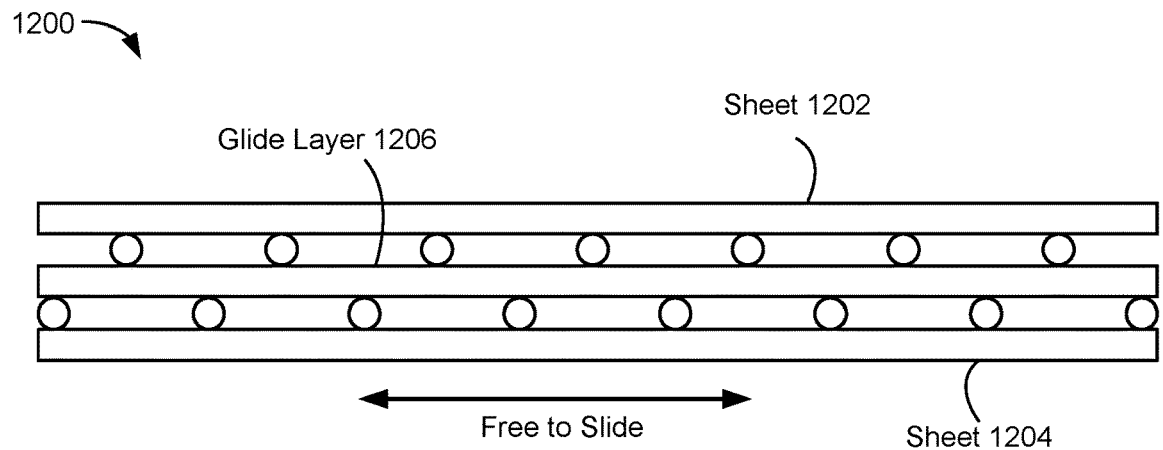
FIGS. 12A-12C show an internal structure in jammed and unjammed states in accordance with some embodiments.
Figure 12B:
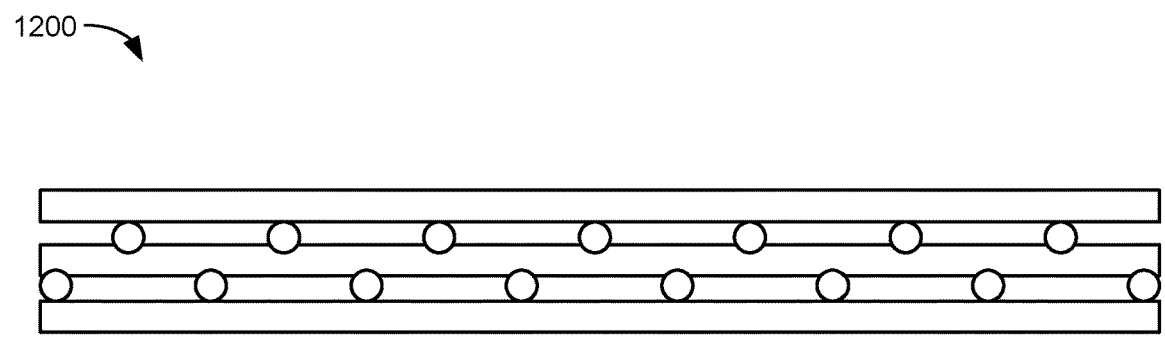
Figure 12C:
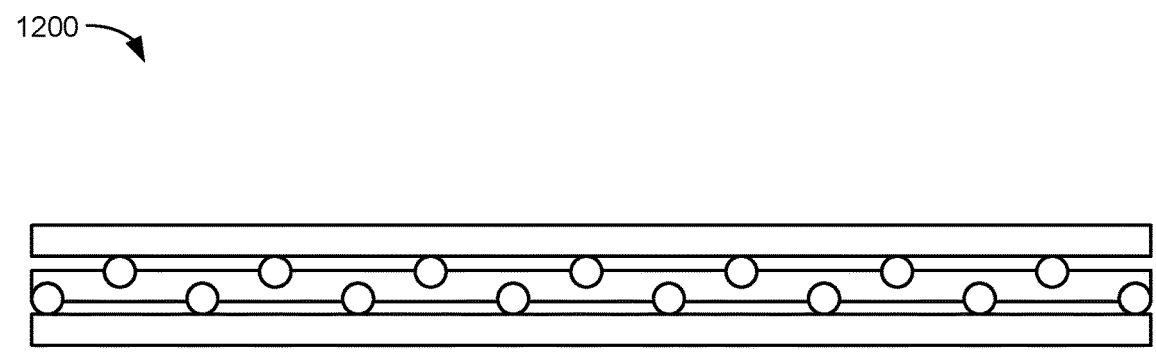

FIGS. 12A-12C show an internal structure 1200 in jammed and unjammed states in accordance with some embodiments. The internal structure 1200 is an example of the internal structure 206 described in FIG. 2. The internal structure 1200 includes at least two sheets 1202 and 1204 separated by a glide layer 1206. Each of the sheets 1202 and 1204 has at least one uneven or textured surface that contributes to a frictional force created when the internal structure 1200 is in the jammed state. For ease of illustration, FIGS. 12A-12C show circles attached to each of the sheets 1202 and 1204, which represent the uneven or textured surfaces of the sheets 1202 and 1204. In some embodiments, the glide layer 1206 is a knitted or woven mesh layer, while the sheets 1202 and 1204 are thin polymer sheets (e.g., TPU or the like), where one surface of the polymer sheets is textured. It is noted that the coefficient of friction between the sheets 1202 and 1204 and the glide layer 1206 is less than the coefficient of friction between the sheets 1202 and 1204 themselves. Thus, the glide layer 1206 is incorporated in the internal structure 1200 to further reduce encumbrance experienced by the user when a bladder housing the internal structure 1200 is unpressurized. For example, without the glide layer 1206, the sheets 1202 and 1204 have a tendency to stick together when the bladder housing the internal structure 1200 is unpressurized, which is undesired.

In the unjammed state, the friction between the sheets 1202 and 1204 and the glide layer 1206 is negligible, allowing the sheets 1202 and 1204 to slide past the glide layer 1206 (e.g., left and right). For example, if the internal structure 1200 is part of a pod 122 attached to a palmar surface of a user's finger, the user is able to bend his or her finger, and during the bending, the sheets 1202 and 1204 slide past (or along) the glide layer 1206 without substantial friction. To transition from the unjammed state to the jammed state, a pressure level inside the bladder housing the internal structure 1200 is decreased. In doing so, the two sheets 1202 and 1204 are pulled towards the glide layer 1206, and the surfaces of the two sheets 1202 and 1204 are pressed against opposing surfaces of the glide layer 1206. Thus, in the jammed state, the friction between the sheets 1202 and 1204 and the glide layer 1206 is increased. Put another way, changing the pressure level inside the bladder housing the internal structure 1200 causes a force perpendicular to the surfaces of the sheets 1202 and 1204 to press the sheets 1202 and 1204 together (i.e., toward each other).

A frictional force between the sheets 1202 and 1204 and the glide layer 1206 is based on the pressure level inside the bladder housing the internal structure 1200. For example, with reference to FIG. 12B, the bladder housing the internal structure 1200 has a first pressure level (e.g., pressure inside the bladder is decreased by a first amount from atmospheric pressure). In another example, with reference to FIG. 12C, the bladder housing the internal structure 1200 has a second pressure level less than the first pressure level (e.g., pressure inside the bladder is decreased by a second amount, greater than the first amount, from atmospheric pressure). In comparison, the sheets 1202 and 1204 in FIG. 12C are closer together relative to the sheets 1202 and 1204 in FIG. 12B. Accordingly, the frictional force between the sheets 1202 and 1204 and the glide layer 1206 in FIG. 12C is greater than the frictional force between the sheets 1202 and 1204 and the glide layer 1206 in FIG. 12B.

In some embodiments, to transition from the unjammed state to the jammed state, a pressure level inside the bladder housing the internal structure 1200 is increased. For example, an inflatable bladder is placed above or below one of the sheets 1202 and 1204, and a perpendicular force is applied to the sheet by inflating the bladder with a medium (e.g., air) so that the bladder presses against the sheet. Additionally, in some embodiments, a respective bladder is placed above or below both of the sheets 1202 and 1204. In such embodiments, a first perpendicular force is applied to the sheet 1202 by inflating a first bladder and a second perpendicular force, opposite the first perpendicular force, is applied to the sheet 1204 by inflating a second bladder.

Figure 13A:
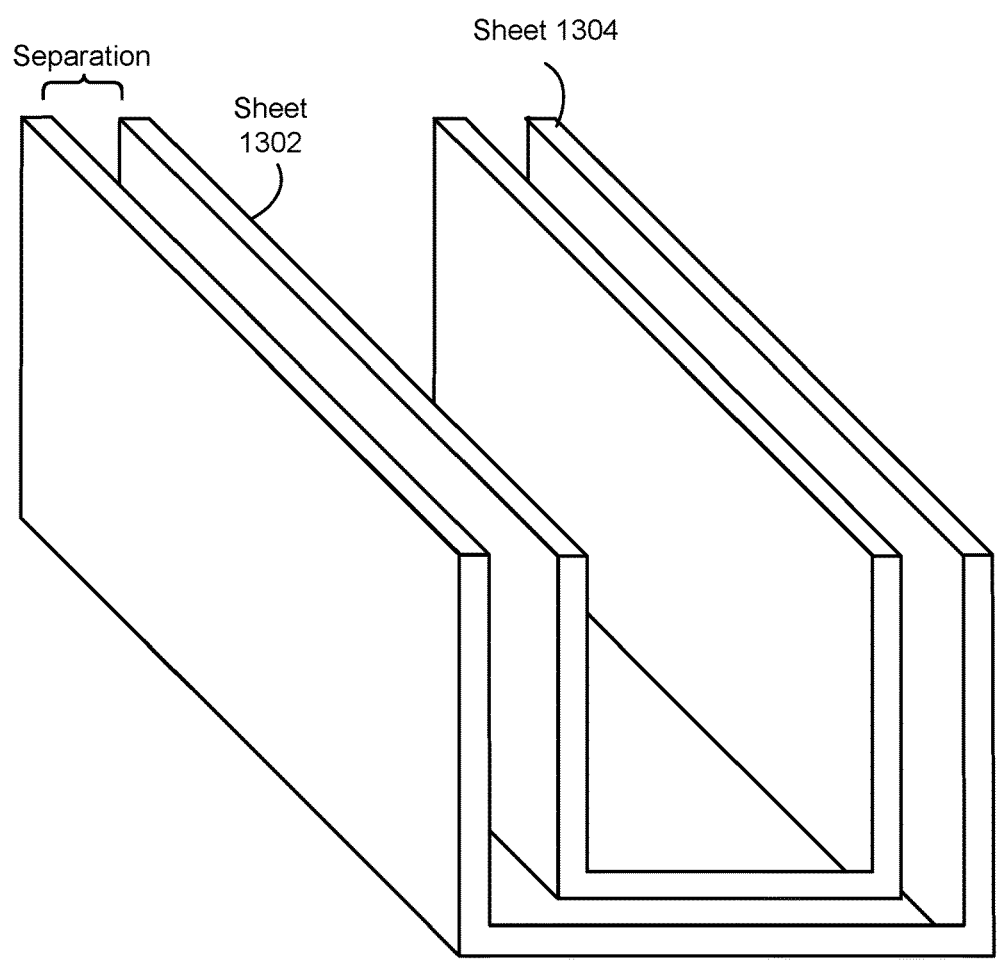
FIGS. 13A-13B show an internal structure with a predefined geometry in jammed and unjammed states in accordance with some embodiments.
Figure 13B:
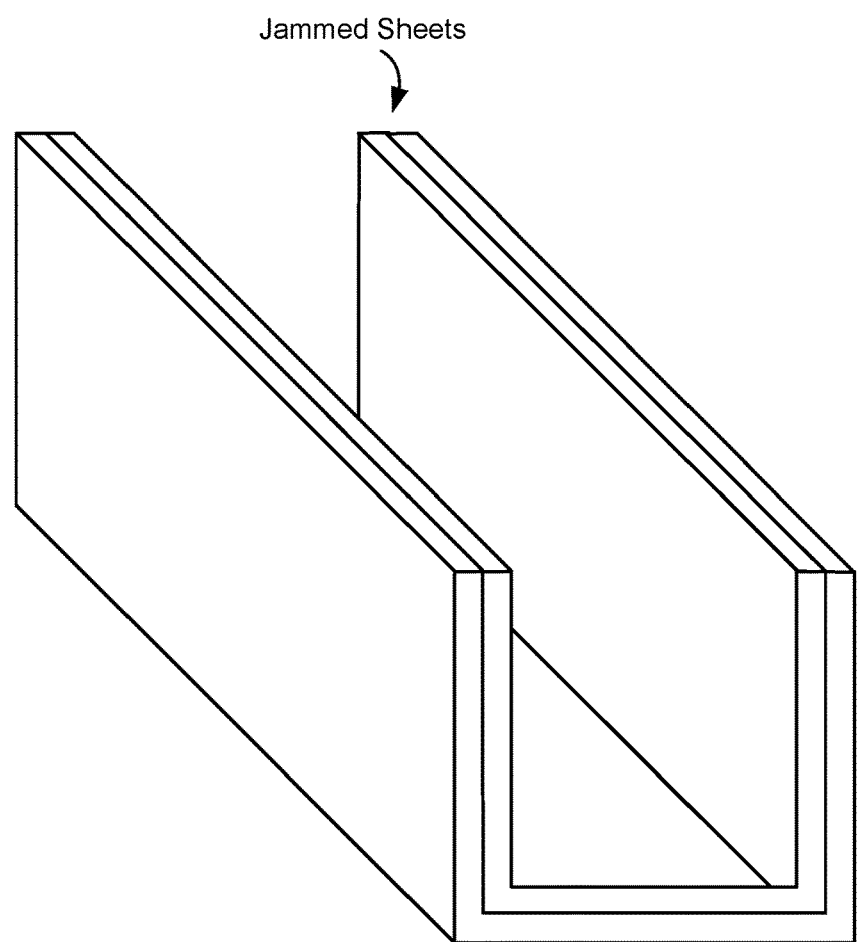

FIGS. 13A-13B show an internal structure 1300 with a predefined geometry in jammed and unjammed states in accordance with some embodiments. In some embodiments, the internal structure 1300 is an example of the internal structure 1200 where the internal structure 1200 is shaped in a non-planar geometry. In some embodiments, the non-planar geometry is a geometry defined in at least two orthogonal dimensions. The internal structure 1300, and a bladder 204 housing the internal structure 1300, are formed in a predefined shape. For example, the bladder 204 may have a U-shape, and in turn, the sheets 1302 and 1304 of the internal structure 1300 also have the U-shape.

In the unjammed state, friction between the sheets 1302 and 1304 is negligible, allowing the sheets 1302 and 1304 to slide past each other. For example, if the internal structure 1300 is part of a pod 122 that partially wraps around a user's finger (e.g., in U-shape), the user is able to bend his or her finger, and during the bending, the sheets 1302 and 1304 slide past each other without substantial friction. To transition from the unjammed state to the jammed state, a pressure level inside the bladder housing the internal structure 1300 is decreased. In doing so, the two sheets 1302 and 1304 are pulled towards each other, and surfaces of the two sheets 1302 and 1304 are pressed against each other (or the two surfaces of the sheets 1302 and 1304 are pressed against the glide layer 1206), thereby creating friction between the sheets 1302 and 1304. Put another away, changing the pressure level inside the bladder housing the internal structure 1300 causes a force perpendicular to the surfaces of the sheets 1302 and 1304 to press the sheets 1302 and 1304 together. A frictional force between the sheets 1302 and 1304 is based on a pressure level inside the bladder housing the internal structure 1300. For example, as the pressure level inside the bladder housing the internal structure 1300 decreases (e.g., gets further from atmospheric pressure), the frictional force between the sheets 1302 and 1304 increases. FIG. 13B shows the internal structure 1300 in the jammed state.

The rigidity of the internal structure 1300 in the jammed state increases proportionally with a thickness of the internal structure 1300. The thickness of the internal structure 1300 is increased by increasing the number of sheets in the internal structure 1300. For example, a first degree of rigidity is achieved when the internal structure 1300 has two sheets, a second degree of rigidity, greater than the first degree of rigidity, is achieved when the internal structure 1300 has three sheets, and so on.

In some embodiments, to transition from the unjammed state to the jammed state, a pressure level inside the bladder housing the internal structure 1300 is increased. For example, an inflatable bladder is placed, at least partially, around the internal structure 1300. For example, the inflatable bladder may also have the U-shape. In doing so, a perpendicular force is applied the sheet by inflating the bladder with a medium (e.g., air) so that the bladder presses against the sheet 1304.

Figure 14:
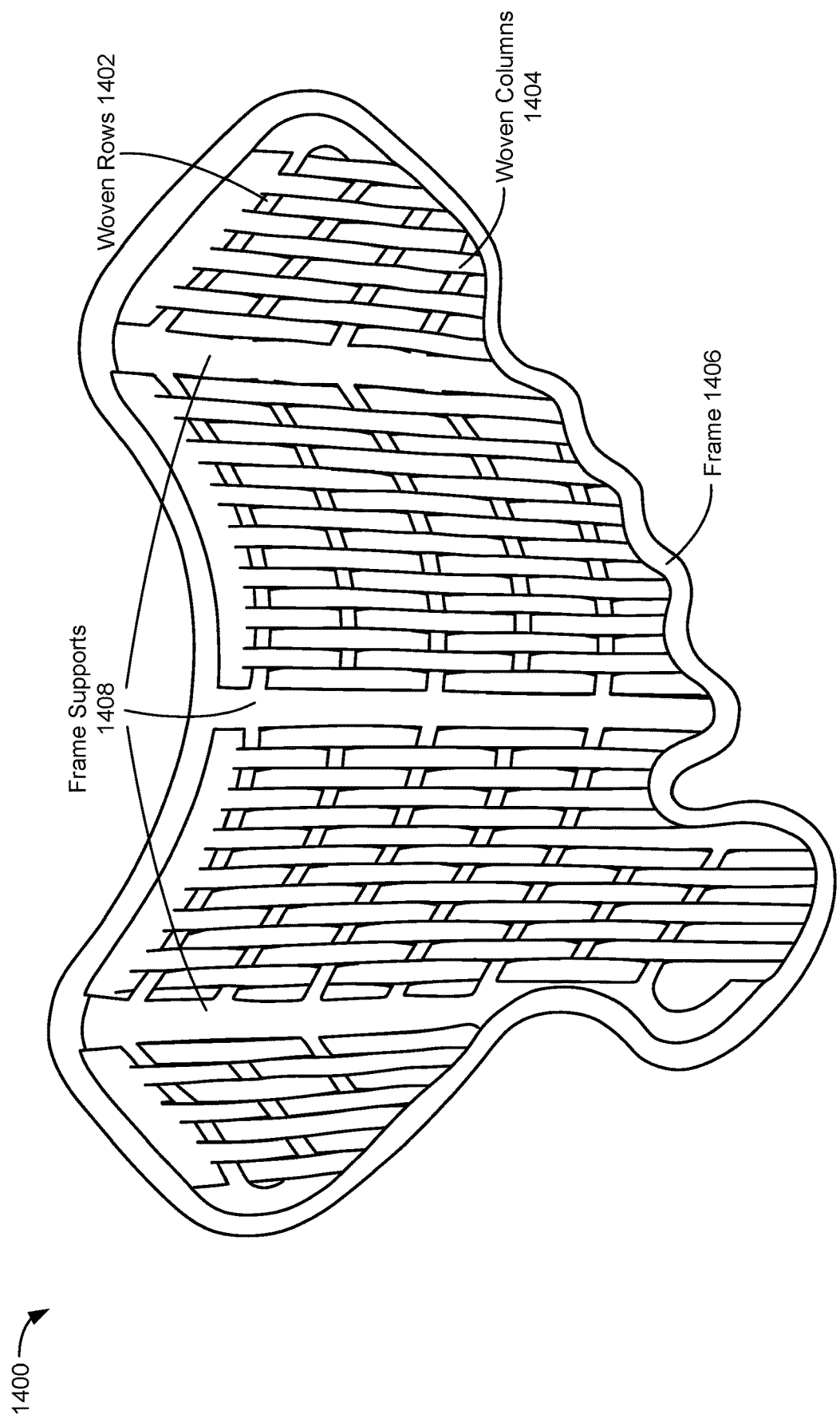
FIG. 14 shows a woven internal structure in accordance with some embodiments.

FIG. 14 shows a woven internal structure 1400 in accordance with some embodiments. The internal structure 1400 is an example of the internal structure 206 shown in FIG. 2. The internal structure 1400 includes woven rows 1402, woven columns 1404, and a frame 1406. Although not shown, the internal structure 1400 is housed by an instance of a bladder 204. In the illustrated embodiment, the woven rows 1402 are attached to (or integrally formed with) the frame 1406, which forms a perimeter of the internal structure 1400. Further, the woven columns 1404 are woven through the woven rows 1402. The frame 1406 also includes frame supports 1408, which may be integrally formed with the woven rows 1402 (i.e., the woven rows 1402, the frame 1406, and the frame supports 1408 may be unitary). The woven rows 1402 may be a single set of rows extending a width of the internal structure 1400 (e.g., from left to right), whereas the woven columns 1404 may include several sets of woven columns 1404, where each set of columns is separated by one of the frame supports 1408 (e.g., FIG. 14 includes four distinct sets of woven columns 1404). The frame 1406 prevents the woven rows and columns from unweaving, and as a result, the frame 1406 maintains the structural integrity of the internal structure 1400. It is noted that, in some other embodiments, the woven columns 1404 are attached to (or integrally formed with) the frame 1406 and the woven rows 1402 are woven through the woven columns 1404.

In some embodiments, the woven rows 1402 and columns 1404 are made from a fiber, such as fiber glass, carbon fiber, baron fibers, or the like. Further, the woven rows and columns made by made from the same or different materials. Due to the woven nature of the internal structure 1400 and anisotropic properties of the fibers comprising the woven rows 1402 and the woven columns 1404, the internal structure 1400 may exhibit different properties when oriented in different directions. However, depending on the weave design and fibers (e.g., material one versus material two) of the internal structure 1400, the internal structure 1400 may exhibit substantially the same properties when oriented in different directions. Accordingly, the internal structure 1400 can be designed so that greater rigidity can be obtained in one direction (or multiple first directions), while greater flexibility may be obtained (i.e., maintained) in a different direction (or multiple different directions). This is particularly useful when placing the internal structure 1400 on different portions of the body, where rigidity may be needed to counteract movement of a body part in one direction, while flexibility may be beneficial in another direction. Rigidity and flexibility of the internal structure 1400 is further dependent on whether the internal structure 1400 is in a jammed or unjammed state (discussed below).

In the unjammed state, friction between the woven rows 1402 and columns 1404 is negligible, allowing the woven rows 1402 and columns 1404 to move relative to each other. For example, if the internal structure 1400 is part of a pod 122 attached to the user's palm, the user is able to manipulate his or her hand without substantial friction or resistance. Additionally, the fibers comprising the internal structure 1400 do not "bond" together when in the unjammed state, and thus the fibers provide little strength and rigidity in the unjammed state (e.g., similar to a fiber reinforced composite with no matrix). To transition from the unjammed state to the jammed state, a pressure level inside the bladder housing the internal structure 1400 is decreased. In doing so, the woven rows 1402 and columns 1404 are pressed together by the bladder 204, and respective interfaces between the woven rows 1402 and woven columns 1404 are pressed against each other. Thus, in the jammed state, friction between the respective interfaces of the woven rows 1402 and columns 1404 is increased. Further, once pressurized, the fibers comprising the woven rows 1402 and columns 1404 are pressed together, and in a way, "bond" together (e.g., similar to a fiber reinforced composite with a matrix). In such a state, the fibers provide some strength and rigidity in one or more directions and thus counteract forces created by the user. Put plainly, the fibers composing the woven rows 1402 and columns 1404 stiffen as a result of decreasing the pressure inside the bladder.

It is noted that the internal structure 1400 as illustrated is sized for a palm of a user. In other embodiments, the internal structure 1400 is sized for different parts of the body, including a finger, a wrist, ankle, etc.

Figure 15A:
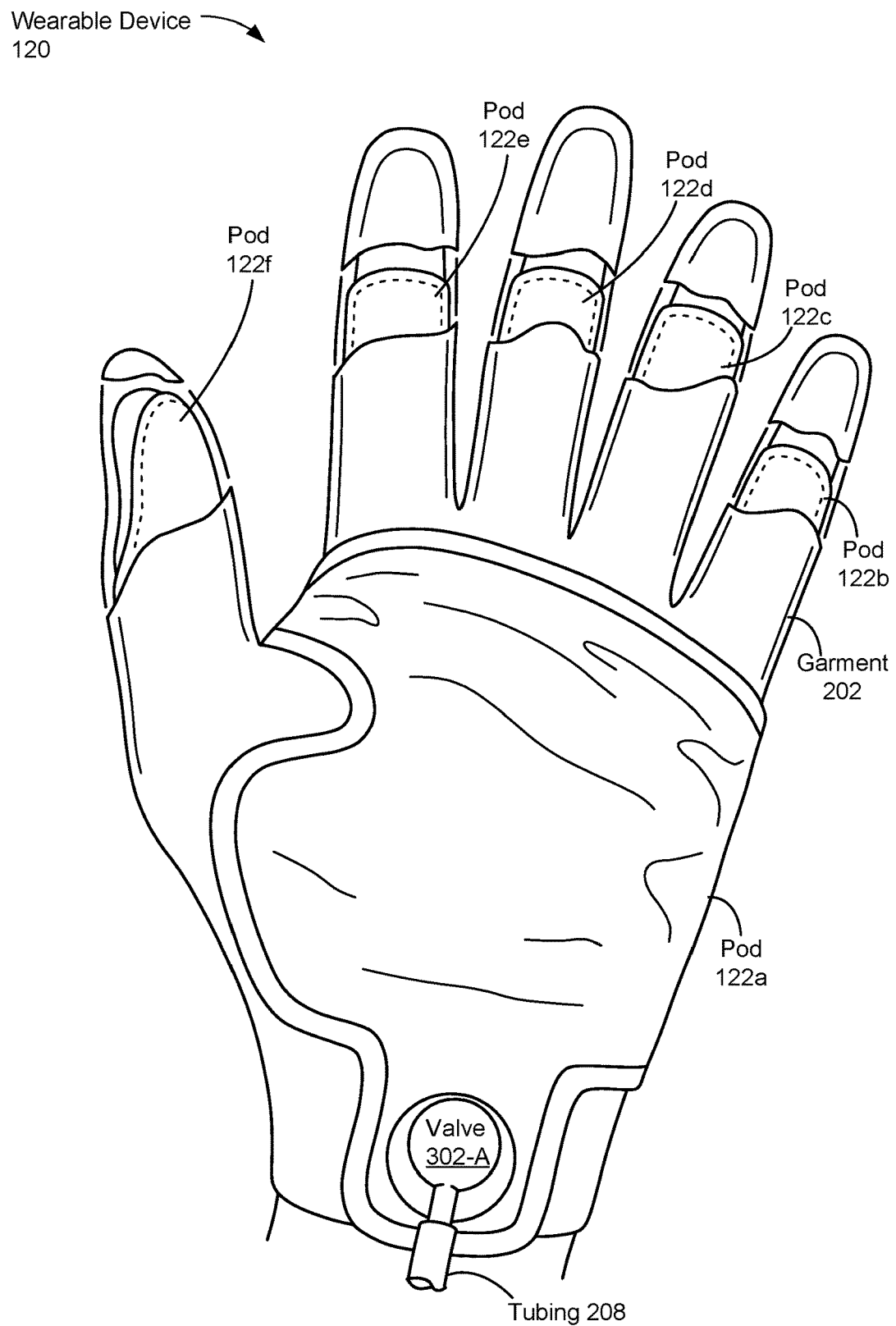
FIGS. 15A-15C show exemplary wearable devices in accordance with some embodiments.
Figure 15B:
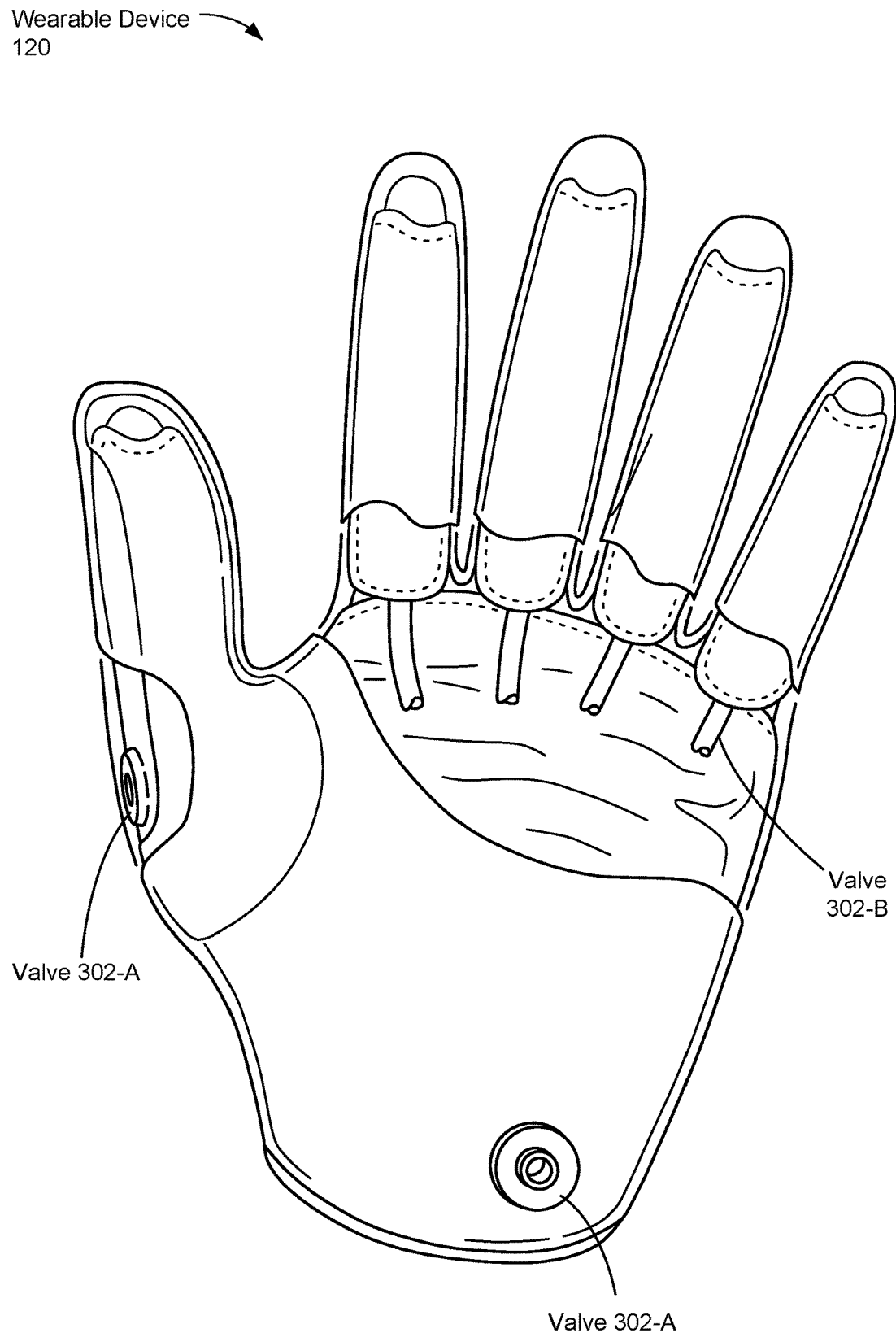
Figure 15C:
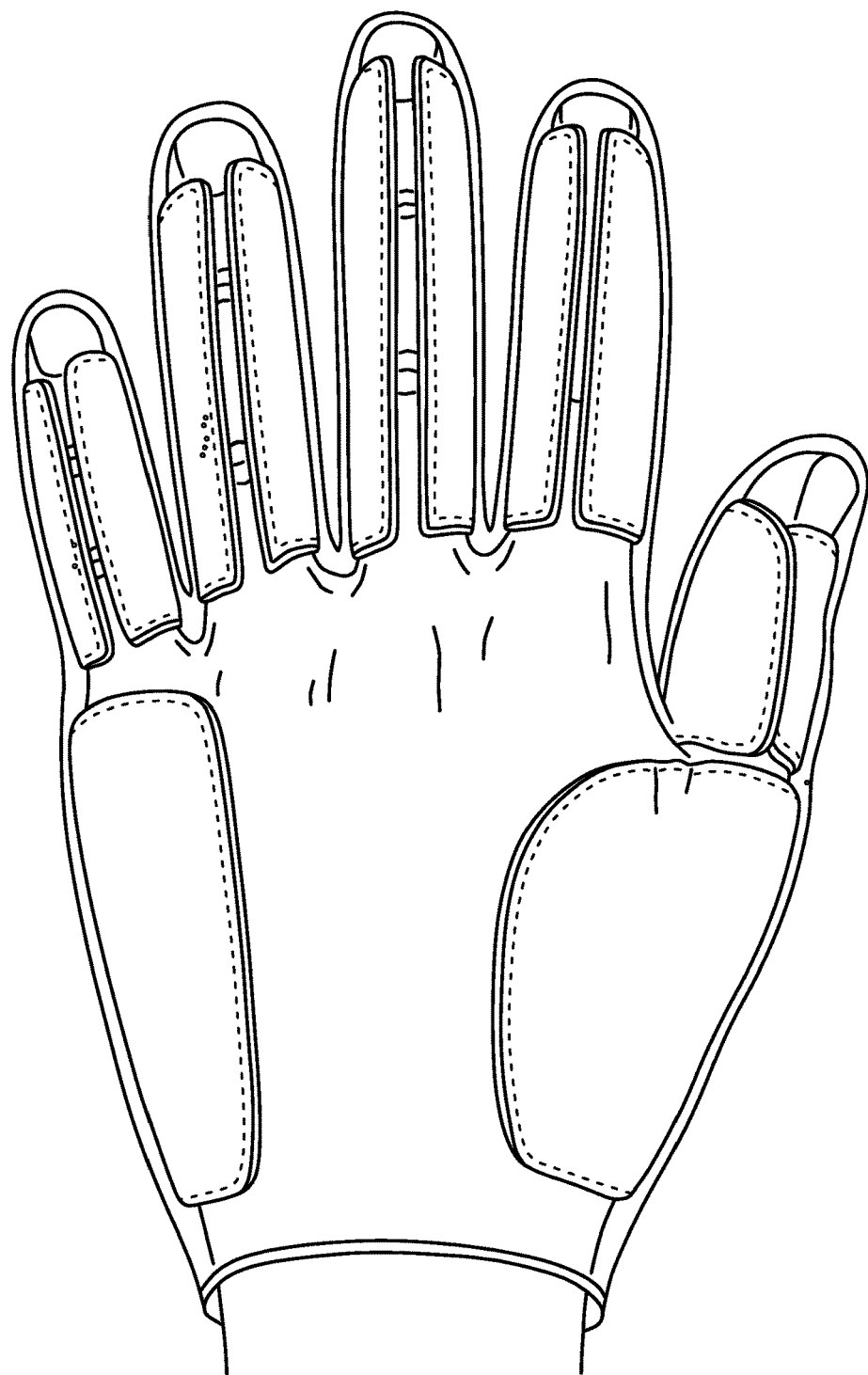

FIG. 15A shows a representative wearable device 120 that includes a plurality of pods 122a-122f positioned on various regions of a user's hand in accordance with some embodiments. In particular, a pod 122a is positioned on a palm region of the user's hand, pods 122b-122e are positioned on palmar portions of the user's fingers, and a pod 122f is positioned on a palmar portion of the user's thumb. In such a configuration, each of these regions of the user's body can experience one or more haptic stimulations. In some embodiments, the pods 122b-122f are a first pod type and the pod 122a is a second pod type different from the first pod type (e.g., the internal structures therein differ in some respect).

In the illustrated embodiments, pods in the plurality of pods 122a-122f are serviced by a single valve 302-A, and as a result, the plurality of pods 122a-122f may be housed in a single bladder 204. Accordingly, when the bladder is unpressurized, each of the plurality of pods 122a-122f is flexible, and when the bladder is pressurized, each of the plurality of pods 122a-122f is less flexible (i.e., semi-rigid or rigid).

FIG. 15B shows a representative wearable device 120 that includes a plurality of pods 122a-122f positioned on various regions of a user's hand in accordance with some embodiments. The plurality of pods 122a-122f in FIG. 15B is arranged in the same manner as the plurality of pods 122a-122f in FIG. 15A. However, the plurality of pods 122a-122f in FIG. 15B each has a distinct valve. In such an arrangement, each of the plurality of pods 122a-122f has its own bladder 204. Thus, each of the pods 122a-122f can be individually pressurized and depressurized.

FIG. 15C shows a dorsal view of a user's hand wearing the wearable device shown in FIG. 15A. As shown, the pods 122b-122e wrap substantially around each of the user's fingers. The same is true for the pod 122f on the user's thumb. Further, the pod 122a wraps around from a palm side of the user's hand to a dorsal side of the user's hand. Although not shown in FIGS. 15A-15C, the garment 202 would cover the pods 122 such that the pods 122 would not be visible (at least in some instances). However, for ease of illustration in FIGS. 15A-15C, portions of the garment 202 have been removed to show the pods 122 hidden beneath.

Although not shown, in some embodiments, one or more pods are positioned on dorsal and palmar sides of the user's hand. For example, one or more of the user's fingers may include one or more pods on the dorsal-side of the finger, and also one or more other pods on the palmar-side of the finger. Similar configurations can be used on the palm and the back of the user's hand, and various other body parts of the user. In this way, the wearable device is able to increase haptics to the back of the user's hand, create unique haptic stimulations across the user's hand, and also increase control of the portion of the user's hand.

Further, while not shown, a pod 122 may be serviced by multiple hoses (e.g., multiple instances of tubing 208). In doing so, the wearable device is able to evacuate/administer air to the pod 122 with better latency results, and also evacuate/administer air to problem areas, such as corners of the pod.

In light of these principles, we now turn to certain implementations.

In accordance with some implementations, an apparatus for creating haptic stimulations is provided. The apparatus includes one or more pods (e.g., multiple instances of pod 122, FIG. 3A) coupled to a garment. Each pod includes (i) an internal structure (e.g., internal structure 506, FIG. 5; internal structure 606, FIG. 6), and (ii) an airtight bladder (e.g., bladder 204, FIG. 3A) surrounding the internal structure. The bladder is pneumatically coupled (e.g., via tubing 208) to a pneumatic device (e.g., pneumatic device 210) that is configured to control a pressurized state of the bladder. Each pod is configured to: (i) have a first degree of flexibility when the bladder of the pod is in a first pressurized state; and (ii) have a second degree of flexibility, less than the first degree of flexibility, when the bladder of the pod is in a second pressurized state different from the first pressurized state. To illustrate, each of the pods may be adjacent to a respective portion of the wearer's body, and when the first pressurized state corresponds to atmospheric pressure (i.e., an unpressurized state), the internal structure of each pod does not impede free movement of the respective portion of the wearer's body. Put another way, the internal structure of each pod conforms to a posture of the respective portion of the wearer's body when the bladder is in the first pressurized state. In contrast, the internal structure of each pod transitions to a predetermined shape (e.g., a nonplanar or planar shape) when the pod is in the second pressurized state (i.e., the bladder is pressurized).

In some embodiments, the internal structure in each pod of the one or more pods includes two substrates connected through and separated by a material formed between the two substrates. In some embodiments, the material is a predefined stitching pattern (e.g., the predefined stitching pattern 506, FIG. 5). In such embodiments, the predefined stitching pattern in a respective pod strains the internal structure of the respective pod (e.g., the predefined stitching pattern and the substrates of the internal become strained) when the bladder of the respective pod is in the second pressurized state. When strained, the internal structure causes, at least partially, the respective pod to have the second degree of flexibility. Moreover, depending on a design of the predefined stitching pattern, certain regions of the internal structure may experience more strain relative to other regions of the internal structure. In this way, strain of the predefined stitching pattern can be tailored to mimic specific portions of the wearer's body (e.g., a strain profile of the predefined stitching pattern resembles a strain profile experienced by a portion of the wearer's body when a force acts upon that portion). As a result, the resulting haptic stimulations are more realistic. Thus, a first degree of strain is created in one or more regions of the internal structure by the predefined stitching pattern when the bladder of the respective pod is in the second pressurized state, and a second degree of strain, greater than the first degree of strain, is created in one or more different regions of the internal structure by the predefined stitching pattern when the bladder of the respective pod is in the second pressurized state.

In light of the above, the strain created by predefined stitching patterns can cause respective internal structures to take different shapes. For example, the strain created by one predefined stitching pattern can cause a respective internal structure to remain or become planar, while the strain created by another predefined stitching pattern can cause a respective internal structure to remain or become nonplanar. Thus, in some embodiments, the predefined stitching pattern in a first pod of the one or more pods is configured to make the internal structure of the first pod take a first shape when the bladder of the first pod is in the second pressurized state. Further, the predefined stitching pattern in a second pod, distinct from the first pod, of the one or more pods is configured to make the internal structure of the second pod take a second shape, different from the first shape, when the bladder of the second pod is in the second pressurized state. The predefined stitching pattern in the second pod is different from the predefined stitching pattern in the first pod. In some embodiments, the first shape taken by the first pod is a planar, flat shape, and the second shape taken by the second pod is a nonplanar shape. In some other embodiments, the first shape taken by the first pod is a first nonplanar shape, and the second shape taken by the second pod is a second nonplanar shape different from the first nonplanar shape.

In some embodiments, the material has a predefined lattice structure (e.g., the predefined lattice structure 606, FIG. 6). Much like the predefined stitching pattern discussed above, the predefined lattice structure in a respective pod strains the internal structure of the respective pod (e.g., the lattice structure and the substrates of the internal become strained) when the bladder of the respective pod is in the second pressurized state. When strained, the internal structure with the predefined lattice structure causes, at least partially, the respective pod to have the second degree of flexibility. Moreover, depending on a design of the predefined lattice structure, certain regions of the internal structure may experience more strain relative to other regions of the internal structure. In this way, strain of the predefined lattice structure can be tailored to mimic specific portions of the wearer's body (e.g., a strain profile of the predefined lattice structure resembles a strain profile experienced by a portion of the wearer's body when a force acts upon that portion). As a result, the resulting haptic stimulations are more realistic. Thus, a first degree of strain is created in one or more regions of the internal structure by the predefined lattice structure when the bladder of the respective pod is in the second pressurized state, and a second degree of strain, greater than the first degree of strain, is created in one or more different regions of the internal structure by the predefined lattice structure when the bladder of the respective pod is in the second pressurized state.

In light of the above, the strain created by predefined lattice structures can cause respective internal structures to take different shapes. For example, the strain created by one predefined lattice structure can cause a respective internal structure to remain or become planar, while the strain created by another predefined lattice structure can cause a respective internal structure to remain or become nonplanar. Thus, in some embodiments, the predefined lattice structure in a first pod of the one or more pods is configured to make the internal structure of the first pod take a first shape when the bladder of the first pod is in the second pressurized state. Further, the predefined lattice structure in a second pod, distinct from the first pod, of the one or more pods is configured to make the internal structure of the second pod take a second shape, different from the first shape, when the bladder of the second pod is in the second pressurized state. The predefined lattice structure in the second pod is different from the predefined lattice structure in the first pod. Various shapes can be created by the predefined lattice structure, as mentioned above with reference to the predefined stitching pattern.

Furthermore, characteristics of the two substrates can also play a role in the haptic stimulations experienced by the user. For example, a first substrate of the two substrates in a respective pod of the one or more pods has a first elasticity and a second substrate of the two substrates in the respective pod has a second elasticity less than the first elasticity of the first substrate. In such an example, the first substrate is configured to expand away from the second substrate in a first direction when the bladder in the respective pod is in the second pressurized state. Furthermore, the material (e.g., the predefined stitching pattern or the predefined lattice structure) formed between the two substrates can pull the second substrate in the first direction when the bladder in the respective pod is in the second pressurized state.

In view of the discussion above, properties of the material and two substrates influence the haptic stimulation experience by the user. As such, in some embodiments, a first pod of the one or more pods is configured to provide a first haptic stimulation to the wearer of the wearable device when the bladder of the first pod is in the second pressurized state, the first haptic stimulation impeding movement of the respective portion of the wearer's body. Further, a second pod, distinct from the first pod, of the one or more pods is configured to provide a second haptic stimulation to the wearer of the wearable device when the bladder of the second pod is in the second pressurized state, the second haptic stimulation forcing movement of the respective portion of the wearer's body in a direction. In such embodiments, properties of the material and two substrates in the first pod differ from the properties of the material and two substrates in the second pod.

In accordance with some other implementations, an apparatus for creating haptic stimulations is provided. The apparatus includes one or more pods (e.g., multiple instances of pod 122, FIG. 3A) coupled to a garment. Each pod includes (i) an internal structure including an arrangement of a plurality of protrusions (e.g., internal structure 900, Figure A; internal structure 910, FIG. 9B), and (ii) an airtight bladder (e.g., bladder 204, FIG. 3A) surrounding the internal structure. The bladder is pneumatically coupled (e.g., via tubing 208) to a pneumatic device (e.g., pneumatic device 210) that is configured to control a pressurized state of the bladder. The internal structure may be attached to one or more interior surfaces of the bladder, or the internal structure is floating (i.e., not attached to an interior surface of the bladder). The internal structure in each pod is configured to have a first degree of flexibility when the bladder of the pod is in a first pressurized state. The internal structure in each pod is further configured to, when the bladder is in a second pressurized state different from the first pressurized state: (i) curve, at least partially, in a predetermined direction, and (ii) have a second degree of flexibility less than the first degree of flexibility. Each pod provides a unique haptic stimulation to a wearer of the garment when the bladder is in the second pressurized state.

In some embodiments, each of the plurality of protrusions has the same cross-sectional shape, e.g., as shown in FIGS. 9A-9C. Alternatively, in some embodiments, at least one of the plurality of protrusions has a different cross-sectional shape. Whichever the case, the cross-sectional shape is selected from the group consisting of a triangle, a rectangle, a trapezoid, a circle, and a hexagon (other shapes are also possible, such as the shapes shown in FIGS. 10G-10I). Each of the plurality of protrusions may extend across a width of the substrate (e.g., as shown in FIGS. 9A-9C). In some embodiments, one or more of the plurality of protrusions is perforated, at least partially, to allow a medium to pass through the one or more protrusions (e.g., as shown in FIGS. 9C and 10E-1). Characteristics of the plurality of protrusions are discussed in further detail above with reference to FIGS. 9A-9D and FIGS. 10E-1 to 10L.

In some embodiments, the plurality of protrusions in a first pod of the one or more pods is configured to make the internal structure of the first pod take a first shape when the bladder of the first pod is in the second pressurized state. Further, the plurality of protrusions in a second pod, distinct from the first pod, of the one or more pods is configured to make the internal structure of the second pod take a second shape, different from the first shape, when the bladder of the second pod is in the second pressurized state. Characteristics of protrusions in the plurality of protrusions in the second pod are different from characteristics of the plurality of protrusions in the first pod. For example, the internal structure 900 (FIG. 9A) will curve in a different manner relative to the internal structure 910 (FIG. 9B), as a result of the protrusions 904 being different from the protrusions 914 (e.g., rectangular versus triangular shaped protrusions). Other factors include a spacing of the protrusions and properties of the substrate (e.g., modulus of elasticity and stiffness).

In some embodiments, when the bladder of a respective pod is in the first pressurized state, the bladder is unpressurized, and when the bladder of the respective pod is in the second pressurized state, the bladder is positively pressurized or negatively pressurized. A medium (e.g., air) is removed from the bladder of the respective pod when the bladder is negatively pressurized, and a medium is added to the bladder of the respective pod when the bladder is positively pressurized. In some embodiments, when the bladder of a respective pod is in the first pressurized state, the bladder is pressurized at a first pressure (i.e., not atmospheric pressure), and when the bladder of the respective pod is in the second pressurized state, the bladder is pressurized at a second pressure (i.e., also not atmospheric pressure) different from the first pressure.

In some embodiments, the bladder of a respective pod is in the second pressurized state when the pneumatic device removes air from the bladder of the respective pod. In such embodiments, the air being removed from the bladder travels over the top portions of the plurality of protrusions at a faster rate relative to a rate of the air being removed from the bladder that travels from bottom portions of the plurality of protrusions. Further, the air that travels over the top portions of the plurality of protrusions at the faster rate causes the internal structure of each pod to curve, at least partially, in the predetermined direction. Curling of internal structures is discussed in further detail above with reference to FIGS. 9A-9D, 10C, and 10E-1 to 10E-2.

To provide some additional context, each of the pods may be adjacent to a respective portion of the wearer body, and in such instances, the internal structure of each pod does not impede free movement of the respective portion of the wearer's body when the bladder is in the first pressurized state. Put another way, the internal structure of each pod can conform to a posture of the respective portion of the wearer's body when the bladder is in the first pressurized state. In contrast, the internal structure of each pod transitions to a predetermined shape (e.g., a nonplanar or planar shape) when the pod is in the second pressurized state (i.e., the bladder is pressurized).

In accordance with some other implementations, an apparatus for creating haptic stimulations is provided. The apparatus includes one or more pods coupled to a garment. Each pod includes: (i) an outer internal structure (e.g., outer internal structure 802, FIG. 8A) that defines an opening (e.g., opening 806, FIG. 8C), (ii) an inner internal structure (e.g., inner internal structure 804, FIG. 8A) disposed in the opening defined by the outer internal structure, and (iii) an airtight bladder, pneumatically coupled with a pneumatic device, surrounding the inner and outer internal structures. The pneumatic device is configured to control a pressure inside the bladder. In some embodiments, at least one of the internal structures is coupled to an interior surface of the bladder. Additionally, when a bladder of a respective pod is at a first pressure, respective top surfaces of the inner and outer internal structures contact a first portion of a user's body, said contact with the first portion of the user's body having a first surface area, and when the bladder of the respective pod is at a second pressure different from the first pressure, the top surface of the inner internal structure and/or the top surface of the outer internal structure contact a second portion of the user's body, said contact with the second portion of the user's body having a second surface area different from the first surface area. For example, with reference to FIG. 8A, the nested internal structure 800 would have (potentially) a contact area that includes the respective surface areas of the outer internal structure 802 and the inner internal structure 804. However, with reference to FIG. 8B, the nested internal structure 800 would have (potentially) a contact area that only includes the surface of the inner internal structure 804. Thus, the nested internal structure 800 can vary its effective surface area (and in some instance completely change its effective surface area), and in doing so, vary a haptic stimulation experienced by the user (e.g., vary from large contact areas to smaller, pinpointed contact areas, and vice versa).

Further, a top surface of the outer internal structure and a top surface of the inner internal structure are coplanar when the bladder of each pod is unpressurized (e.g., as shown in FIG. 8A). Moreover, the top surface of the inner internal structure extends from the top surface of the outer internal structure to a first height when the bladder of each pod is pressurized (e.g., as shown in FIG. 8B). Each pod provides a unique haptic stimulation to a wearer of the garment when the bladder of each pod is pressurized.

In some embodiments, the top surface of the inner internal structure extends from the top surface of the outer internal structure to the first height when the bladder of each pod is pressurized to a first pressure. Furthermore, the top surface of the inner internal structure extends from the top surface of the outer internal structure to a second height when the bladder of each pod is pressurized to a second pressure greater than the first pressure, the second height being greater than the first height. According, a difference between the top surface of the inner internal structure and the top surface of the outer internal structure is variable depending on a pressure inside the bladder. Additionally, a stiffness (i.e., rigidity) of the inner and outer internal structures is proportional to the pressure inside the bladder (e.g., an increase in pressure causes an increase in rigidity).

In some embodiments, the outer internal structure and inner internal structure of each pod includes two substrates connected through and separated by a material formed between the two substrates. The material may be a spun filament mesh, or one of a predefined stitching pattern or a predefined lattice structure. Using the filament mesh as the primary example, the filament mesh in a first pod of the one or more pods may be configured to make the inner internal structure of the first pod take a first shape when the bladder of the first pod is pressurized. The filament mesh in a second pod, distinct from the first pod, of the one or more pods, may be configured to make the inner internal structure of the second pod take a second shape, different from the first shape, when the bladder of the second pod is pressurized. The filament mesh in the second pod is deposited in a different pattern from the filament mesh in the first pod. For example, the first shape taken by the first pod includes a single ridge or dome that extends to the first height, and the second shape taken by the second pod includes multiple ridges or domes that extend to multiple heights, including the first height. Various other shapes and heights can be obtained depending on how the filament mesh is deposited. For example, the density, the tension, and the elongation of the filament mesh across a surface area of the inner and outer internal structure may vary to obtain different shapes.

In some embodiments, the outer internal structure and inner internal structure of each pod are configured to: (i) have a first degree of flexibility when the bladder of the pod is unpressurized, and (ii) have a second degree of flexibility, less than the first degree of flexibility, when the bladder of the pod is pressurized. To illustrate, each of the pods may be adjacent to a respective portion of the wearer's body, and when unpressurized, the outer internal structure and inner internal structure of each pod do not impede free movement of the respective portion of the wearer's body. Put another way, the outer internal structure and inner internal structure of each pod conform to a posture of the respective portion of the wearer's body when the bladder is in the first pressurized state. In contrast, the outer internal structure and inner internal structure of each pod, at a minimum, impede free movement of the respective portion of the wearer's body when the pod is pressurized. As noted above, a stiffness (i.e., rigidity) of the inner and outer internal structures is proportional to the pressure inside the bladder (e.g., an increase in pressure causes an increase in rigidity).

In some embodiments, the opening is a first opening, and the inner internal structure defines a second opening with a largest dimension that is shorter than a largest dimension of the first opening. Further, the inner internal structure is a first inner internal structure, and each pod further includes a second inner internal structure disposed in the second opening defined by the first inner internal structure (e.g., as shown in FIG. 8D). In such instances, a top surface of the second inner internal structure extends from the top surface of the first inner internal structure to a second height when the bladder of each pod is pressurized, the second height being greater than the first height.

The embodiments discussed below can be implemented with any of the implementations discussed above.

In some embodiments, the pneumatic device is in communication with a remote computing device (e.g., computer system 130), and the pneumatic device is configured to change the pressurized state (e.g., unpressurized to pressurized, or vice versa) of the bladder in one or more respective pods of the one or more pods in response to receiving one or more signals from the remote computing device.

Further, the remote computing device is in communication with a head-mounted display (e.g., head-mounted display 110, FIG. 1) that presents content to the wearer, the head-mounted display including an electronic display (e.g., electronic display 112, FIG. 1). The one or more signals correspond to content displayed on the electronic display.

In some embodiments, the apparatus includes one or more sensors (e.g., sensors 124, FIG. 1), coupled to the garment, configured to generate spatial and motion data corresponding to the wearer's movements. Further, the spatial and motion data may be communicated to the remote computing device. In such circumstances, the one or more signals further correspond to the spatial and motion data corresponding to the wearer's movements, and the one or more signals are generated by the remote computing device to impede the wearer's movements. As an example, if the computer system receives information from the sensors 124 that the user has closed his fingers around a position corresponding to a coffee mug in the virtual environment and raised his hand, a simulated hand in a virtual-reality application 132 picks up the virtual coffee mug and lifts it to a corresponding height. Further, the one or more signals generated by the remote computing device may prevent one or more of the user's fingers from curling past a certain point to simulate the sensation of touching the coffee mug. For example, the one or more signals cause the pneumatic device to change a pressurized state of the bladder of the apparatus (e.g., go from unpressurized to pressurized). In doing so, the internal structure of the apparatus, which is housed by the pressurized bladder, prevents one or more of the user's fingers from curling past a certain point.

Figure 16:
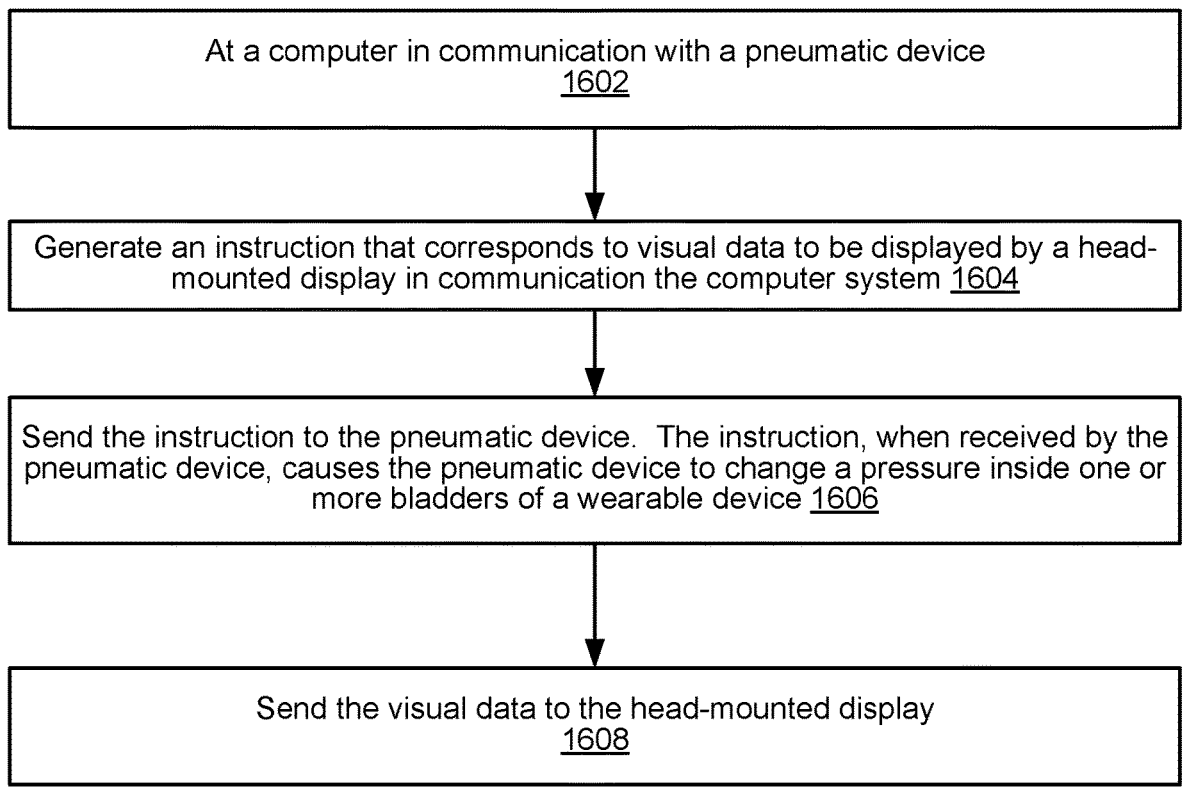
FIG. 16 is a flowchart for a method of creating haptic stimulations in accordance with some embodiments.

FIG. 16 is a flow diagram illustrating a method 1600 of managing creation of haptic stimulations in accordance with some embodiments. The steps of the method 1600 may be performed by a computer (e.g., computer system 130, FIG. 1) (1602). FIG. 16 corresponds to instructions stored in a computer memory or computer readable storage medium (e.g., memory of the computer system 130). For example, the operations of method 1600 are performed, at least in part, by a communication interface (e.g., similar to communication interface 126) and a virtual-reality/augment reality generation module (e.g., part of engine 134, FIG. 1). It is noted that the method described below can be implemented with any of the wearable devices and internal structures discussed above.

The method 1600 includes generating (1604) an instruction that corresponds to visual data to be displayed by a head-mounted display in communication the computer system (and/or corresponds to information received from one or more sensors 124 of the wearable device 120 and/or information received from one or more sensors 114 of the head-mounted display 110). In some embodiments, the computer system generates the instruction based on information received from the sensors on the wearable device. Alternatively or in addition, in some embodiments, the computer system generates the instruction based on information received from the sensors on the head-mounted display. For example, cameras (or other sensors) on the head-mounted display may capture movements of the wearable device, and the computer system can use this information when generating the instruction.

The method 1600 further includes sending (1606) the instruction to a pneumatic device in communication with the computer system (e.g., send the instruction in a communication signal from a communication interface). The instruction, when received by the pneumatic device, causes the pneumatic device to change a pressure inside one or more bladders of a wearable device. In doing so, a wearer of the wearable device will experience a haptic stimulation that corresponds to the visual data. In some embodiments, the instruction specifies the change in the pressure to be made by the pneumatic device. It is noted that in some situations, instead of the computer system sending the instruction to the pneumatic device, the computer system sends the instruction to the wearable device. In response to receiving the instruction, the wearable device sends the instruction to the pneumatic device. The pneumatic device is discussed in further detail above with reference to FIG. 2.

After (or while, or before) sending the instruction, the method 1600 also includes sending (1608) the visual data to the head-mounted display. For example, the head-mounted display may receive the visual data from the computer system, and may in turn display the visual data on its display(s). As an example, if the computer system receives information from the sensors 124 of the wearable device 120 that the user has closed his fingers around a position corresponding to a coffee mug in the virtual environment and raised his hand, a simulated hand in a virtual-reality application picks up the virtual coffee mug and lifts it to a corresponding height. Generating and sending visual data is discussed in further detail above with reference to FIG. 1.

In conjunction with displaying the visual data, one or more bladders of the wearable device are inflated or deflated to the pressure (as noted above). As an example, the wearable device may include one or more pods coupled to a garment, each pod including: (i) an internal structure, and (ii) an airtight bladder surrounding the internal structure, where the bladder is pneumatically coupled to the pneumatic device that is configured to control a pressurized state of the bladder. Further, each pod is configured to: (i) have a first degree of flexibility when the respective bladder of the respective pod is in a first pressurized state (i.e., at a first pressure) and (ii) have a second degree of flexibility, less than the first degree of flexibility, when the respective bladder of the respective pod is in a second pressurized state (i.e., at a second pressure) different from the first pressurized state, thereby providing a haptic stimulation to a wearer of the garment when the respective bladder is in the second pressurized state. Accordingly, in this particular example, when the pneumatic device changes the pressure inside one or more bladders of the wearable device (1606), the respective pod in the respective bladder has the second degree of flexibility less than the first degree of flexibility. This particular example relates to the internal structures discussed above with reference to FIGS. 4A through 6.

In another example, the wearable device may include one or more pods coupled to a garment, each pod including: (i) an internal structure including an arrangement of a plurality of protrusions, and (ii) an airtight bladder surrounding the internal structure, wherein the bladder is pneumatically coupled to the pneumatic device that is configured to control a pressurized state of the bladder. Further, the internal structure in each pod is configured to: (i) when the respective bladder of the respective pod is in a first pressurized state, have a first degree of flexibility; and (ii) when the respective bladder of the respective pod is in a second pressurized state different from the first pressurized state: curve, at least partially, in a predetermined direction, and have a second degree of flexibility less than the first degree of flexibility, thereby providing a haptic stimulation to a wearer of the garment when the respective bladder is in the second pressurized state. Accordingly, in this particular example, when the pneumatic device changes the pressure inside one or more bladders of the wearable device (1606), the respective pod in the respective bladder curves and has the second degree of flexibility less than the first degree of flexibility. This particular example relates to the internal structures discussed above with reference to FIGS. 9A-9D, along with some of the structures in FIGS. 10E-1 through 10M-3.

In yet an example, the wearable device may include one or more pods coupled to a garment, each pod including: (i) an outer internal structure that defines an opening, (ii) an inner internal structure disposed in the opening defined by the outer internal structure, and (iii) an airtight bladder, pneumatically coupled with the pneumatic device, surrounding the inner and outer internal structures, the pneumatic device being configured to control a pressure inside the bladder. Further, when a bladder of a respective pod is at a first pressure, respective top surfaces of the inner and outer internal structures contact a first portion of a user's body, said contact with the first portion of the user's body having a first surface area, and when the bladder of the respective pod is at a second pressure different from the first pressure, the top surface of the inner internal structure and/or the top surface of the outer internal structure contact a second portion of the user's body, said contact with the second portion of the user's body having a second surface area different from the first surface area. To illustrate one example, when at the first pressure, the top surface of the outer internal structure and the top surface of the inner internal structure in a respective pod may be adjacent to and contacting the distal phalange and the intermediate phalange of a user's finger. Moreover, when at the second pressure, the top surface of the inner internal structure in the respective pod may now contact the joint between the distal phalange and the intermediate phalange of the user's finger. For example, the user may curl his or her, and as a result, the inner/outer internal structure can be used to pinpoint forces into otherwise hard to reach places, such as joints between finger sections. In this particular, the top surface of the inner internal structure extends from the top surface of the outer internal structure to a first height when the respective bladder in the respective pod is at the second pressure, such as the arrangement shown in FIG. 8B.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An apparatus for creating haptic stimulations, comprising:
    one or more pods coupled to a garment, each pod including:
        (i) an internal structure, and
        (ii) an airtight bladder surrounding the internal structure, wherein the bladder is pneumatically coupled to a pneumatic device that is configured to control a pressurized state of the bladder,
    wherein each pod is configured to:
        (i) have a first degree of flexibility when the respective bladder of the respective pod is in a first pressurized state; and
        (ii) have a second degree of flexibility, less than the first degree of flexibility, when the respective bladder of the respective pod is in a second pressurized state different from the first pressurized state, thereby providing a haptic stimulation to a wearer of the garment when the respective bladder is in the second pressurized state.

2. The apparatus of claim 1, wherein the internal structure in each pod of the one or more pods includes two substrates connected through and separated by a material formed between the two substrates.

3. The apparatus of claim 2, wherein:
    the material has a predefined stitching pattern; and
    the predefined stitching pattern in a first pod of the one or more pods is to strain the internal structure of the first pod when the bladder of the first pod is in the second pressurized state, the strained internal structure causing, at least partially, the first pod to have the second degree of flexibility.

4. The apparatus of claim 3, wherein:
    a first degree of strain is created in one or more regions of the internal structure by the predefined stitching pattern when the bladder of the first pod is in the second pressurized state; and
    a second degree of strain, greater than the first degree of strain, is created in one or more different regions of the internal structure by the predefined stitching pattern when the bladder of the first pod is in the second pressurized state.

5. The apparatus of claim 3, wherein:
    the predefined stitching pattern in the first pod is configured to make the internal structure of the first pod take a first shape when the bladder of the first pod is in the second pressurized state;
    the predefined stitching pattern in a second pod, distinct from the first pod, of the one or more pods is configured to make the internal structure of the second pod take a second shape, different from the first shape, when the bladder of the second pod is in the second pressurized state; and
    the predefined stitching pattern in the second pod is different from the predefined stitching pattern in the first pod.

6. The apparatus of claim 5, wherein:
    the first shape taken by the first pod is a planar, flat shape; and
    the second shape taken by the second pod is a nonplanar shape.

7. The apparatus of claim 5, wherein:
    the first shape taken by the first pod is a first nonplanar shape; and
    the second shape taken by the second pod is a second nonplanar shape different from the first nonplanar shape.

8. The apparatus of claim 2, wherein:
    the material has a predefined lattice structure;
    the predefined lattice structure in a first pod of the one or more pods is configured to make the internal structure of the first pod take a first shape when the bladder of the first pod is in the second pressurized state;
    the predefined lattice structure in a second pod, distinct from the first pod, of the one or more pods is configured to make the internal structure of the second pod take a second shape, different from the first shape, when the bladder of the second pod is in the second pressurized state; and the predefined lattice structure in the second pod is different from the predefined lattice structure in the first pod.

9. The apparatus of claim 2, wherein:
a first substrate of the two substrates in a first pod of the one or more pods has a first elasticity;
a second substrate of the two substrates in the first pod has a second elasticity less than the first elasticity of the first substrate; and
the first substrate is configured to expand away from the second substrate in a first direction when the bladder in the first pod is in the second pressurized state.

10. The apparatus of claim 1, wherein:
each of the pods is adjacent to a respective portion of the wearer's body; and
the internal structure of each pod does not impede free movement of the respective portion of the wearer's body when the bladder is in the first pressurized state.

11. The apparatus of claim 10, wherein:
the internal structure of each pod conforms to a respective posture of the respective portion of the wearer's body when the bladder is in the first pressurized state; and
the internal structure of each pod transitions to a respective predetermined shape when the respective pod is in the second pressurized state.

12. The apparatus of claim 10, wherein:
a first pod of the one or more pods is configured to provide a first haptic stimulation to the wearer of the wearable device when the bladder of the first pod is in the second pressurized state, the first haptic stimulation impeding movement of the respective portion of the wearer's body; and
a second pod, distinct from the first pod, of the one or more pods, is configured to provide a second haptic stimulation to the wearer of the wearable device when the bladder of the second pod is in the second pressurized state, the second haptic stimulation forcing movement of the respective portion of the wearer's body in a direction.

13. The apparatus of claim 1, wherein:
a bladder is in the first pressurized state when the bladder is unpressurized; and
the bladder is in the second pressurized state when the bladder is positively pressurized or negatively pressurized.

14. The apparatus of claim 13, wherein the bladder is in the second pressurized state when the pneumatic device adds air to or removes air from the bladder.

15. The apparatus of claim 1, wherein:
the pneumatic device is in communication with a remote computing device; and
the pneumatic device is configured to change the pressurized state of a bladder for a pod in response to receiving one or more signals from the remote computing device.

16. The apparatus of claim 15, wherein:
the remote computing device is in communication with a head-mounted display that presents content to the wearer, the head-mounted display including an electronic display; and
the one or more signals correspond to content displayed on the electronic display.

17. The apparatus of claim 16, further comprising one or more sensors, coupled to the garment, configured to generate spatial and motion data corresponding to the wearer's movements,
wherein the spatial and motion data are communicated to the remote computing device.

18. The apparatus of claim 17, wherein:
the one or more signals further correspond to the spatial and motion data corresponding to the wearer's movements; and
the one or more signals are generated by the remote computing device to impede the wearer's movements.

19. A wearable device for creating haptic stimulations, comprising:
a garment configured to be worn on a portion of a wearer's body; and
one or more pods coupled to the garment, each pod including:
  (i) an internal structure, and
  (ii) an airtight bladder surrounding the internal structure, wherein the bladder is pneumatically coupled to a pneumatic device that is configured to control a pressurized state of the bladder,
wherein each pod is configured to:
  (i) have a first degree of flexibility when the respective bladder of the respective pod is in a first pressurized state; and
  (ii) have a second degree of flexibility, less than the first degree of flexibility, when the respective bladder of the respective pod is in a second pressurized state different from the first pressurized state, thereby providing a haptic stimulation to a wearer of the garment when the respective bladder is in the second pressurized state.

20. A system for creating haptic stimulations, comprising:
a computing device;
a pneumatic device in communication with the computing device;
a wearable device in communication with the computing device, comprising:
  one or more pods coupled to a garment of the wearable device, each pod including:
    (i) an internal structure, and
    (ii) an airtight bladder surrounding the internal structure, wherein the bladder is pneumatically coupled to the pneumatic device, the pneumatic device being configured to control a pressurized state of the bladder,
  wherein each pod is configured to:
    (i) have a first degree of flexibility when the respective bladder of the respective pod is in a first pressurized state; and
    (ii) have a second degree of flexibility, less than the first degree of flexibility, when the respective bladder of the respective pod is in a second pressurized state different from the first pressurized state, thereby providing a haptic stimulation to a wearer of the garment when the respective bladder is in the second pressurized state.

* * * * *